United States Patent
Zhao et al.

(10) Patent No.: US 12,459,917 B2
(45) Date of Patent: Nov. 4, 2025

(54) SALT OF DIAMINOPYRIMIDINE COMPOUNDS, AND SOLID FORM THEREOF, PREPARATION METHOD THEREFOR AND USE THEREOF

(71) Applicant: BEIJING TIDE PHARMACEUTICAL CO., LTD., Beijing (CN)

(72) Inventors: Yanping Zhao, Beijing (CN); Hongjun Wang, Beijing (CN); Zewang Feng, Beijing (CN); Huai Huang, Beijing (CN); Kai Liu, Beijing (CN); Xuelian Liu, Beijing (CN); Jianmei Pang, Beijing (CN); Nana Tian, Beijing (CN); Xichao Chen, Beijing (CN); Shenzhen Fu, Beijing (CN); Jie Meng, Beijing (CN); Liying Zhou, Beijing (CN); Yanan Liu, Beijing (CN)

(73) Assignee: BEIJING TIDE PHARMACEUTICAL CO., LTD., Beijing (CN)

( * ) Notice: Subject to any disclaimer, the term of this patent is extended or adjusted under 35 U.S.C. 154(b) by 975 days.

(21) Appl. No.: 17/607,464

(22) PCT Filed: Apr. 29, 2020

(86) PCT No.: PCT/CN2020/087688
§ 371 (c)(1),
(2) Date: Oct. 29, 2021

(87) PCT Pub. No.: WO2020/221276
PCT Pub. Date: Nov. 5, 2020

(65) Prior Publication Data
US 2022/0177447 A1    Jun. 9, 2022

(30) Foreign Application Priority Data
Apr. 30, 2019 (WO) ............... PCT/CN2019/085208

(51) Int. Cl.
*C07D 401/12* (2006.01)

(52) U.S. Cl.
CPC ........ *C07D 401/12* (2013.01); *C07B 2200/13* (2013.01)

(58) Field of Classification Search
None
See application file for complete search history.

(56) References Cited

U.S. PATENT DOCUMENTS 11,919,918 B2 *   3/2024   Zhao ................... C07D 417/14
2019/0389811 A1 * 12/2019  Hawley ..................... A61P 1/04

FOREIGN PATENT DOCUMENTS

| CN | 105682659 | 6/2016 |
|---|---|---|
| CN | 1056826959 | 6/2016 |
| CN | 108834412 | 11/2018 |
| EP | 3712144 | 9/2020 |
| EP | 3964505 | 3/2022 |
| WO | 2015027212 | 2/2015 |
| WO | 2017160569 | 9/2017 |
| WO | 2019085916 | 5/2019 |

OTHER PUBLICATIONS

Gupta D, Bhatia D, Dave V, Sutariya V, Varghese Gupta S. Salts of Therapeutic Agents: Chemical, Physicochemical, and Biological Considerations. Molecules. Jul. 14, 2018;23(7):1719. doi: 10.3390/molecules23071719. PMID: 30011904; PMCID: PMC6100526. (Year: 2018).*

* cited by examiner

*Primary Examiner* — James H Alstrum-Acevedo
*Assistant Examiner* — Lauren Wells
(74) *Attorney, Agent, or Firm* — Robin L. Teskin; Baker, Donelson, Bearman, Caldwell & Berkowitz PC

(57) ABSTRACT

The present invention relates to a salt of 5-((2-ethynyl-5-isopropylpyridin-4-yl)oxy)pyrimidine-2,4-diamine and a solid form thereof, a method for preparing the solid form and a pharmaceutical composition comprising the solid form, as well as a use of the solid form for preventing or treating diseases modulated by P2X3 and/or P2X2/3 receptor antagonists.

16 Claims, 18 Drawing Sheets

SALT OF DIAMINOPYRIMIDINE COMPOUNDS, AND SOLID FORM THEREOF, PREPARATION METHOD THEREFOR AND USE THEREOF

CROSS-REFERENCE TO RELATED APPLICATIONS

This application is a U.S. National Phase application of Int'l Appl. No. PCT/CN2020/087688, filed Apr. 29, 2020, which claims priority to Int'l Appl. No. PCT/CN2019/085208, filed Apr. 30, 2019, each of which are incorporated herein by reference in their entireties.

FIELD OF THE INVENTION

The present invention relates to a salt of 5-((2-ethynyl-5-isopropylpyridin-4-yl)oxy)pyrimidine-2,4-diamine (hereinafter referred to as "compound A") and a solid form thereof, a method for preparing the solid form and a pharmaceutical composition comprising the solid form, as well as a use of the solid form for preventing or treating a disease mediated by a P2X3 and/or P2X2/3 receptor antagonist.

BACKGROUND OF THE INVENTION

Purine compounds, acting via cell surface purinoceptors, have been implicated as having a variety of physiological and pathological roles. ATP, and to a lesser extent, adenosine, can stimulate sensory nerve endings resulting in intense pain and a pronounced increase in sensory nerve discharge. ATP receptors have been classified into two major families, the P2Y- and P2X-purinoreceptors, on the basis of the molecular structure, transduction mechanisms, and pharmacological characterization. The P2Y-purinoceptors are G-protein coupled receptors, while the P2X-purinoceptors are a family of ATP-gated cation channels. Purinoceptors, in particular, P2X receptors, can form homomultimers or heteromultimers. To date, cDNAs for multiple P2X receptor subtypes (including six homologous receptors: P2X1, P2X2, P2X3, P2X4, P2X5 and P2X7; and three heterologous receptors: P2X2/3, P2X4/6 and P2X1/5) have been cloned. The structure and chromosomal mapping of mouse genomic P2X3 receptor subunits have also been reported.

Studies have shown that P2X3 and/or P2X2/3 receptor antagonists can be used to treat diseases such as pain, etc. The applicant has identified diaminopyrimidine compounds, specifically 5-((2-ethynyl-5-isopropylpyridin-4-yl)oxy)pyrimidine-2,4-diamine, which can be used as effective P2X3 and/or P2X2/3 receptor antagonists (see PCT/CN2018/112829, which is incorporated herein by reference in its entirety).

SUMMARY OF THE INVENTION

In one aspect, the present invention provides salts of compound A (5-((2-ethynyl-5-isopropylpyridin-4-yl)oxy)pyrimidine-2,4-diamine) as shown below

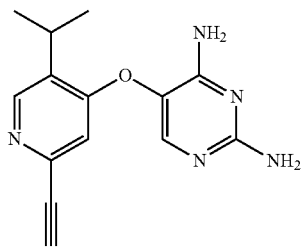

Compound A

In another aspect, the present invention provides crystalline forms of the salts of compound A.

The preferred crystalline forms of the present invention not only have an excellent effect in preventing or treating a disease mediated by the P2X3 and/or P2X2/3 receptor antagonist, but also have other advantages. For example, the preferred crystalline forms of the present invention have excellent physical properties (including solubility, dissolution rate, light resistance, low hygroscopicity, high temperature resistance, high humidity resistance, fluidity, and the like), and the preferred crystalline forms of the present invention may have superior properties in terms of bioavailability, physical and/or chemical stability, and ease of preparation. The preferred crystalline forms of the present invention have good powder properties, are more suitable and convenient for mass production and for forming a formulation, can reduce irritation and enhance absorption, solve problems in metabolic rates, significantly decrease toxicity resulted from drug accumulation, improve safety, and effectively ensure the quality and efficacy of the pharmaceutical products.

In another aspect, the present invention provides methods for preparing the crystalline forms of the present invention.

In another aspect, the present invention provides a pharmaceutical composition comprising any one or more of the crystalline forms of the present invention and one or more pharmaceutically acceptable carriers.

In another aspect, the present invention provides use of the crystalline form of the present invention in the manufacture of a medicament for the treatment of a disease mediated by a P2X3 and/or P2X2/3 receptor antagonist.

DETAILED DESCRIPTION OF THE INVENTION

Definitions

Figure 1:
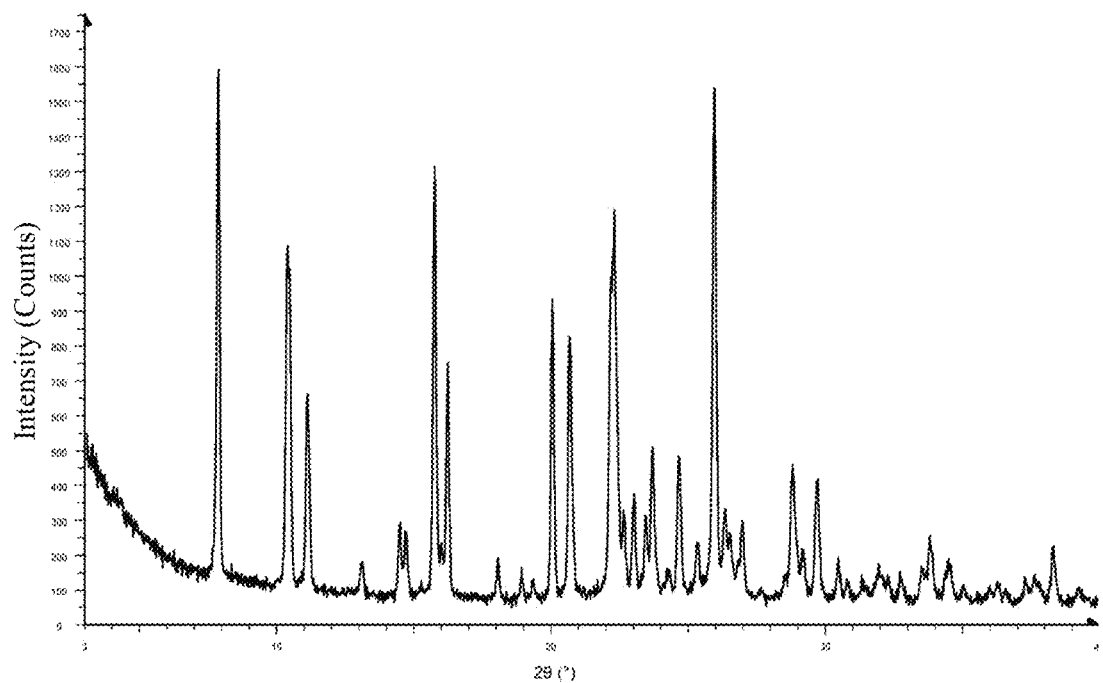
FIG. 1 is an X-ray powder diffraction pattern of crystalline form Ia of compound A hydrochloride (molar ratio 1:1).

Unless otherwise defined in the context, all technical and scientific terms used herein are intended to have the same meaning as commonly understood by a person skilled in the art. References to techniques employed herein are intended to refer to the techniques as commonly understood in the art, including variations on those techniques or substitutions of equivalent techniques which would be apparent to a person skilled in the art. While it is believed that most of the following terms will be readily understood by a person skilled in the art, the following definitions are nevertheless put forth to better illustrate the present invention.

The terms "contain", "include", "comprise", "have", or "relate to", as well as other variations used herein are inclusive or open-ended, and do not exclude additional, unrecited elements or method steps.

The word "about" as used herein refers to, as appreciated by a person skilled in the art, a range within the acceptable standard error of a value, such as ±0.05, ±0.1, ±0.2, ±0.3, ±1, ±2 or 3, etc.

The term "solid form" as used herein includes all solid forms of a salt of compound A, such as a crystalline form or amorphous form.

The term "amorphous" as used herein refers to any solid substance which lacks order in three dimensions. In some instances, amorphous solids may be characterized by known techniques, including XRPD crystallography, solid state nuclear magnet resonance (ssNMR) spectroscopy, DSC, or some combination of these techniques. As illustrated below, amorphous solids give diffuse XRPD patterns, typically comprised of one or two broad peaks (i.e., peaks having base widths of about 5° 2θ or greater).

The term "crystalline form" or "crystal" as used herein refers to any solid substance exhibiting three-dimensional order, which in contrast to an amorphous solid substance, gives a distinctive XRPD pattern with sharply defined peaks.

The term "X-ray powder diffraction pattern (XRPD pattern)" as used herein refers to the experimentally observed diffractogram or parameters derived therefrom. XRPD patterns are usually characterized by peak positions (abscissa) and peak intensities (ordinate).

The term "2θ" as used herein refers to the peak position in degrees based on the experimental setup of the X-ray diffraction experiment and is a common abscissa unit in diffraction patterns. The experimental setup requires that if a reflection is diffracted when the incoming beam forms an angle theta (θ) with a certain lattice plane, the reflected beam is recorded at an angle 2 theta (2θ). It should be understood that reference herein to specific 2θ values for a specific solid form is intended to mean the 2θ values (in degrees) as measured using the X-ray diffraction experimental conditions as described herein. For example, as described herein, Cu-Kα (Kα1 (Å): 1.540598 and Kα2 (Å): 1.544426 Å) was used as the source of radiation.

As used herein, "1%" refers to the percentage of peak intensity.

The term "differential scanning calorimetry (DSC) graph" as used herein refers to a curve recorded on a differential scanning calorimeter. Unless otherwise specified, the temperature mentioned when describing the characteristic peak in a DSC graph refers to the onset temperature of the peak.

The term "thermogravimetric analysis (TGA) graph" as used herein refers to a curve recorded on a thermogravimetric analyzer.

As used herein, the term "essentially the same" with reference to X-ray diffraction peak positions means that typical peak position and intensity variability are taken into account. For example, one skilled in the art will appreciate that the peak positions (2θ) will show some variability, typically as much as 0.1 to 0.2 degree, as well as on the apparatus being used to measure the diffraction. Further, one skilled in the art will appreciate that relative peak intensities will show inter-apparatus variability as well as variability due to degree of crystallinity, preferred orientation, prepared sample surface, and other factors known to those skilled in the art. Similarly, as used herein, "essentially the same" with reference to the DSC graph is intended to also encompass the variabilities associated with these analytical techniques, which are known to those of skill in the art. For example, a differential scanning calorimetry graph will typically have a variability of up to 0.2° C. for well defined peaks, and even larger for broad lines (e.g., up to ±1° C.).

The liquid nuclear magnetic resonance spectrum in the present application is preferably collected on a Bruker Advance 300 nuclear magnetic resonance spectrometer, with DMSO-d6 as the solvent, unless otherwise stated.

The polarization microscopy data in the present application is preferably collected on Polarizing Microscope ECLIPSE LV100POL (Nikon, JPN).

Numerical ranges (e.g., "1 to 10", "1 to 6", "2 to 10", "2 to 6", "3 to 10", "5 to 10", "3 to 6"), etc. as used herein encompass any point within the numerical range (for example, 1, 2, 3, 4, 5, 6, 7, 8, 9, or 10).

The prepared salt or crystalline form thereof may be recovered by methods including decantation, centrifugation, evaporation, gravity filtration, suction filtration, or any other technique for the recovery of solids under pressure or under reduced pressure. The recovered solid may optionally be dried. "Drying" in the present invention is carried out under reduced pressure (preferably in vacuum) until the residual solvent content is lowered within the limits given in the International Conference on Harmonisation of Technical Requirements for Registration of Pharmaceuticals for Human Use ("ICH") guidelines. The residual solvent content depends on the type of the solvent, but does not exceed about 5000 ppm, or preferably about 4000 ppm, or more preferably about 3000 ppm. Drying may be carried out in a tray dryer, vacuum oven, air oven, cone vacuum dryer, rotary vacuum dryer, fluidized bed dryer, spin flash dryer, flash dryer, or the like. The drying may be carried out at temperatures less than about 100° C., less than about 80° C., less than about 60° C., less than about 50° C., less than about 30° C., or any other suitable temperatures, at atmospheric pressure or under a reduced pressure (preferably in vacuum) for any desired period (e.g., about 1, 2, 3, 5, 10, 15, 20, 24 hours or overnight) until the desired result is achieved, as long as the salt is not degraded in quality. The drying can be carried out any desired times until the desired product quality is achieved. The dried product may optionally be subjected to a size reduction procedure to produce desired particle sizes. Milling or micronization may be performed before drying, or after the completion of drying of the product. Techniques that may be used for particle size reduction include, without limitation, ball, roller and hammer milling, and jet milling.

Salt of Compound A, Crystalline Form Thereof and Preparation Method Therefor

In some embodiments, the present invention provides a salt of compound A,

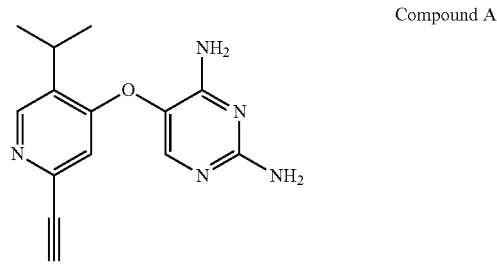 [SMILES: C#Cc1cc(Oc2cnc(N)nc2N)c(C(C)C)cn1]

Compound A which is an inorganic acid salt or an organic acid salt, wherein the inorganic acid is selected from the group consisting of hydrochloric acid, hydrobromic acid, hydroiodic acid, sulfuric acid, nitric acid, boric acid, phosphoric acid and any combination thereof;

the organic acid is selected from the group consisting of formic acid, acetic acid, acetoacetic acid, trifluoroacetic acid, propionic acid, pyruvic acid, butyric acid, caproic acid, heptanoic acid, undecanoic acid, lauric acid, stearic acid, palmitic acid, oxalic acid, malonic acid, succinic acid, glutaric acid, adipic acid, maleic acid, fumaric acid, lactic acid, L-malic acid, citric acid, L-tartaric acid, benzoic acid, salicylic acid, cinnamic acid, naphthoic acid, pamoic acid, niacin, orotic acid, methyl sulfuric acid, dodecyl sulfuric acid, methanesulfonic acid, trifluoromethanesulfonic acid, ethionic acid, isethionic acid, p-toluenesulfonic acid, benzenesulfonic acid, 1,5-naphthalenedisulfonic acid, 2-naphthalenesulfonic acid, camphorsulfonic acid, sulfamic acid, glutamic acid, aspartic acid, gluconic acid, glucuronic acid and any combination thereof.

In a preferred embodiment, the salt is selected from the group consisting of L-tartrate, phosphate, mesylate, maleate, hydrochloride, fumarate, citrate, p-toluenesulfonate and sulfate.

In a preferred embodiment, the present invention provides a salt of compound A, which is compound A hydrochloride;
preferably, the molar ratio of compound A to hydrochloric acid is 1:1;
preferably, the compound A hydrochloride is in crystalline form Ia;
the crystalline form Ia has an XRPD pattern comprising characteristic peaks at diffraction angles (2θ) of about 7.8±0.2°, 10.4±0.2°, 15.7±0.2°, 20.0±0.2°, 20.7±0.2°, 22.3±0.2° and 26.0±0.2°;
preferably comprising characteristic peaks at diffraction angles (2θ) of about 7.8±0.2°, 10.4±0.2°, 11.1±0.2°, 15.7±0.2°, 16.2±0.2°, 20.0±0.2°, 20.7±0.2°, 22.3±0.2°, 23.7±0.2°, 24.7±0.2°, 26.0±0.2° and 28.8±0.2°;
most preferably comprising characteristic peaks at diffraction angles (2θ) of about 7.8±0.2°, 10.4±0.2°, 11.1±0.2°, 14.5±0.2°, 14.7±0.2°, 15.7±0.2°, 16.2±0.2°, 18.0±0.2°, 20.0±0.2°, 20.7±0.2°, 22.3±0.2°, 23.0±0.2°, 23.7±0.2°, 24.7±0.2°, 25.3±0.2°, 26.0±0.2°, 26.4±0.2°, 27.0±0.2°, 28.8±0.2°, 29.7±0.2°, 33.9±0.2° and 38.3±0.2°.

In a more preferred embodiment, the crystalline form Ia has an XRPD pattern comprising peaks at the following diffraction angles (2θ):

| Peak No. | 2θ (°) ± 0.2° | I % |
|---|---|---|
| 1 | 7.8° | 100 |
| 2 | 10.4° | 68.4 |
| 3 | 11.1° | 41.5 |
| 4 | 13.1° | 11.1 |
| 5 | 14.5° | 18.4 |
| 6 | 14.7° | 16.6 |
| 7 | 15.7° | 82.7 |
| 8 | 16.2° | 47.2 |
| 9 | 18.0° | 12.0 |
| 10 | 18.9° | 10.0 |
| 11 | 19.3° | 8.0 |
| 12 | 20.0° | 58.8 |
| 13 | 20.7° | 51.9 |
| 14 | 22.3° | 69.7 |
| 15 | 22.6° | 20.4 |
| 16 | 23.0° | 23.5 |
| 17 | 23.5° | 19.5 |
| 18 | 23.7° | 31.9 |
| 19 | 24.3° | 9.8 |
| 20 | 24.7° | 30.3 |
| 21 | 25.3° | 14.7 |
| 22 | 26.0° | 96.7 |
| 23 | 26.4° | 20.7 |
| 24 | 26.5° | 16.4 |
| 25 | 27.0° | 18.5 |
| 26 | 27.7° | 6.5 |
| 27 | 28.8° | 28.5 |
| 28 | 29.2° | 13.6 |
| 29 | 29.7° | 26.0 |
| 30 | 30.5° | 11.9 |
| 31 | 30.8° | 8.1 |
| 32 | 31.4° | 8.2 |
| 33 | 32.0° | 10.9 |
| 34 | 32.3° | 8.7 |
| 35 | 32.8° | 7.8 |
| 36 | 33.5° | 10.3 |
| 37 | 33.9° | 14.3 |
| 38 | 34.5° | 11.6 |
| 39 | 35.1° | 7.2 |
| 40 | 36.0° | 6.8 |
| 41 | 36.3° | 7.6 |
| 42 | 36.6° | 6.5 |
| 43 | 37.3° | 8.5 |
| 44 | 37.7° | 9.0 |
| 45 | 38.3° | 13.9 |
| 46 | 39.3° | 6.6 |

In a more preferred embodiment, the crystalline form Ia has an XRPD pattern comprising peaks at diffraction angles (2θ) essentially the same as shown in FIG. 1. In the most preferred embodiment, the XRPD peak positions of crystalline form Ia are essentially the same as shown in FIG. 1.

In a more preferred embodiment, the crystalline form Ia has a DSC graph comprising an endothermic peak at about 108° C., and an exothermic peak at about 190° C.

In a more preferred embodiment, in a thermogravimetric analysis, the crystalline form Ia has a weight loss of about 5.6% when heated to about 130° C.

Figure 2:
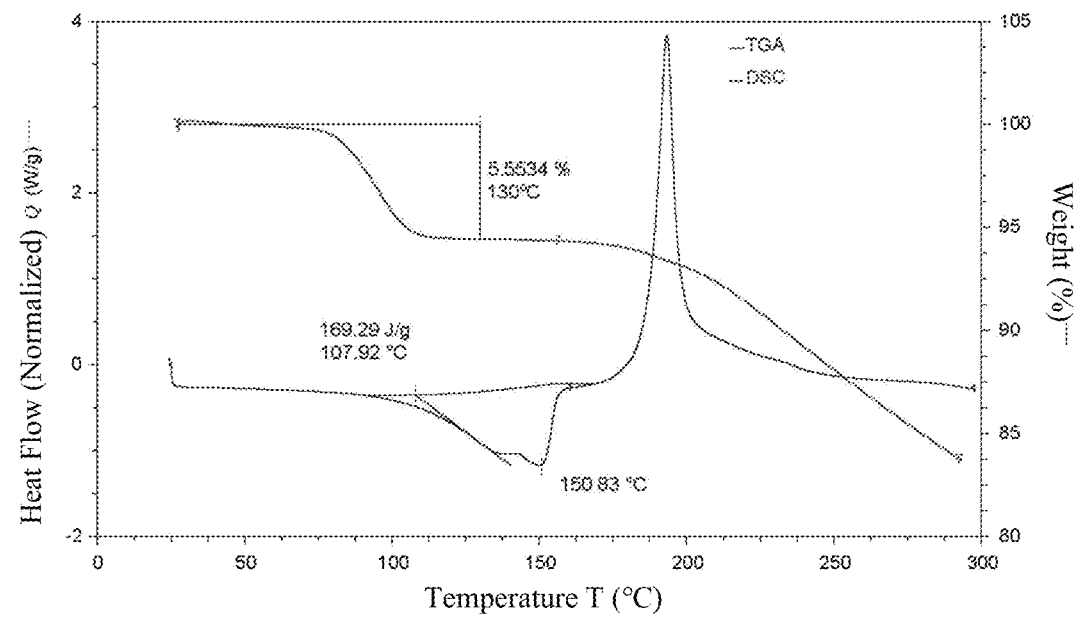
FIG. 2 is a differential scanning calorimetry (DSC) graph and a thermogravimetric analysis (TGA) graph of crystalline form Ia of compound A hydrochloride (molar ratio 1:1).

In a more preferred embodiment, the crystalline form Ia has a DSC-TGA graph comprising characteristic peaks essentially the same as shown in FIG. 2. In the most preferred embodiment, the crystalline form Ia has a DSC-TGA graph essentially the same as shown in FIG. 2.

Figure 3:
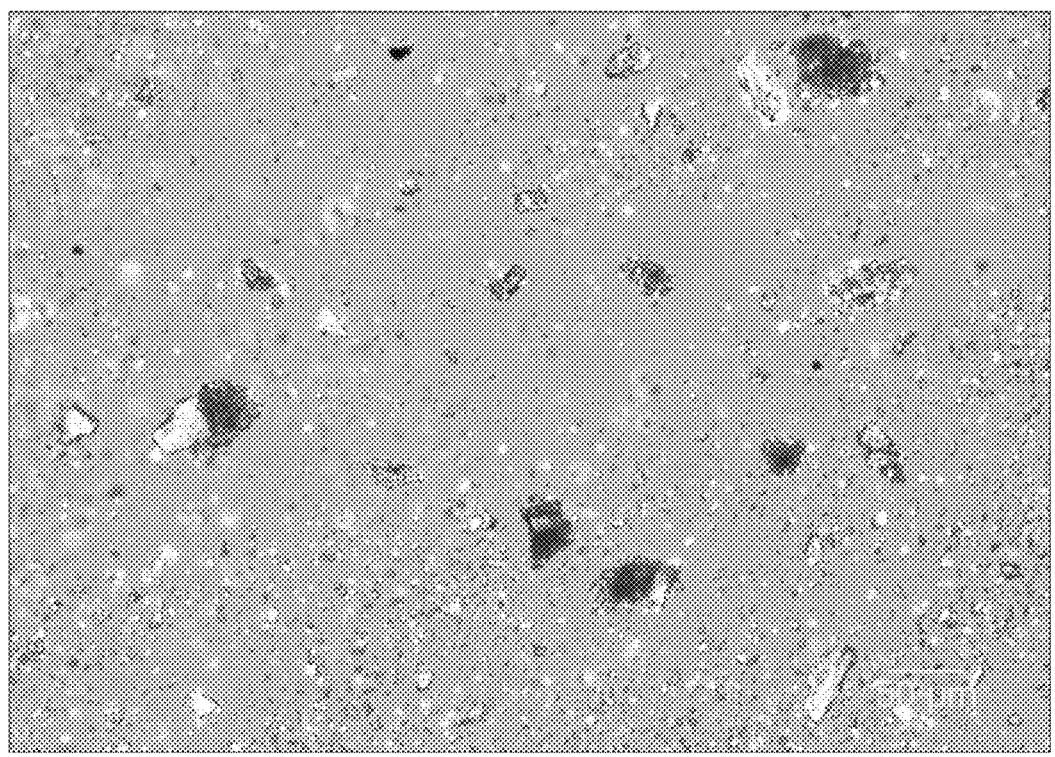
FIG. 3 is a scanning electron microscope image of crystalline form Ia of compound A hydrochloride (molar ratio 1:1).

In a more preferred embodiment, the crystalline form Ia has a scanning electron microscope image essentially the same as shown in FIG. 3.

In some embodiments, the present invention provides a method for preparing crystalline form Ia, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol) or a ketone solvent (e.g., a ketone having 3-6 carbon atoms, including but not limited to acetone, butanone, methyl ethyl ketone, methyl isobutyl ketone and diethyl ketone), heating (for example, heating to 40-80° C., preferably 50° C. or 60° C.) to dissolve compound A, then adding hydrochloric acid (the concentration of hydrochloric acid is 2-15 mol/L, preferably 4 mol/L or 12 mol/L), cooling to room temperature and stirring, filtering and optionally drying to obtain the crystalline form, wherein the molar ratio of compound A to HCl is 1:(1-1.3).

In a preferred embodiment, the present invention provides a salt of compound A, which is compound A hydrochloride;
preferably, the molar ratio of compound A to hydrochloric acid is 1:1;
preferably, the compound A hydrochloride is in crystalline form Ib;
the crystalline form Ib has an XRPD pattern comprising characteristic peaks at diffraction angles (2θ) of about 5.4±0.2°, 11.2±0.2° and 20.0±0.2°;
preferably comprising characteristic peaks at diffraction angles (2θ) of about 5.4±0.2°, 9.5±0.2°, 11.2±0.2°, 13.6±0.2°, 20.0±0.2°, 20.8±0.2°, 24.9±0.2° and 25.5±0.2°; most preferably comprising characteristic peaks at diffraction angles (2θ) of about 5.4±0.2°, 9.5±0.2°, 11.2±0.2°, 13.6±0.2°, 15.7±0.2°, 17.6±0.2°, 20.0±0.2°, 20.8±0.2°, 22.1±0.2°, 23.2±0.2°, 23.6±0.2°, 24.1±0.2°, 24.6±0.2°, 24.9±0.2°, 25.5±0.2° and 30.5±0.2°.

In a more preferred embodiment, the crystalline form Ib has an XRPD pattern comprising peaks at the following diffraction angles (2θ):

| Peak No. | 2θ (°) ± 0.2° | I % |
|---|---|---|
| 1 | 5.4 | 100 |
| 2 | 9.5 | 11.1 |
| 3 | 11.2 | 22.7 |
| 4 | 12.5 | 2.8 |
| 5 | 13.6 | 16.1 |
| 6 | 14.5 | 1.5 |
| 7 | 15.7 | 4.1 |
| 8 | 16.6 | 1.7 |
| 9 | 17.6 | 3.3 |
| 10 | 19.1 | 3.0 |
| 11 | 20.0 | 20.6 |
| 12 | 20.8 | 10.0 |
| 13 | 22.1 | 4.6 |
| 14 | 22.6 | 1.6 |
| 15 | 23.2 | 3.4 |
| 16 | 23.6 | 6.6 |
| 17 | 24.1 | 6.9 |
| 18 | 24.6 | 4.1 |
| 19 | 24.9 | 10.7 |
| 20 | 25.5 | 16.3 |
| 21 | 27.3 | 1.6 |
| 22 | 27.5 | 1.6 |
| 23 | 29.5 | 3.7 |
| 24 | 30.0 | 1.7 |
| 25 | 30.5 | 5.4 |
| 26 | 31.8 | 1.5 |
| 27 | 34.2 | 2.0 |
| 28 | 34.6 | 1.6 |
| 29 | 36.7 | 1.1 |

Figure 4:
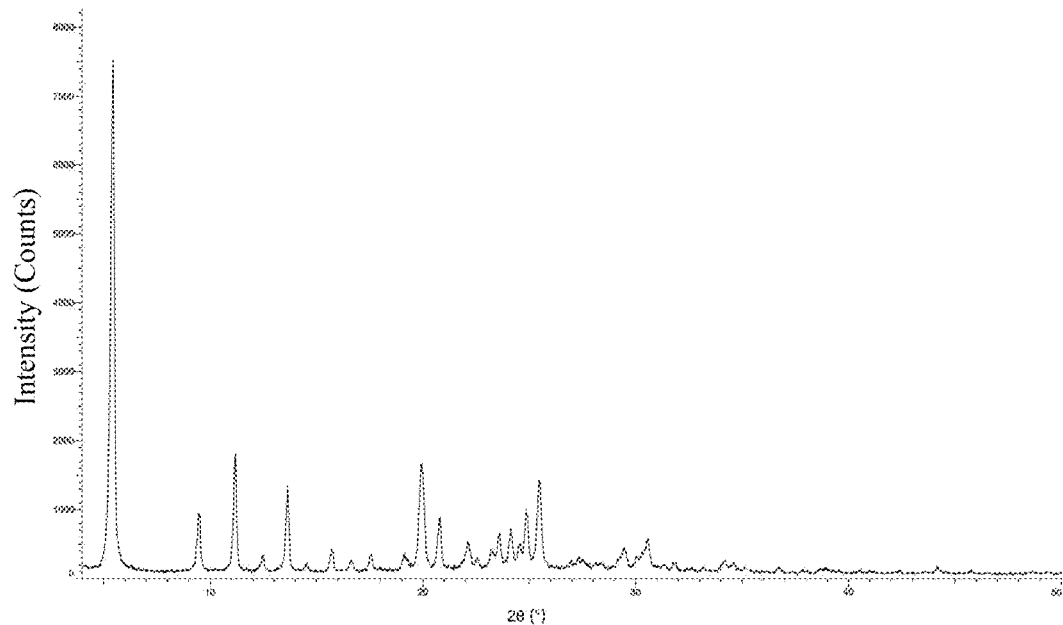
FIG. 4 is an X-ray powder diffraction pattern of crystalline form Ib of compound A hydrochloride (molar ratio 1:1).

In a more preferred embodiment, the crystalline form Tb has an XRPD pattern comprising peaks at diffraction angles (2θ) essentially the same as shown in FIG. 4. In the most preferred embodiment, the XRPD peak positions of crystalline form Tb are essentially the same as shown in FIG. 4.

In a more preferred embodiment, the crystalline form Ib has a DSC graph comprising an exothermic peak at about 207° C.

Figure 5:
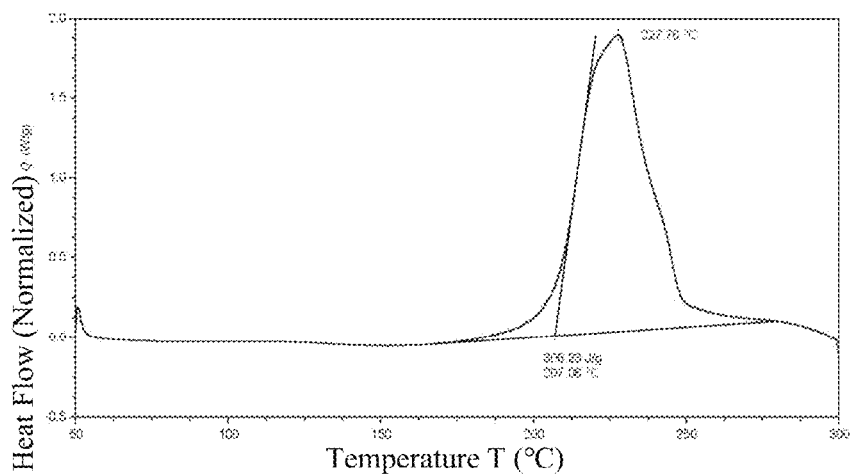
FIG. 5 is a differential scanning calorimetry (DSC) graph of crystalline form Tb of compound A hydrochloride (molar ratio 1:1).

In a more preferred embodiment, the crystalline form Tb has a DSC graph comprising characteristic peaks essentially the same as shown in FIG. 5. In the most preferred embodiment, the crystalline form Tb has a DSC graph essentially the same as shown in FIG. 5.

In a more preferred embodiment, in a thermogravimetric analysis, the crystalline form Tb has a weight loss of about 2.6% when heated to about 167° C.

Figure 6:
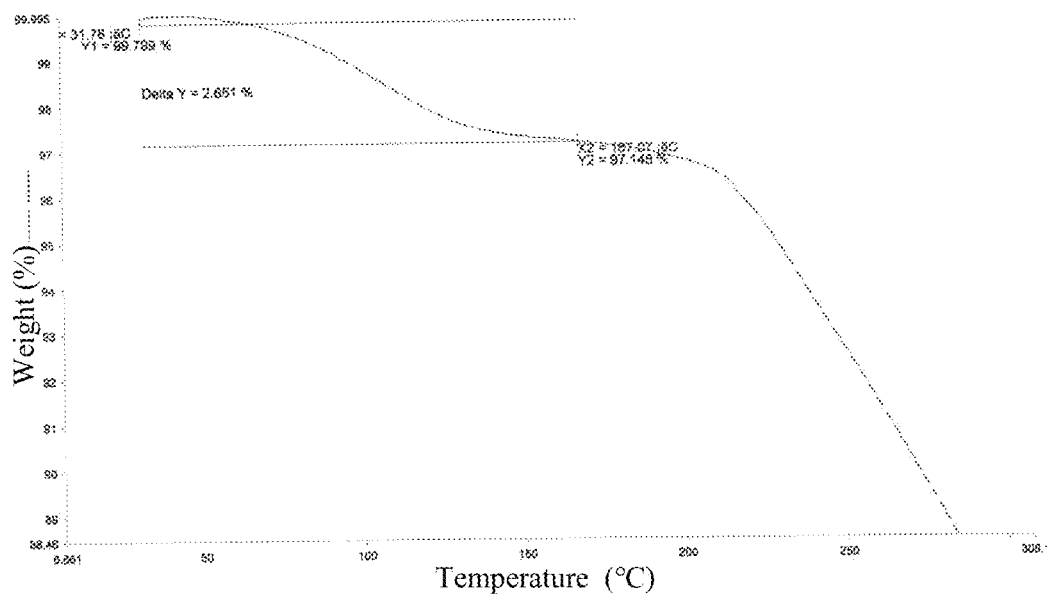
FIG. 6 is a thermogravimetric analysis (TGA) graph of crystalline form Tb of compound A hydrochloride (molar ratio 1:1).

In a more preferred embodiment, the crystalline form Ib has a TGA graph essentially the same as shown in FIG. 6.

In some embodiments, the present invention provides a method for preparing crystalline form Tb, comprising adding compound A to an ester solvent (preferably an ester having 3-10 carbon atoms, including but not limited to ethyl acetate, propyl acetate, isopropyl acetate, ethyl isopropionate, dimethyl carbonate and butyl acetate), heating (for example, heating to 40-80° C., preferably 50° C. or 60° C.) to dissolve compound A, then adding hydrochloric acid (the concentration of hydrochloric acid is 2-15 mol/L, preferably 4 mol/L or 12 mol/L), cooling to room temperature and stirring, filtering and optionally drying to obtain the crystalline form, wherein the molar ratio of compound A to HCl is 1:(1-1.3).

In a preferred embodiment, the present invention provides a salt of compound A, which is compound A hydrochloride;
preferably, the molar ratio of compound A to hydrochloric acid is 1:2;
preferably, the compound A hydrochloride is in crystalline form II;
the crystalline form II has an XRPD pattern comprising characteristic peaks at diffraction angles (2θ) of about 13.3±0.2°, 14.2±0.2°, 21.9±0.2° and 27.4±0.2°;
preferably comprising characteristic peaks at diffraction angles (2θ) of about 8.2±0.2°, 11.9±0.2°, 13.3±0.2°, 14.2±0.2°, 16.0±0.2°, 18.3±0.2°, 19.4±0.2°, 20.0±0.2°, 21.2±0.2°, 21.9±0.2°, 22.9±0.2°, 24.6±0.2°, 26.6±0.2°, 27.4±0.2° and 28.0±0.2°;
most preferably comprising characteristic peaks at diffraction angles (2θ) of about 8.2±0.2°, 11.9±0.2°, 13.3±0.2°, 14.2±0.2°, 14.8±0.2°, 16.0±0.2°, 17.8±0.2°, 18.3±0.2°, 19.4±0.2°, 20.0±0.2°, 21.2±0.2°, 21.9±0.2°, 22.6±0.2°, 22.9±0.2°, 23.5±0.2°, 24.6±0.2°, 25.6±0.2°, 26.6±0.2°, 27.4±0.2°, 28.0±0.2°, 29.7±0.2°, 31.8±0.2° and 34.0±0.2°.

In a more preferred embodiment, the crystalline form II has an XRPD pattern comprising peaks at the following diffraction angles (2θ):

| Peak No. | 2θ (°) ± 0.2° | I % |
|---|---|---|
| 1 | 7.2° | 15.1 |
| 2 | 8.2° | 32.7 |
| 3 | 9.1° | 15.0 |
| 4 | 10.5° | 16.2 |
| 5 | 11.9° | 30.3 |
| 6 | 13.3° | 67.9 |
| 7 | 14.2° | 51.1 |
| 8 | 14.8° | 18.5 |
| 9 | 15.6° | 10.4 |
| 10 | 16.0° | 32.3 |
| 11 | 16.6° | 9.5 |
| 12 | 17.8° | 15.0 |
| 13 | 18.3° | 33.8 |
| 14 | 19.4° | 44.8 |
| 15 | 20.0° | 36.1 |
| 16 | 20.6° | 14.1 |
| 17 | 21.2° | 35.4 |
| 18 | 21.6° | 19.2 |
| 19 | 21.9° | 100 |
| 20 | 22.6° | 25.5 |
| 21 | 22.9° | 34.5 |
| 22 | 23.5° | 29.4 |
| 23 | 23.8° | 25.3 |
| 24 | 24.0° | 18.9 |
| 25 | 24.6° | 35.0 |
| 26 | 24.9° | 14.9 |
| 27 | 25.6° | 20.4 |
| 28 | 26.3° | 26.3 |
| 29 | 26.6° | 49.3 |
| 30 | 27.0° | 33.6 |
| 31 | 27.4° | 72.9 |
| 32 | 28.0° | 32.4 |
| 33 | 28.4° | 14.9 |
| 34 | 28.7° | 12.7 |
| 35 | 29.4° | 21.4 |
| 36 | 29.7° | 23.6 |
| 37 | 30.0° | 13.3 |
| 38 | 30.7° | 13.1 |
| 39 | 30.9° | 13.4 |
| 40 | 31.8° | 28.1 |
| 41 | 32.5° | 14.6 |
| 42 | 32.9° | 14.4 |
| 43 | 33.4° | 10.6 |
| 44 | 34.0° | 23.4 |
| 45 | 34.6° | 10.2 |
| 46 | 35.0° | 12.2 |
| 47 | 35.7° | 11.8 |
| 48 | 36.1° | 11.6 |
| 49 | 37.0° | 13.4 |
| 50 | 38.6° | 8.8 |
| 51 | 39.5° | 7.8 |

Figure 7:
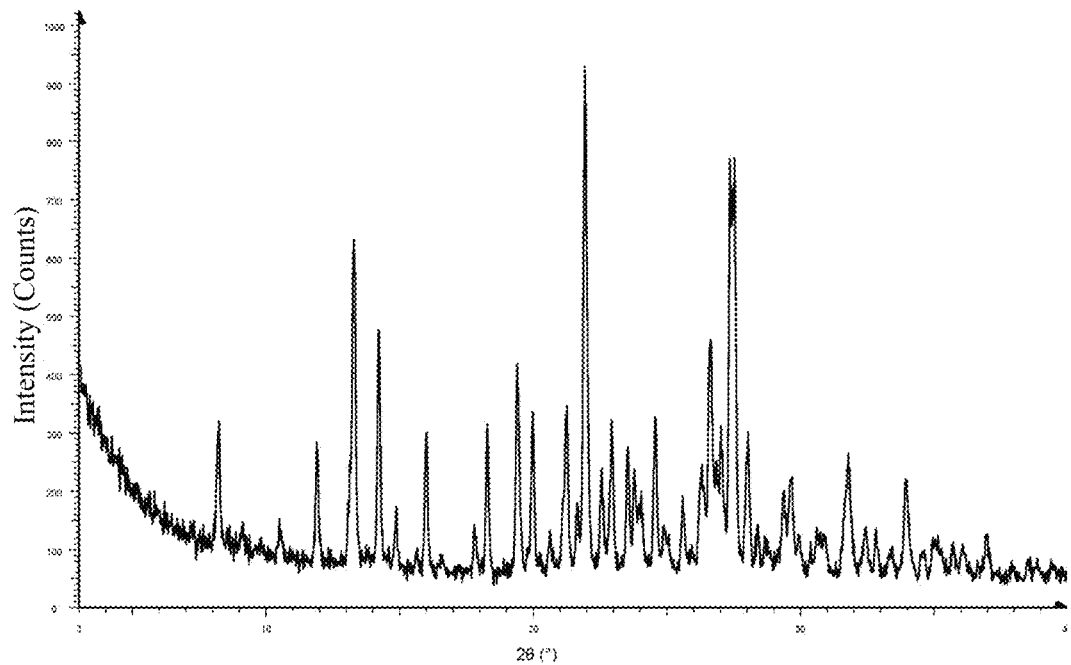
FIG. 7 is an X-ray powder diffraction pattern of crystalline form II of compound A hydrochloride (molar ratio 1:2).

In a more preferred embodiment, the crystalline form II has an XRPD pattern comprising peaks at diffraction angles (2θ) essentially the same as shown in FIG. 7. In the most preferred embodiment, the XRPD peak positions of crystalline form II are essentially the same as shown in FIG. 7.

In a more preferred embodiment, the crystalline form II has a DSC graph comprising an endothermic peak at about 40° C.

In a more preferred embodiment, in a thermogravimetric analysis, the crystalline form II has a weight loss of about 0.9% when heated to about 180° C.

Figure 8:
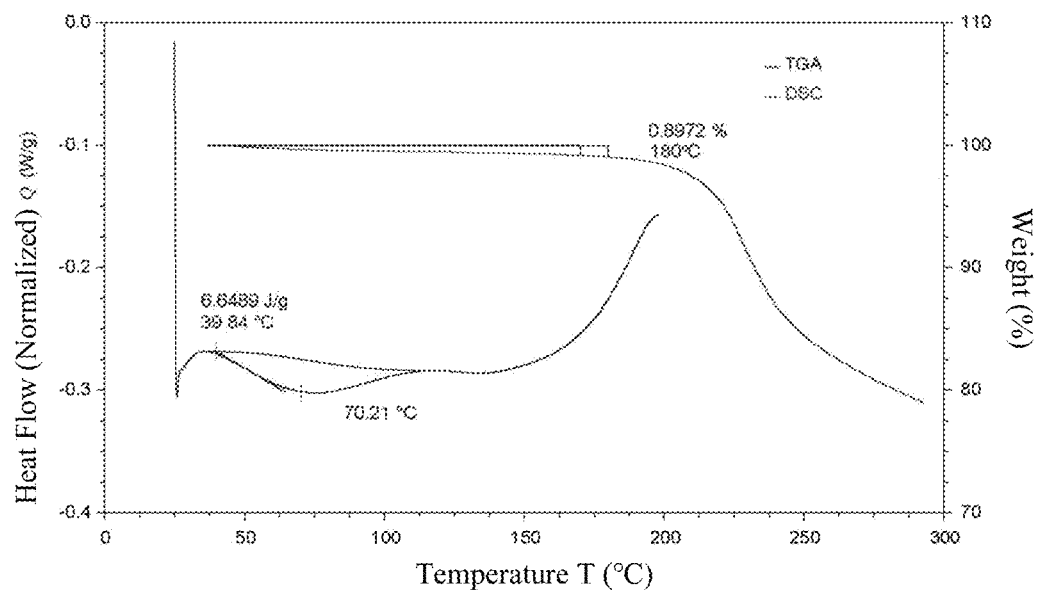
FIG. 8 is a differential scanning calorimetry (DSC) graph and a thermogravimetric analysis (TGA) graph of crystalline form II of compound A hydrochloride (molar ratio 1:2).

In a more preferred embodiment, the crystalline form II has a DSC-TGA graph comprising characteristic peaks essentially the same as shown in FIG. 8. In the most preferred embodiment, the crystalline form II has a DSC-TGA graph essentially the same as shown in FIG. 8.

In some embodiments, the present invention provides a method for preparing crystalline form II, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 50° C. or 60° C.) to dissolve compound A, then adding hydrochloric acid (the concentration of hydrochloric acid is 2-15 mol/L, preferably 4 mol/L or 12 mol/L), cooling to room temperature and stirring, filtering and optionally drying to obtain the crystalline form, wherein the molar ratio of compound A to HCl is 1:(2-2.5).

In a preferred embodiment, the present invention provides a salt of compound A, which is compound A citrate;
preferably, the molar ratio of compound A to citric acid is 1:0.5;
preferably, the compound A citrate is in crystalline form III;
the crystalline form III has an XRPD pattern comprising characteristic peaks at diffraction angles (2θ) of about 6.9±0.2°, 10.8±0.2°, 14.6±0.2°, 20.3±0.2° and 22.5±0.2°;
preferably comprising characteristic peaks at diffraction angles (2θ) of about 6.9±0.2°, 10.8±0.2°, 14.6±0.2°, 16.3±0.2°, 20.3±0.2°, 22.5±0.2°, 23.4±0.2° and 26.6±0.2°;
most preferably comprising characteristic peaks at diffraction angles (2θ) of about 6.9±0.2°, 10.8±0.2°, 12.7±0.2°, 14.6±0.2°, 16.3±0.2°, 17.6±0.2°, 18.1±0.2°, 20.3±0.2°, 21.4±0.2°, 22.5±0.2°, 23.4±0.2°, 24.2±0.2°, 25.5±0.2°, 26.0±0.2°, 26.6±0.2° and 27.1±0.2°.

In a more preferred embodiment, the crystalline form III has an XRPD pattern comprising peaks at the following diffraction angles (2θ):

| Peak No. | 2θ (°) ± 0.2° | I % |
| --- | --- | --- |
| 1 | 6.9° | 100 |
| 2 | 10.2° | 13.3 |
| 3 | 10.8° | 87.2 |
| 4 | 12.4° | 15.0 |
| 5 | 12.7° | 22.1 |
| 6 | 13.9° | 11.3 |
| 7 | 14.6° | 46.3 |
| 8 | 14.8° | 26.1 |
| 9 | 15.1° | 13.0 |
| 10 | 16.3° | 29.2 |
| 11 | 17.6° | 10.9 |
| 12 | 18.1° | 15.1 |
| 13 | 18.7° | 7.9 |
| 14 | 20.3° | 58.0 |
| 15 | 21.4° | 19.9 |
| 16 | 22.5° | 48.1 |
| 17 | 23.4° | 39.4 |
| 18 | 24.2° | 18.1 |
| 19 | 25.5° | 16.8 |
| 20 | 26.0° | 18.9 |
| 21 | 26.6° | 31.5 |
| 22 | 27.1° | 12.9 |
| 23 | 30.7° | 8.6 |
| 24 | 34.0° | 7.3 |
| 25 | 35.1° | 9.4 |
| 26 | 37.1° | 8.9 |
| 27 | 38.8° | 7.6 |

Figure 9:
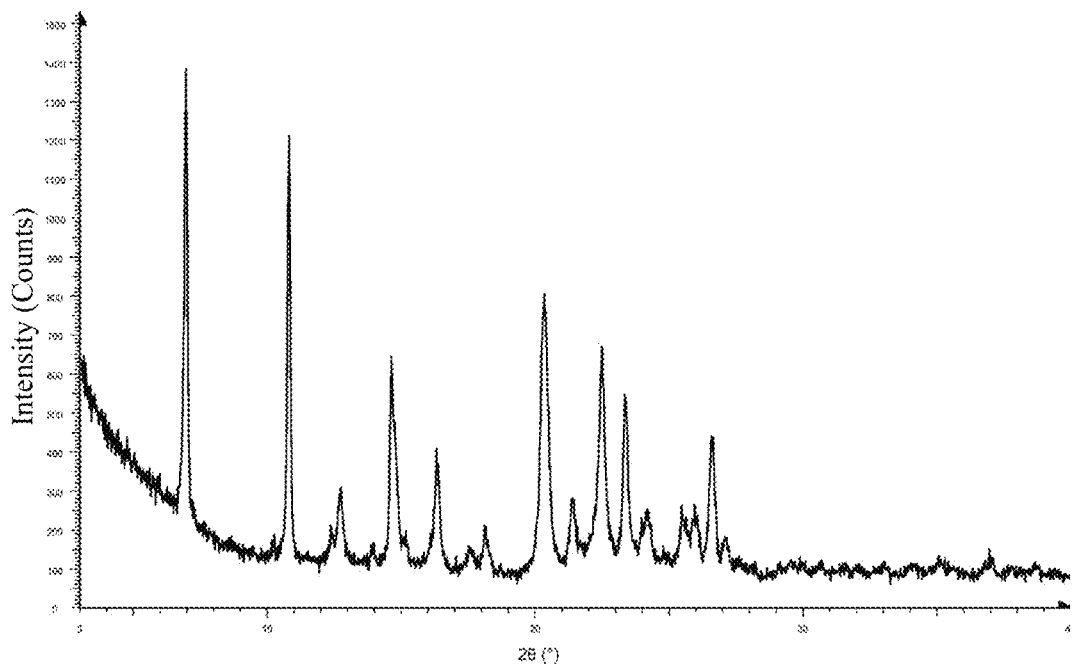
FIG. 9 is an X-ray powder diffraction pattern of crystalline form III of compound A citrate (molar ratio 1:0.5).

In a more preferred embodiment, the crystalline form III has an XRPD pattern comprising peaks at diffraction angles (2θ) essentially the same as shown in FIG. 9. In the most preferred embodiment, the XRPD peak positions of crystalline form III are essentially the same as shown in FIG. 9.

In a more preferred embodiment, the crystalline form III has a DSC graph comprising an endothermic peak at about 117° C.

In a more preferred embodiment, in a thermogravimetric analysis, the crystalline form III has a weight loss of about 2.9% when heated to about 150° C.

Figure 10:
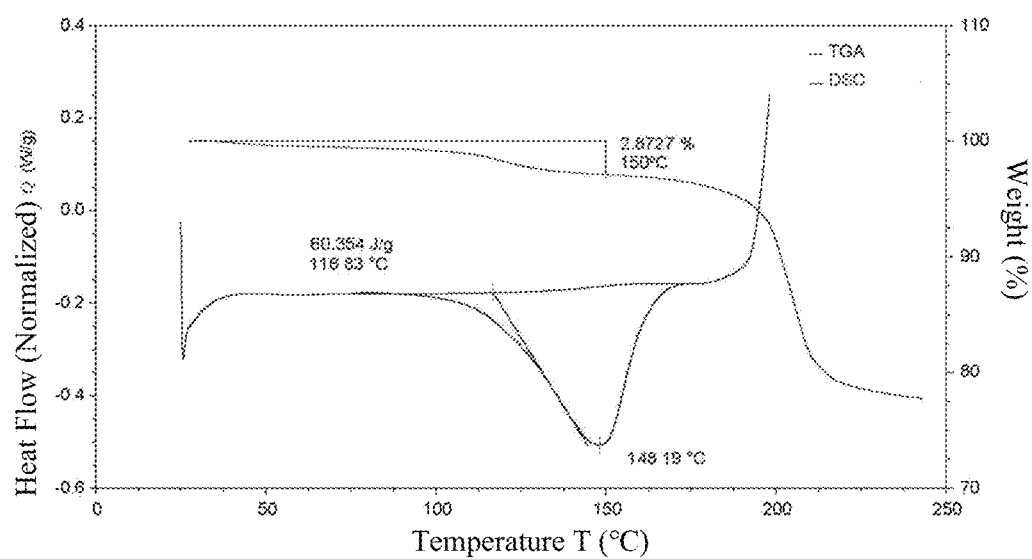
FIG. 10 is a differential scanning calorimetry (DSC) graph and a thermogravimetric analysis (TGA) graph of crystalline form III of compound A citrate (molar ratio 1:0.5).

In a more preferred embodiment, the crystalline form III has a DSC-TGA graph comprising characteristic peaks essentially the same as shown in FIG. 10. In the most preferred embodiment, the crystalline form III has a DSC-TGA graph essentially the same as shown in FIG. 10.

Figure 11:
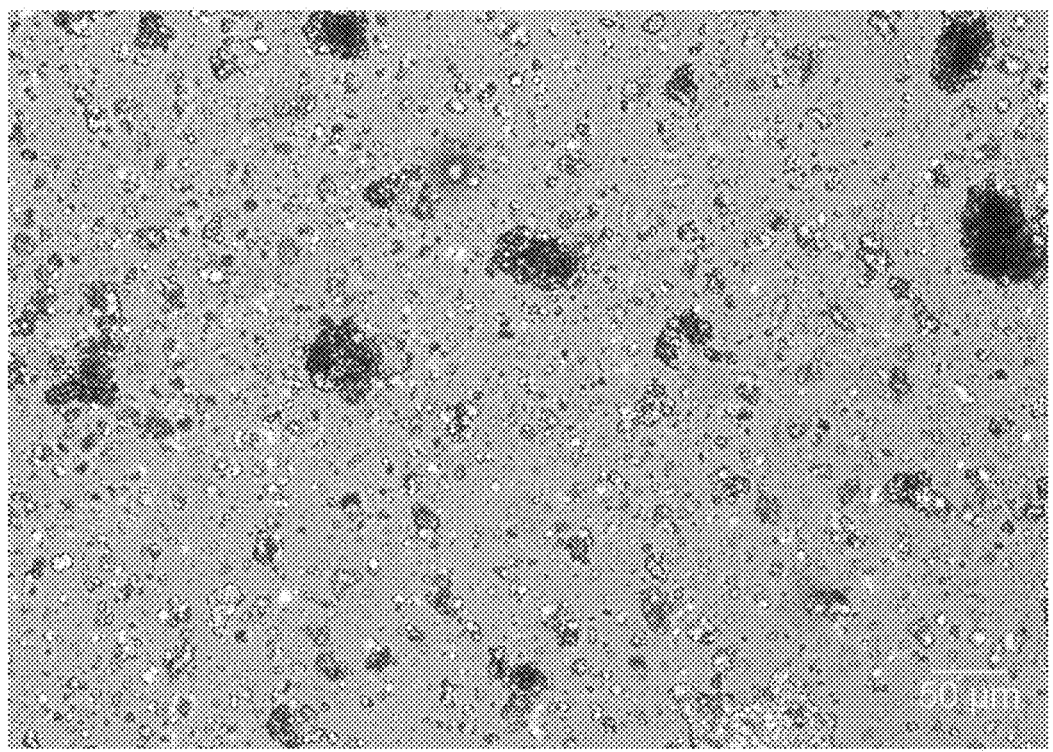
FIG. 11 is a scanning electron microscope image of crystalline form III of compound A citrate (molar ratio 1:0.5).

In a more preferred embodiment, the crystalline form III has a scanning electron microscope image essentially the same as shown in FIG. 11.

In some embodiments, the present invention provides a method for preparing crystalline form III, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 50° C. or 60° C.) to dissolve compound A, then adding citric acid (preferably, a solution of citric acid in methanol or ethanol), cooling to room temperature and stirring, filtering and optionally drying to obtain the crystalline form, wherein the molar ratio of compound A to citric acid is 1:(1-1.3).

In a preferred embodiment, the present invention provides a salt of compound A, which is compound A sulfate;
preferably, the molar ratio of compound A to sulfuric acid is 1:0.5;
preferably, the compound A sulfate is in crystalline form IV;
the crystalline form IV has an XRPD pattern comprising characteristic peaks at diffraction angles (2θ) of about 8.0±0.2°, 11.2±0.2°, 20.9±0.2°, 21.8±0.2° and 26.3±0.2°;
preferably comprising characteristic peaks at diffraction angles (2θ) of about 8.0±0.2°, 10.5±0.2°, 11.2±0.2°, 20.9±0.2°, 21.8±0.2°, 22.5±0.2°, 23.8±0.2° and 26.3±0.2°;
most preferably comprising characteristic peaks at diffraction angles (2θ) of about 8.0±0.2°, 10.5±0.2°, 11.2±0.2°, 13.2±0.2°, 15.3±0.2°, 15.9±0.2°, 16.8±0.2°, 19.0±0.2°, 20.9±0.2°, 21.8±0.2°, 22.5±0.2°, 23.8±0.2°, 24.9±0.2°, 26.3±0.2°, 28.3±0.2°, 29.1±0.2°, 30.1±0.2° and 37.9±0.2°.

In a more preferred embodiment, the crystalline form IV has an XRPD pattern comprising peaks at the following diffraction angles (2θ):

| Peak No. | 2θ (°) ± 0.2° | I % |
| --- | --- | --- |
| 1 | 8.0° | 85.1 |
| 2 | 10.5° | 33.4 |
| 3 | 11.2° | 65.7 |
| 4 | 13.2° | 15.9 |
| 5 | 15.3° | 16.9 |
| 6 | 15.9° | 14.7 |
| 7 | 16.8° | 13.7 |
| 8 | 19.0° | 13.7 |
| 9 | 20.9° | 39.9 |
| 10 | 21.8° | 100 |
| 11 | 22.5° | 38.7 |
| 12 | 23.5° | 18.2 |
| 13 | 23.8° | 37.3 |
| 14 | 24.9° | 30.0 |
| 15 | 26.3° | 41.2 |
| 16 | 28.3° | 14.8 |
| 17 | 29.1° | 14.1 |
| 18 | 30.1° | 29.0 |
| 19 | 31.0° | 8.7 |
| 20 | 31.9° | 10.3 |
| 21 | 32.2° | 9.4 |
| 22 | 33.9° | 11.3 |
| 23 | 35.6° | 6.5 |
| 24 | 37.3° | 7.1 |
| 25 | 37.9° | 12.0 |
| 26 | 38.7° | 6.2 |

Figure 12:
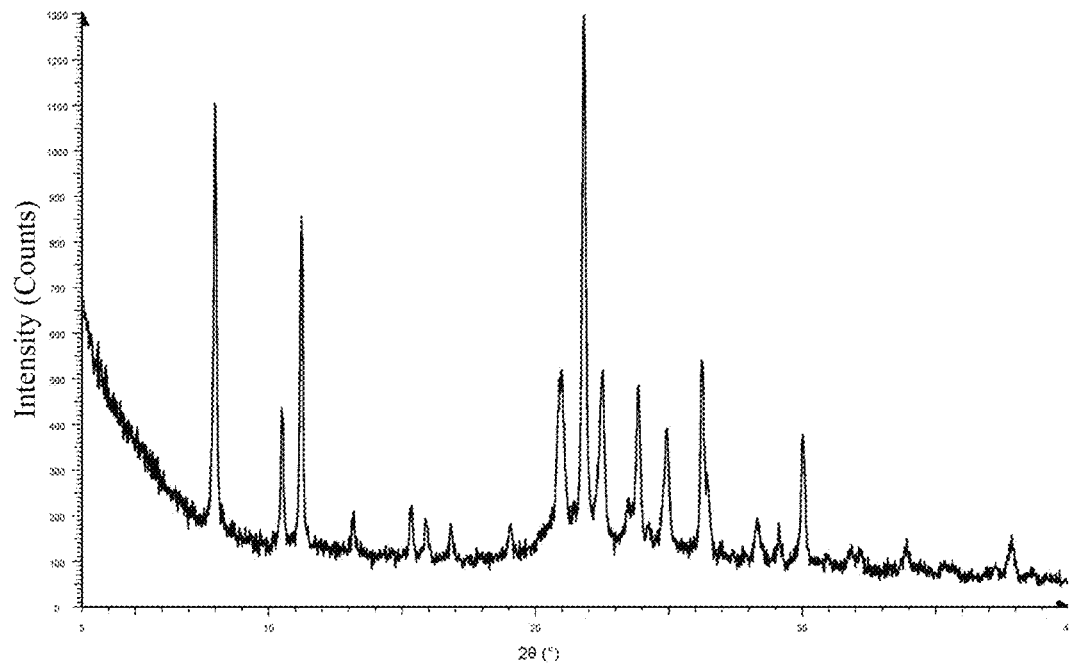
FIG. 12 is an X-ray powder diffraction pattern of crystalline form IV of compound A sulfate (molar ratio 1:0.5).

In a more preferred embodiment, the crystalline form IV has an XRPD pattern comprising peaks at diffraction angles (2θ) essentially the same as shown in FIG. 12. In the most preferred embodiment, the XRPD peak positions of crystalline form IV are essentially the same as shown in FIG. 12.

In a more preferred embodiment, the crystalline form IV has a DSC graph comprising an endothermic peak at about 41° C.

In a more preferred embodiment, in a thermogravimetric analysis, the crystalline form IV has a weight loss of about 2.1% when heated to about 150° C.

Figure 13:
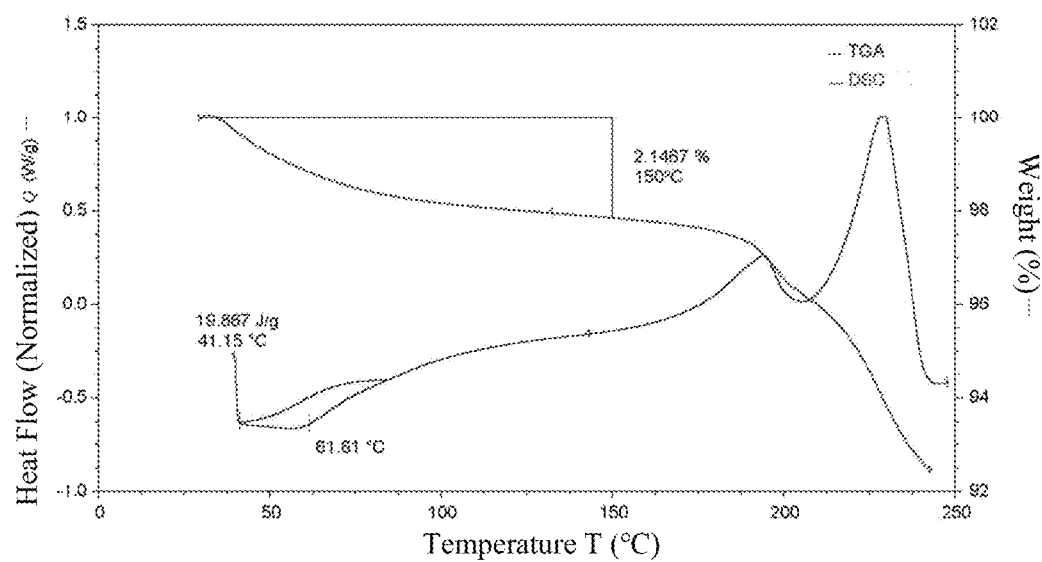
FIG. 13 is a differential scanning calorimetry (DSC) graph and a thermogravimetric analysis (TGA) graph of crystalline form IV of compound A sulfate (molar ratio 1:0.5).

In a more preferred embodiment, the crystalline form IV has a DSC-TGA graph comprising characteristic peaks essentially the same as shown in FIG. 13. In the most preferred embodiment, the crystalline form IV has a DSC-TGA graph essentially the same as shown in FIG. 13.

In some embodiments, the present invention provides a method for preparing crystalline form IV, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 55° C. or 60° C.) to dissolve compound A, then adding sulfuric acid (e.g., a solution of sulfuric acid in methanol or ethanol), cooling to room temperature and stirring, filtering and optionally drying to obtain the crystalline form, wherein the molar ratio of compound A to sulfuric acid is 1:(0.4-0.6), preferably 1:0.5.

In a preferred embodiment, the present invention provides a salt of compound A, which is compound A sulfate;
  preferably, the molar ratio of compound A to sulfuric acid is 1:1;
  preferably, the compound A sulfate is in crystalline form V;
  the crystalline form V has an XRPD pattern comprising characteristic peaks at diffraction angles (2θ) of about 7.9±0.2°, 11.2±0.2°, 20.3±0.2°, 21.7±0.2° and 26.3±0.2°;
  preferably comprising characteristic peaks at diffraction angles (2θ) of about 7.9±0.2°, 11.2±0.2°, 20.3±0.2°, 21.7±0.2°, 22.5±0.2°, 23.7±0.2°, 24.8±0.2° and 26.3±0.2°;
  most preferably comprising characteristic peaks at diffraction angles (2θ) of about 7.9±0.2°, 10.4±0.2°, 11.2±0.2°, 13.1±0.2°, 15.1±0.2°, 15.7±0.2°, 15.9±0.2°, 16.6±0.2°, 18.9±0.2°, 20.3±0.2°, 21.0±0.2°, 21.7±0.2°, 22.5±0.2°, 23.7±0.2°, 24.3±0.2°, 24.8±0.2°, 26.3±0.2°, 28.2±0.2°, 29.1±0.2°, 30.1±0.2° and 37.9±0.2°.

In a more preferred embodiment, the crystalline form V has an XRPD pattern comprising peaks at the following diffraction angles (2θ):

| Peak No. | 2θ (°) ± 0.2° | I % |
| --- | --- | --- |
| 1 | 7.9° | 100 |
| 2 | 10.4° | 18.4 |
| 3 | 11.2° | 50.6 |
| 4 | 12.7° | 6.5 |
| 5 | 13.1° | 10.4 |
| 6 | 15.1° | 10.2 |
| 7 | 15.7° | 11.0 |
| 8 | 15.9° | 10.5 |
| 9 | 16.6° | 15.9 |
| 10 | 18.9° | 10.0 |
| 11 | 20.3° | 35.8 |
| 12 | 21.0° | 14.6 |
| 13 | 21.7° | 94.8 |
| 14 | 22.5° | 28.1 |
| 15 | 23.3° | 14.2 |
| 16 | 23.7° | 22.7 |
| 17 | 24.3° | 14.2 |
| 18 | 24.8° | 24.3 |
| 19 | 26.3° | 39.7 |
| 20 | 28.2° | 14.7 |
| 21 | 29.1° | 10.6 |
| 22 | 30.1° | 26.0 |
| 23 | 31.8° | 8.9 |
| 24 | 32.3° | 11.2 |
| 25 | 34.0° | 8.7 |
| 26 | 35.5° | 7.1 |
| 27 | 37.3° | 5.6 |
| 28 | 37.9° | 10.3 |

Figure 14:
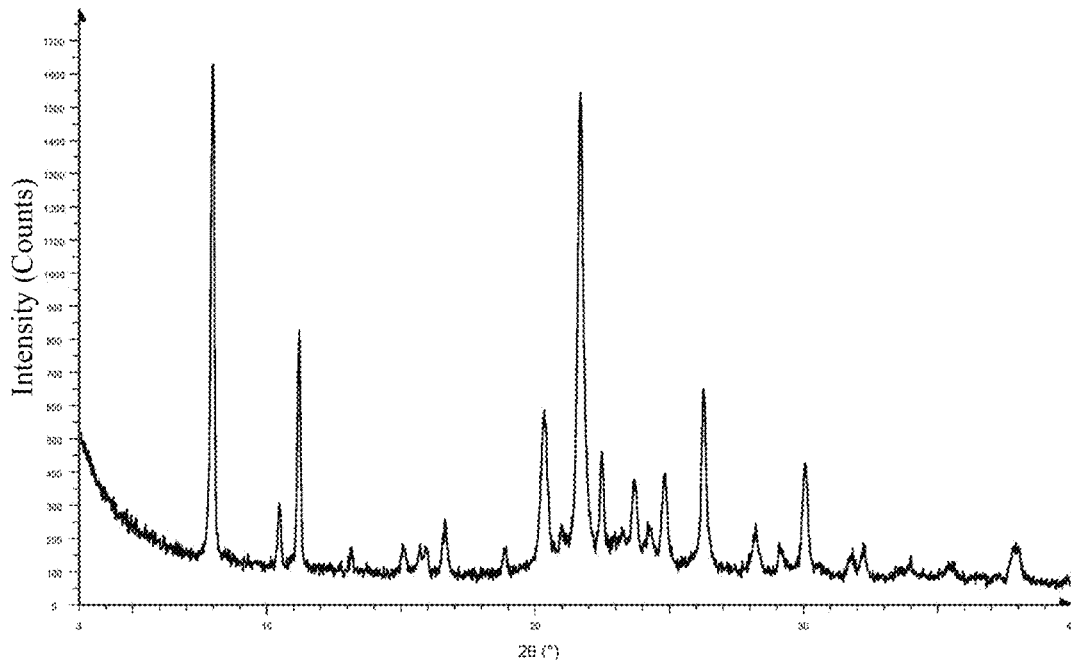
FIG. 14 is an X-ray powder diffraction pattern of crystalline form V of compound A sulfate (molar ratio 1:1).

In a more preferred embodiment, the crystalline form V has an XRPD pattern comprising peaks at diffraction angles (2θ) essentially the same as shown in FIG. 14. In the most preferred embodiment, the XRPD peak positions of crystalline form V are essentially the same as shown in FIG. 14.

In a more preferred embodiment, the crystalline form V has a DSC graph comprising an endothermic peak at about 35° C.

In a more preferred embodiment, in a thermogravimetric analysis, the crystalline form V has a weight loss of about 0.8% when heated to about 150° C.

Figure 15:
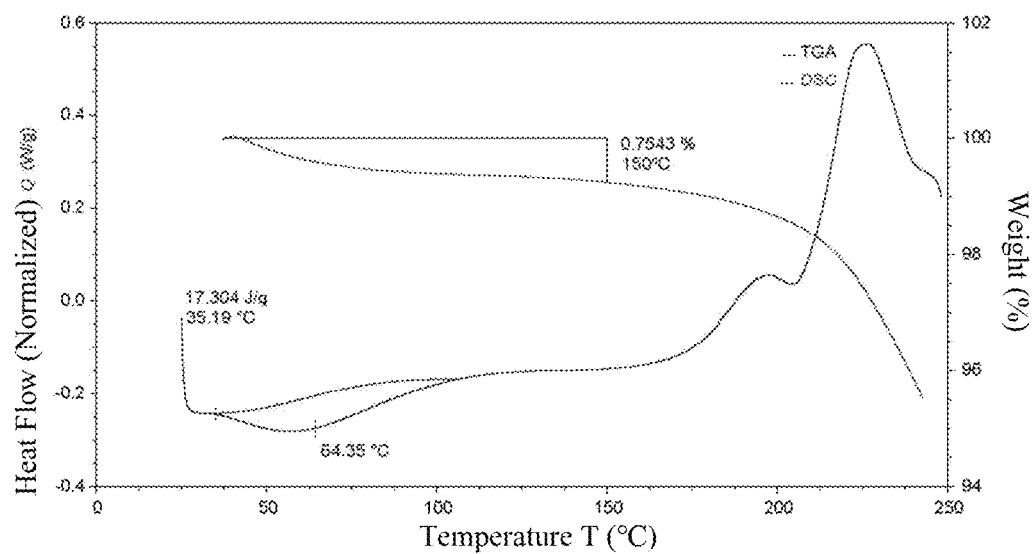
FIG. 15 is a differential scanning calorimetry (DSC) graph and a thermogravimetric analysis (TGA) graph of crystalline form V of compound A sulfate (molar ratio 1:1).

In a more preferred embodiment, the crystalline form V has a DSC-TGA graph comprising characteristic peaks essentially the same as shown in FIG. 15. In the most preferred embodiment, the crystalline form V has a DSC-TGA graph essentially the same as shown in FIG. 15.

In some embodiments, the present invention provides a method for preparing crystalline form V, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 55° C. or 60° C.) to dissolve compound A, then adding sulfuric acid (e.g., a solution of sulfuric acid in methanol or ethanol), cooling to room temperature and stirring, filtering and optionally drying to obtain the crystalline form, wherein the molar ratio of compound A to sulfuric acid is 1:(1-1.3), preferably about 1:1.

In a preferred embodiment, the present invention provides a salt of compound A, which is compound A p-toluenesulfonate;
  preferably, the molar ratio of compound A to p-toluenesulfonic acid is 1:1;
  preferably, the compound A p-toluenesulfonate is in crystalline form VI;
  the crystalline form VI has an XRPD pattern comprising characteristic peaks at diffraction angles (2θ) of about 9.2±0.2°, 10.8±0.2°, 18.0±0.2° and 19.5±0.2°;
  preferably comprising characteristic peaks at diffraction angles (2θ) of about 9.2±0.2°, 10.8±0.2°, 17.7±0.2°, 18.0±0.2°, 18.5±0.2°, 19.5±0.2°, 20.4±0.2°, 21.7±0.2°, 21.9±0.2°, 23.6±0.2° and 28.6±0.2°;
  comprising characteristic peaks at diffraction angles (2θ) of about 9.2±0.2°, 10.8±0.2°, 14.9±0.2°, 15.4±0.2°, 17.7±0.2°, 18.0±0.2°, 18.5±0.2°, 19.5±0.2°, 20.4±0.2°, 21.2±0.2°, 21.7±0.2°, 21.9±0.2°, 23.6±0.2°, 24.5±0.2°, 26.2±0.2°, 28.6±0.2°, 32.1±0.2° and 32.7±0.2°.

In a more preferred embodiment, the crystalline form VI has an XRPD pattern comprising peaks at the following diffraction angles (2θ):

| Peak No. | 2θ (°) ± 0.2° | I % |
|---|---|---|
| 1 | 5.1° | 12.6 |
| 2 | 9.2° | 41.7 |
| 3 | 10.8° | 51.5 |
| 4 | 14.9° | 25.7 |
| 5 | 15.4° | 25.9 |
| 6 | 15.7° | 8.8 |
| 7 | 16.3° | 8.8 |
| 8 | 17.7° | 34.1 |
| 9 | 18.0° | 46.5 |
| 10 | 18.5° | 28.5 |
| 11 | 19.5° | 100 |
| 12 | 20.4° | 28.2 |
| 13 | 21.2° | 25.5 |
| 14 | 21.7° | 35.8 |
| 15 | 21.9° | 34.8 |
| 16 | 23.1° | 11.0 |
| 17 | 23.6° | 33.9 |
| 18 | 24.0° | 14.9 |
| 19 | 24.5° | 26.6 |
| 20 | 25.8° | 10.0 |
| 21 | 26.2° | 23.0 |
| 22 | 27.6° | 10.7 |
| 23 | 28.0° | 12.6 |
| 24 | 28.6° | 45.0 |
| 25 | 29.6° | 8.1 |
| 26 | 30.4° | 7.2 |
| 27 | 30.8° | 6.5 |
| 28 | 31.6° | 6.5 |
| 29 | 32.1° | 10.1 |
| 30 | 32.7° | 11.0 |
| 31 | 33.3° | 7.2 |
| 32 | 33.7° | 6.5 |
| 33 | 34.6° | 4.3 |
| 34 | 35.9° | 5.4 |
| 35 | 36.6° | 5.6 |
| 36 | 37.9° | 6.5 |
| 37 | 39.0° | 5.0 |
| 38 | 39.6° | 6.5 |

Figure 16:
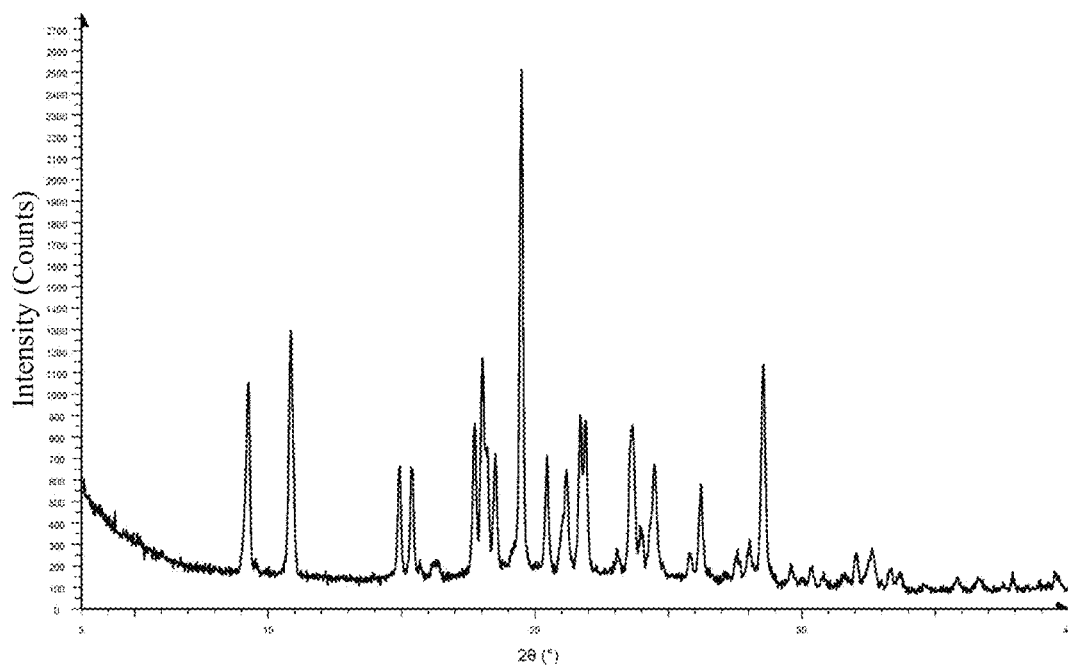
FIG. 16 is an X-ray powder diffraction pattern of crystalline form VI of compound A p-toluenesulfonate (molar ratio 1:1).

In a more preferred embodiment, the crystalline form VI has an XRPD pattern comprising peaks at diffraction angles (2θ) essentially the same as shown in FIG. 16. In the most preferred embodiment, the XRPD peak positions of crystalline form VI are essentially the same as shown in FIG. 16.

In a more preferred embodiment, the crystalline form VI has a DSC graph comprising an endothermic peak at about 36° C.

In a more preferred embodiment, in a thermogravimetric analysis, the crystalline form VI has a weight loss of about 3% when heated to about 180° C.

Figure 17:
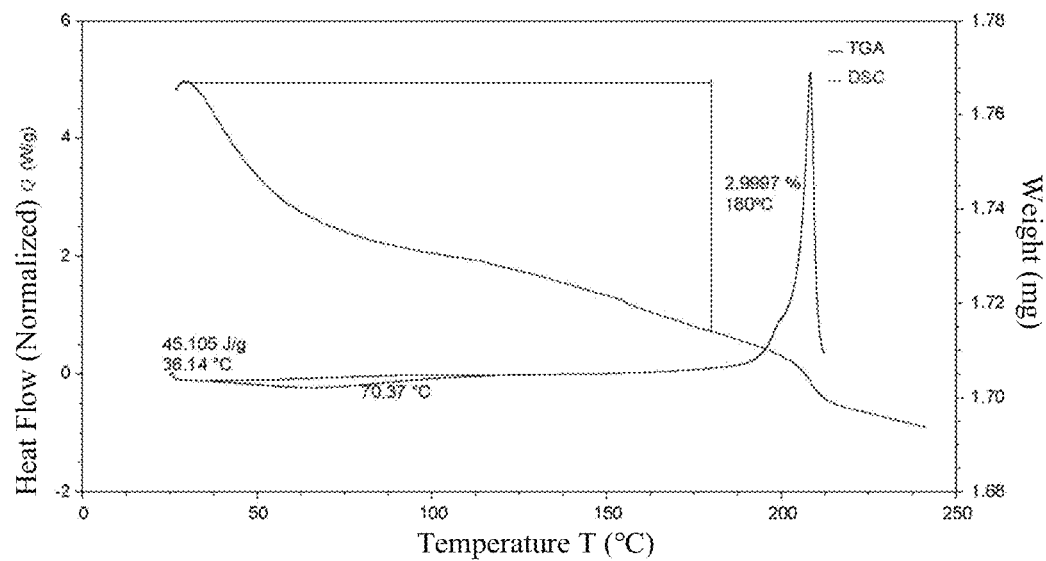
FIG. 17 is a differential scanning calorimetry (DSC) graph and a thermogravimetric analysis (TGA) graph of crystalline form VI of compound A p-toluenesulfonate (molar ratio 1:1).

In a more preferred embodiment, the crystalline form VI has a DSC-TGA graph comprising characteristic peaks essentially the same as shown in FIG. 17. In the most preferred embodiment, the crystalline form VI has a DSC-TGA graph essentially the same as shown in FIG. 17.

In some embodiments, the present invention provides a method for preparing crystalline form VI, comprising adding compound A to a ketone solvent (e.g., a ketone having 3-6 carbon atoms, including but not limited to acetone, butanone, methyl ethyl ketone, methyl isobutyl ketone and diethyl ketone), heating (for example, heating to 40-80° C., preferably 50° C. or 60° C.) to dissolve compound A, then adding p-toluenesulfonic acid (e.g., a solution of p-toluenesulfonic acid in methanol or ethanol) to obtain a reactant solution, which is optionally concentrated to dryness and once again added with the above-mentioned ketone solvent, cooling the resulting solution to room temperature and stirring, filtering to obtain the crystalline form, wherein the molar ratio of compound A to p-toluenesulfonic acid is 1:(1-1.3), preferably about 1:1.

In a preferred embodiment, the present invention provides a salt of compound A, which is compound A mesylate;

preferably, the molar ratio of compound A to methanesulfonic acid is 1:1;

preferably, the compound A mesylate is in crystalline form VII;

the crystalline form VII has an XRPD pattern comprising characteristic peaks at diffraction angles (2θ) of about 7.7±0.2°, 10.5±0.2°, 19.0±0.2°, 20.1±0.2° and 20.5±0.2°;

preferably comprising characteristic peaks at diffraction angles (2θ) of about 7.7±0.2°, 10.5±0.2°, 16.2±0.2°, 16.8±0.2°, 19.0±0.2°, 19.9±0.2°, 20.1±0.2°, 20.5±0.2°, 21.0±0.2°, 22.6±0.2°, 24.0±0.2°, 25.5±0.2° and 26.5±0.2°;

most preferably comprising characteristic peaks at diffraction angles (2θ) of about 6.0±0.2°, 7.7±0.2°, 10.5±0.2°, 11.0±0.2°, 12.3±0.2°, 13.5±0.2°, 14.0±0.2°, 14.3±0.2°, 14.9±0.2°, 15.5±0.2°, 16.2±0.2°, 16.8±0.2°, 19.0±0.2°, 19.9±0.2°, 20.1±0.2°, 20.5±0.2°, 21.0±0.2°, 21.4±0.2°, 22.6±0.2°, 23.2±0.2°, 24.0±0.2°, 24.9±0.2°, 25.5±0.2°, 25.8±0.2°, 26.5±0.2°, 27.6±0.2° and 29.6±0.2°.

In a more preferred embodiment, the crystalline form VII has an XRPD pattern comprising peaks at the following diffraction angles (2θ):

| Peak No. | 2θ (°) ± 0.2° | I % |
|---|---|---|
| 1 | 6.0° | 23.4 |
| 2 | 7.7° | 51.5 |
| 3 | 10.0° | 14.3 |
| 4 | 10.5° | 81.9 |
| 5 | 11.0° | 22.2 |
| 6 | 12.3° | 23.0 |
| 7 | 12.6° | 13.6 |
| 8 | 13.5° | 18.7 |
| 9 | 14.0° | 26.2 |
| 10 | 14.3° | 20.3 |
| 11 | 14.9° | 17.3 |
| 12 | 15.5° | 21.4 |
| 13 | 15.8° | 14.1 |
| 14 | 16.2° | 39.6 |
| 15 | 16.8° | 33.5 |
| 16 | 17.8° | 9.6 |
| 17 | 18.2° | 10.2 |
| 18 | 19.0° | 62.0 |
| 19 | 19.9° | 45.4 |
| 20 | 20.1° | 100 |
| 21 | 20.5° | 73.4 |
| 22 | 21.0° | 40.7 |
| 23 | 21.4° | 18.8 |
| 24 | 21.9° | 10.6 |
| 25 | 22.6° | 37.8 |
| 26 | 23.2° | 33.0 |
| 27 | 23.4° | 23.8 |
| 28 | 24.0° | 33.2 |
| 29 | 24.9° | 22.0 |
| 30 | 25.5° | 29.2 |
| 31 | 25.8° | 23.0 |
| 32 | 26.5° | 31.7 |
| 33 | 27.6° | 16.0 |
| 34 | 28.2° | 11.7 |
| 35 | 29.1° | 13.6 |
| 36 | 29.6° | 18.4 |
| 37 | 30.0° | 9.5 |
| 38 | 30.5° | 10.6 |
| 39 | 31.9° | 12.2 |
| 40 | 32.6° | 7.1 |
| 41 | 33.2° | 10.3 |

-continued

| Peak No. | 2θ (°) ± 0.2° | I % |
|---|---|---|
| 42 | 34.4° | 9.6 |
| 43 | 35.2° | 8.3 |
| 44 | 35.9° | 6.9 |
| 45 | 37.4° | 8.5 |

Figure 18:
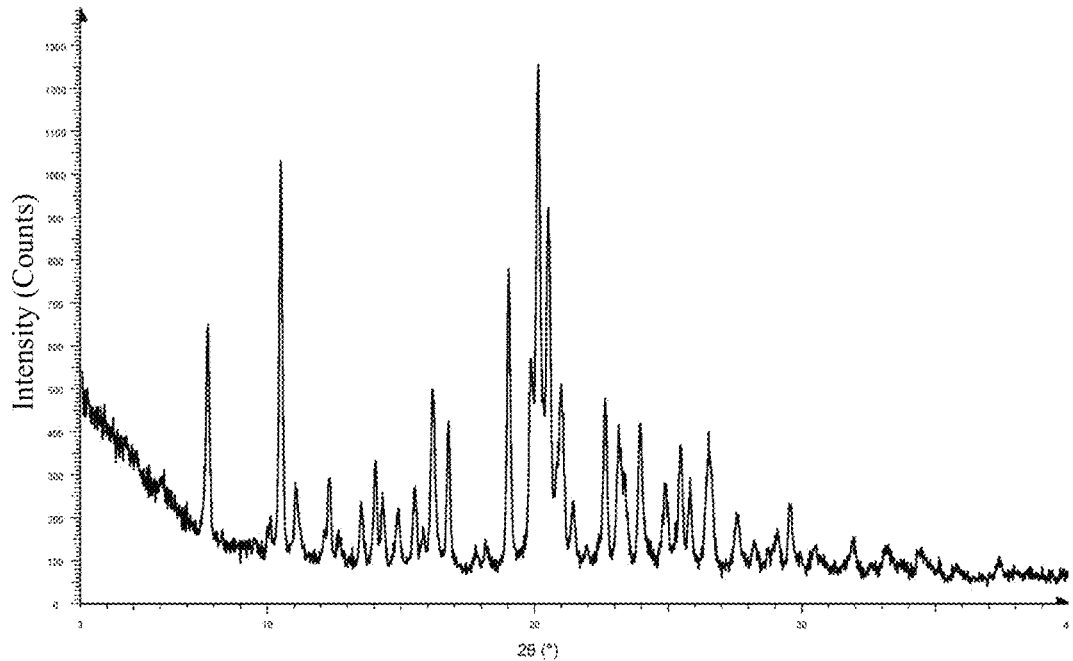
FIG. 18 is an X-ray powder diffraction pattern of crystalline form VII of compound A mesylate (molar ratio 1:1).

In a more preferred embodiment, the crystalline form VII has an XRPD pattern comprising peaks at diffraction angles (2θ) essentially the same as shown in FIG. 18. In the most preferred embodiment, the XRPD peak positions of crystalline form VII are essentially the same as shown in FIG. 18.

In a more preferred embodiment, the crystalline form VII has a DSC graph comprising an endothermic peak at about 99° C.

In a more preferred embodiment, in a thermogravimetric analysis, the crystalline form VII has a weight loss of about 0.9% when heated to about 150° C.

Figure 19:
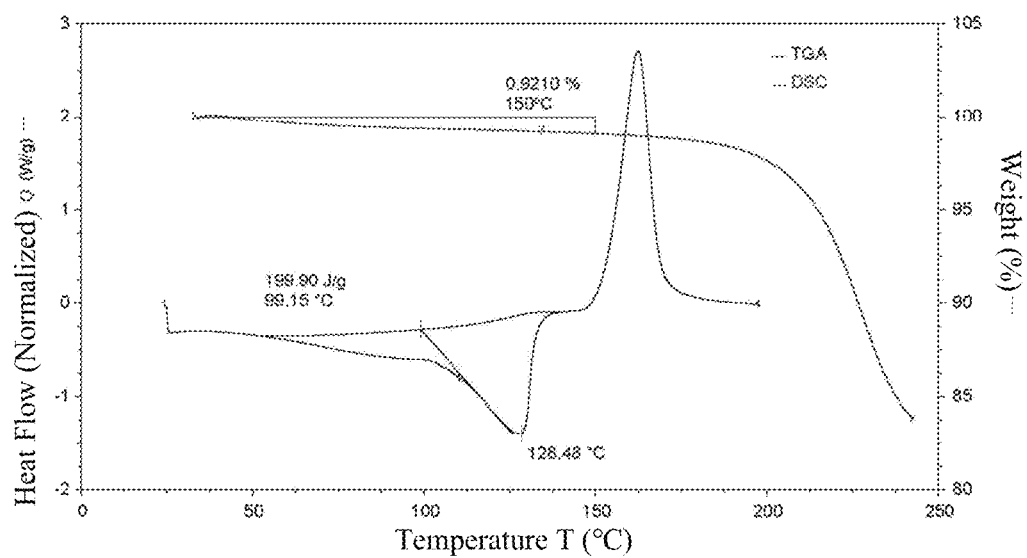
FIG. 19 is a differential scanning calorimetry (DSC) graph and a thermogravimetric analysis (TGA) graph of crystalline form VII of compound A mesylate (molar ratio 1:1).

In a more preferred embodiment, the crystalline form VII has a DSC-TGA graph comprising characteristic peaks essentially the same as shown in FIG. 19. In the most preferred embodiment, the crystalline form VII has a DSC-TGA graph essentially the same as shown in FIG. 19.

Figure 20:
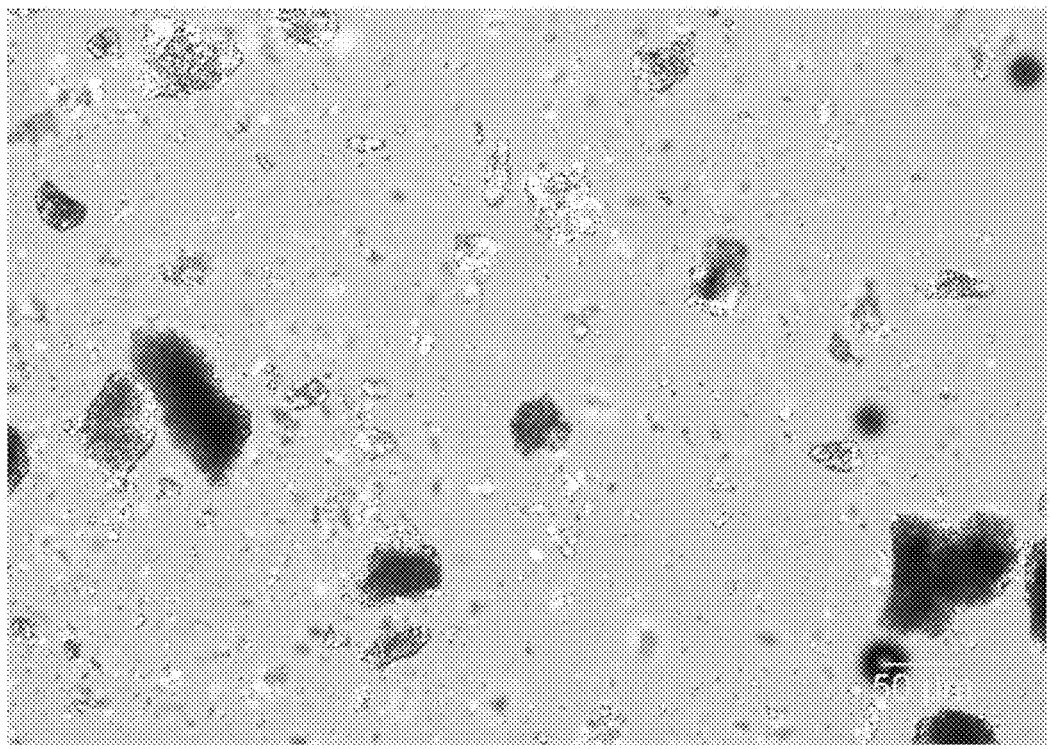
FIG. 20 is a scanning electron microscope image of crystalline form VII of compound A mesylate (molar ratio 1:1).

In a more preferred embodiment, the crystalline form VII has a scanning electron microscope image essentially the same as shown in FIG. 20.

In some embodiments, the present invention provides a method for preparing crystalline form VII, comprising adding compound A to an ether solvent (e.g., an ether having 3-10 carbon atoms, preferably a cyclic ether, such as furans (including tetrahydrofurans) and dioxanes, preferably is tetrahydrofuran, 2-methyltetrahydrofuran or dioxane), heating (for example, heating to 40-80° C., preferably 50° C. or 60° C.) to dissolve compound A, then adding methanesulfonic acid, cooling to room temperature and stirring, filtering to obtain the crystalline form, wherein the molar ratio of compound A to methanesulfonic acid is 1:(1-1.3), preferably about 1:1.

In a preferred embodiment, the present invention provides a salt of compound A, which is compound A mesylate;
preferably, the molar ratio of compound A to methanesulfonic acid is 1:2;
preferably, the compound A mesylate is in crystalline form VIII;
the crystalline form VIII has an XRPD pattern comprising characteristic peaks at diffraction angles (2θ) of about 11.0±0.2°, 12.2±0.2°, 13.4±0.2°, 19.9±0.2°, 20.2±0.2°, 21.4±0.2° and 25.8±0.2°;
preferably comprising characteristic peaks at diffraction angles (2θ) of about 3.2±0.2°, 6.0±0.2°, 11.0±0.2°, 12.2±0.2°, 13.4±0.2°, 19.9±0.2°, 20.2±0.2°, 21.0±0.2°, 21.4±0.2°, 23.0±0.2°, 23.4±0.2°, 24.9±0.2° and 25.8±0.2°;
most preferably comprising characteristic peaks at diffraction angles (2θ) of about 3.2±0.2°, 6.0±0.2°, 9.4±0.2°, 11.0±0.2°, 12.2±0.2°, 13.4±0.2°, 14.9±0.2°, 15.5±0.2°, 15.7±0.2°, 17.7±0.2°, 18.1±0.2°, 18.9±0.2°, 19.9±0.2°, 20.2±0.2°, 21.0±0.2°, 21.4±0.2°, 21.9±0.2°, 22.4±0.2°, 23.0±0.2°, 23.4±0.2°, 23.9±0.2°, 24.9±0.2°, 25.2±0.2°, 25.8±0.2°, 26.5±0.2°, 27.4±0.2°, 28.9±0.2°, 30.8±0.2° and 31.5±0.2°.

In a more preferred embodiment, the crystalline form VIII has an XRPD pattern comprising peaks at the following diffraction angles (2θ):

| Peak No. | 2θ (°) ± 0.2° | I % |
|---|---|---|
| 1 | 3.2° | 41.4 |
| 2 | 6.0° | 35.5 |
| 3 | 9.4° | 19.6 |
| 4 | 11.0° | 72.1 |
| 5 | 12.2° | 84.1 |
| 6 | 13.4° | 67.7 |
| 7 | 14.9° | 17.8 |
| 8 | 15.5° | 27.6 |
| 9 | 15.7° | 28.3 |
| 10 | 17.1° | 11.0 |
| 11 | 17.7° | 28.8 |
| 12 | 18.1° | 29.5 |
| 13 | 18.9° | 14.9 |
| 14 | 19.6° | 19.3 |
| 15 | 19.9° | 69.8 |
| 16 | 20.2° | 100 |
| 17 | 21.0° | 61.2 |
| 18 | 21.4° | 79.6 |
| 19 | 21.9° | 23.9 |
| 20 | 22.4° | 29.7 |
| 21 | 23.0° | 62.7 |
| 22 | 23.4° | 55.4 |
| 23 | 23.9° | 28.5 |
| 24 | 24.3° | 17.1 |
| 25 | 24.6° | 22.3 |
| 26 | 24.9° | 38.9 |
| 27 | 25.2° | 29.7 |
| 28 | 25.8° | 99.5 |
| 29 | 26.5° | 19.1 |
| 30 | 27.1° | 14.8 |
| 31 | 27.4° | 24.0 |
| 32 | 28.3° | 15.3 |
| 33 | 28.7° | 24.8 |
| 34 | 28.9° | 32.0 |
| 35 | 29.6° | 14.8 |
| 36 | 30.2° | 18.9 |
| 37 | 30.8° | 23.8 |
| 38 | 31.1° | 16.1 |
| 39 | 31.5° | 23.4 |
| 40 | 33.1° | 10.2 |
| 41 | 33.2° | 9.4 |
| 42 | 34.7° | 12.8 |
| 43 | 35.2° | 14.1 |
| 44 | 37.9° | 12.2 |

Figure 21:
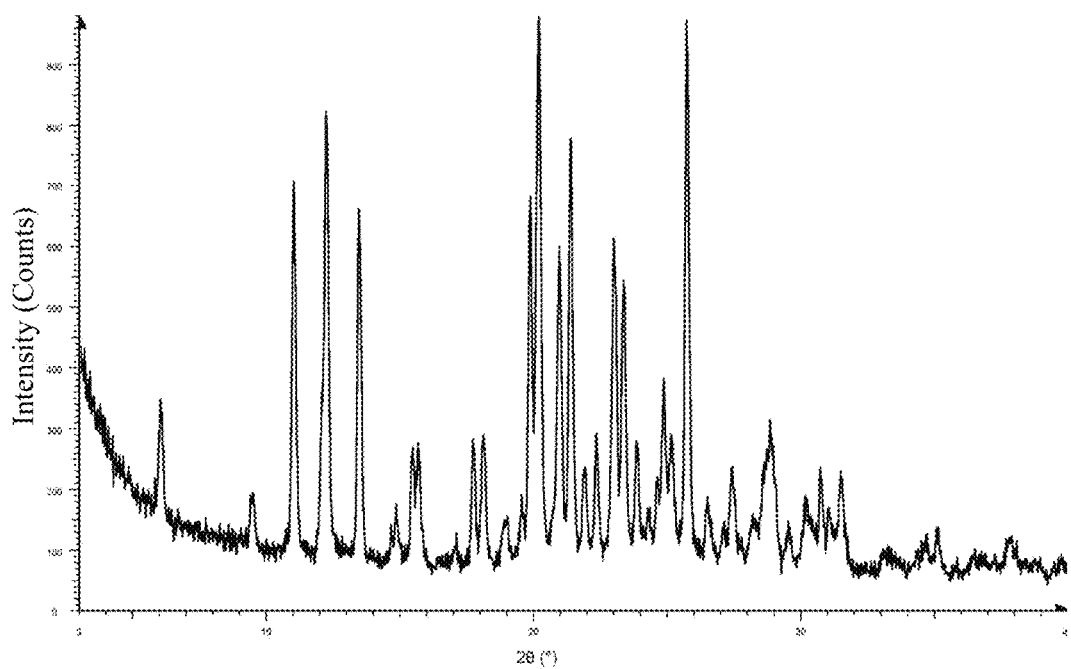
FIG. 21 is an X-ray powder diffraction pattern of crystalline form VIII of compound A mesylate (molar ratio 1:2).

In a more preferred embodiment, the crystalline form VIII has an XRPD pattern comprising peaks at diffraction angles (2θ) essentially the same as shown in FIG. 21. In the most preferred embodiment, the XRPD peak positions of crystalline form VIII are essentially the same as shown in FIG. 21.

In a more preferred embodiment, the crystalline form VIII has a DSC graph comprising an endothermic peak at about 101° C.

In a more preferred embodiment, in a thermogravimetric analysis, the crystalline form VIII has a weight loss of about 7.5% when heated to about 150° C.

Figure 22:
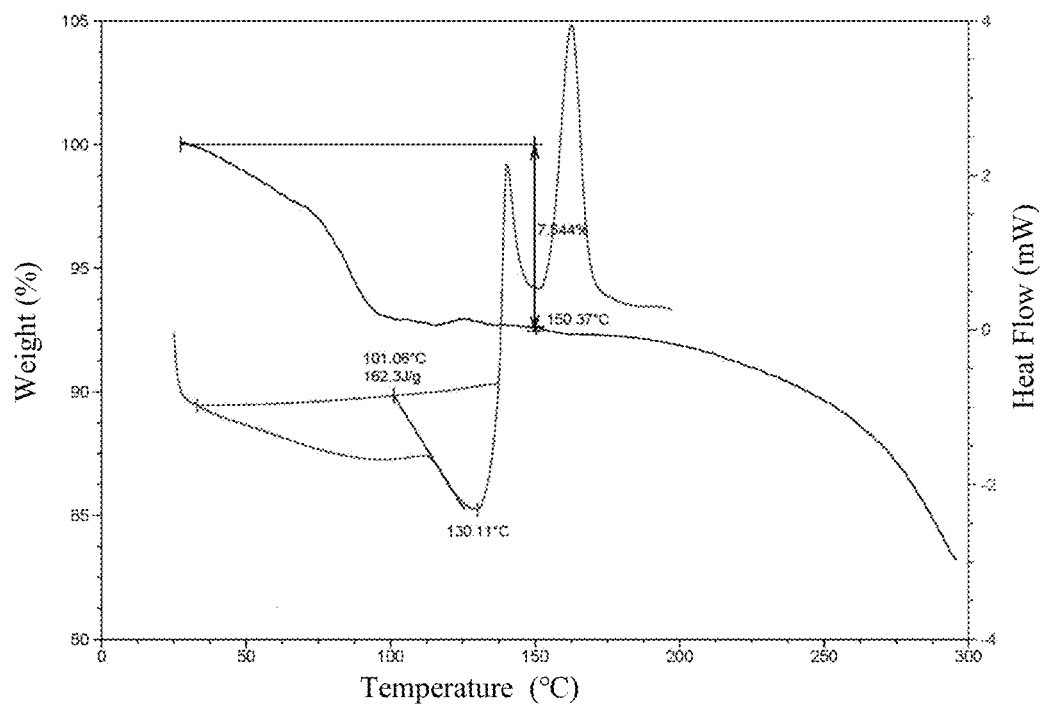
FIG. 22 is a differential scanning calorimetry (DSC) graph and a thermogravimetric analysis (TGA) graph of crystalline form VIII of compound A mesylate (molar ratio 1:2).

In a more preferred embodiment, the crystalline form VIII has a DSC-TGA graph comprising characteristic peaks essentially the same as shown in FIG. 22. In the most preferred embodiment, the crystalline form VIII has a DSC-TGA graph essentially the same as shown in FIG. 22.

Figure 23:
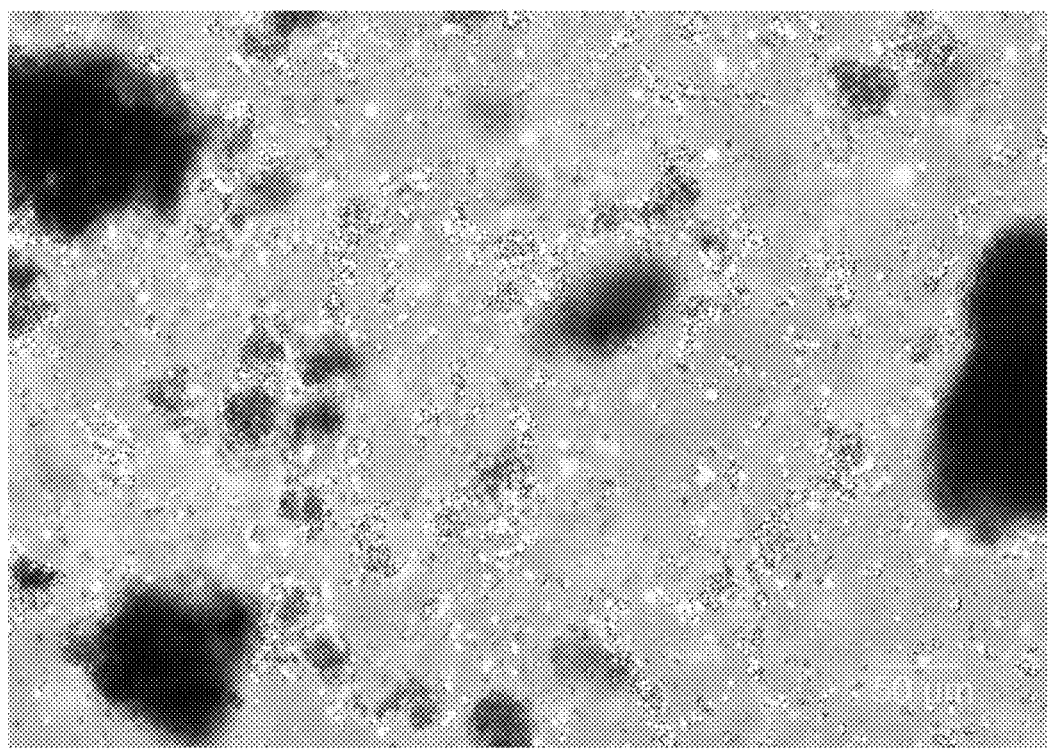
FIG. 23 is a scanning electron microscope image of crystalline form VIII of compound A mesylate (molar ratio 1:2).

In a more preferred embodiment, the crystalline form VIII has a scanning electron microscope image essentially the same as shown in FIG. 23.

In some embodiments, the present invention provides a method for preparing crystalline form VIII, comprising adding compound A to an ether solvent (e.g., an ether having 3-10 carbon atoms, preferably a cyclic ether, such as furans (including tetrahydrofurans) and dioxanes, preferably is tetrahydrofuran, 2-methyltetrahydrofuran or dioxane), heating (for example, heating to 40-80° C., preferably 50° C. or 60° C.) to dissolve compound A, then adding methanesulfonic acid, cooling to room temperature and stirring, filtering to obtain the crystalline form, wherein the molar ratio of compound A to methanesulfonic acid is 1:(2-2.5), preferably about 1:1.

In a preferred embodiment, the present invention provides a salt of compound A, which is compound A phosphate;
preferably, the molar ratio of compound A to phosphoric acid is 1:1;
preferably, the compound A phosphate is in crystalline form IX;
the crystalline form IX has an XRPD pattern comprising characteristic peaks at diffraction angles (2θ) of about 7.0±0.2°, 10.7±0.2°, 14.6±0.2° and 26.7±0.2°;
preferably comprising characteristic peaks at diffraction angles (2θ) of about 7.0±0.2°, 10.7±0.2°, 14.6±0.2°, 15.3±0.2°, 18.4±0.2°, 22.3±0.2°, 23.4±0.2° and 26.7±0.2°;
most preferably comprising characteristic peaks at diffraction angles (2θ) of about 7.0±0.2°, 10.7±0.2°, 14.0±0.2°, 14.6±0.2°, 15.3±0.2°, 16.2±0.2°, 18.4±0.2°, 20.3±0.2°, 21.5±0.2°, 22.3±0.2°, 23.4±0.2°, 24.3±0.2°, 25.7±0.2°, 26.7±0.2° and 29.5±0.2°.

In a more preferred embodiment, the crystalline form IX has an XRPD pattern comprising peaks at the following diffraction angles (2θ):

| Peak No. | 2θ (°) ± 0.2° | I % |
| --- | --- | --- |
| 1 | 7.0° | 100 |
| 2 | 10.2° | 8.4 |
| 3 | 10.7° | 46.8 |
| 4 | 12.3° | 7.3 |
| 5 | 14.0° | 14.5 |
| 6 | 14.6° | 47.9 |
| 7 | 15.3° | 20.1 |
| 8 | 16.2° | 11.5 |
| 9 | 17.3° | 7.1 |
| 10 | 18.4° | 20.9 |
| 11 | 20.3° | 18.8 |
| 12 | 21.5° | 15.2 |
| 13 | 22.3° | 30.7 |
| 14 | 23.4° | 27.6 |
| 15 | 24.3° | 18.1 |
| 16 | 24.9° | 11.0 |
| 17 | 25.7° | 14.6 |
| 18 | 26.7° | 33.9 |
| 19 | 28.2° | 6.8 |
| 20 | 29.5° | 9.1 |
| 21 | 30.1° | 9.0 |
| 22 | 30.9° | 6.6 |
| 23 | 32.6° | 5.4 |
| 24 | 35.1° | 6.2 |

Figure 24:
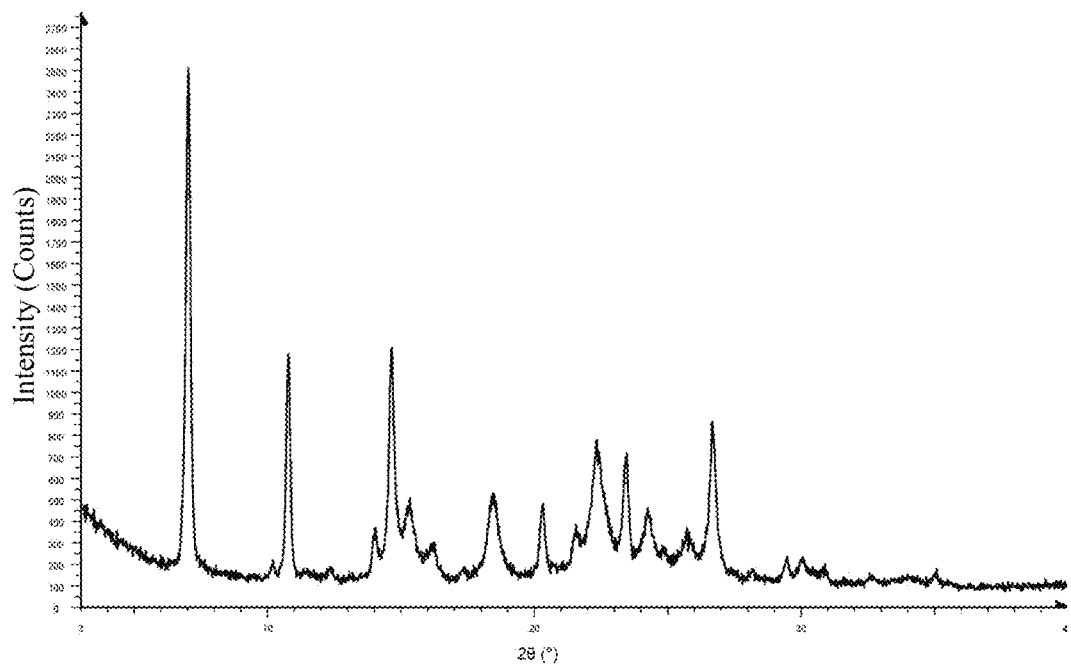
FIG. 24 is an X-ray powder diffraction pattern of crystalline form IX of compound A phosphate (molar ratio 1:1).

In a more preferred embodiment, the crystalline form IX has an XRPD pattern comprising peaks at diffraction angles (2θ) essentially the same as shown in FIG. 24. In the most preferred embodiment, the XRPD peak positions of crystalline form IX are essentially the same as shown in FIG. 24.

In a more preferred embodiment, the crystalline form IX has a DSC graph comprising an endothermic peak at about 100° C.

In a more preferred embodiment, in a thermogravimetric analysis, the crystalline form IX has a weight loss of about 1.2% when heated to about 50° C., and has a weight loss of about 4.6% between about 50-120° C.

Figure 25:
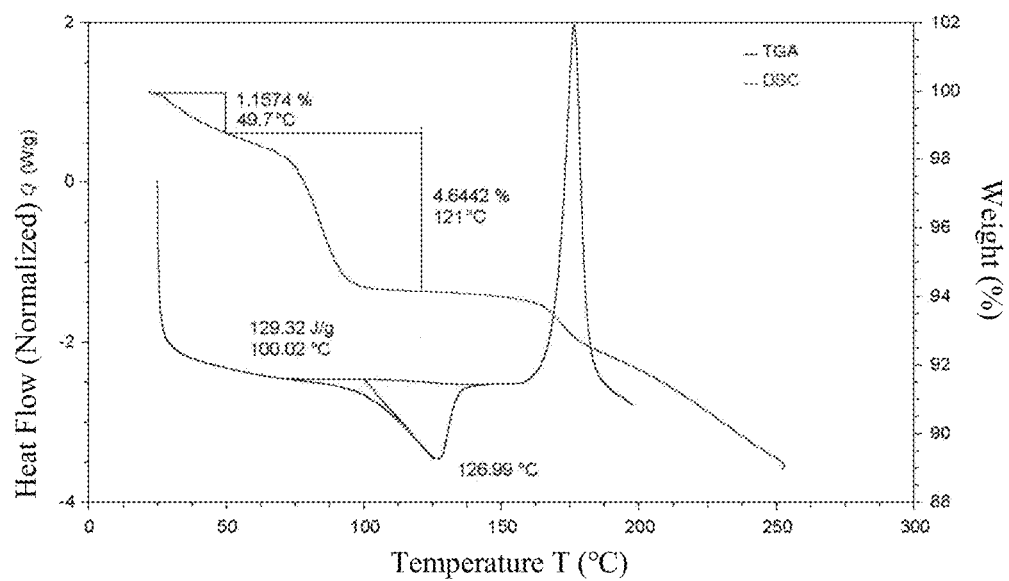
FIG. 25 is a differential scanning calorimetry (DSC) graph and a thermogravimetric analysis (TGA) graph of crystalline form IX of compound A phosphate (molar ratio 1:1).

In a more preferred embodiment, the crystalline form IX has a DSC-TGA graph comprising characteristic peaks essentially the same as shown in FIG. 25. In the most preferred embodiment, the crystalline form IX has a DSC-TGA graph essentially the same as shown in FIG. 25.

Figure 26:
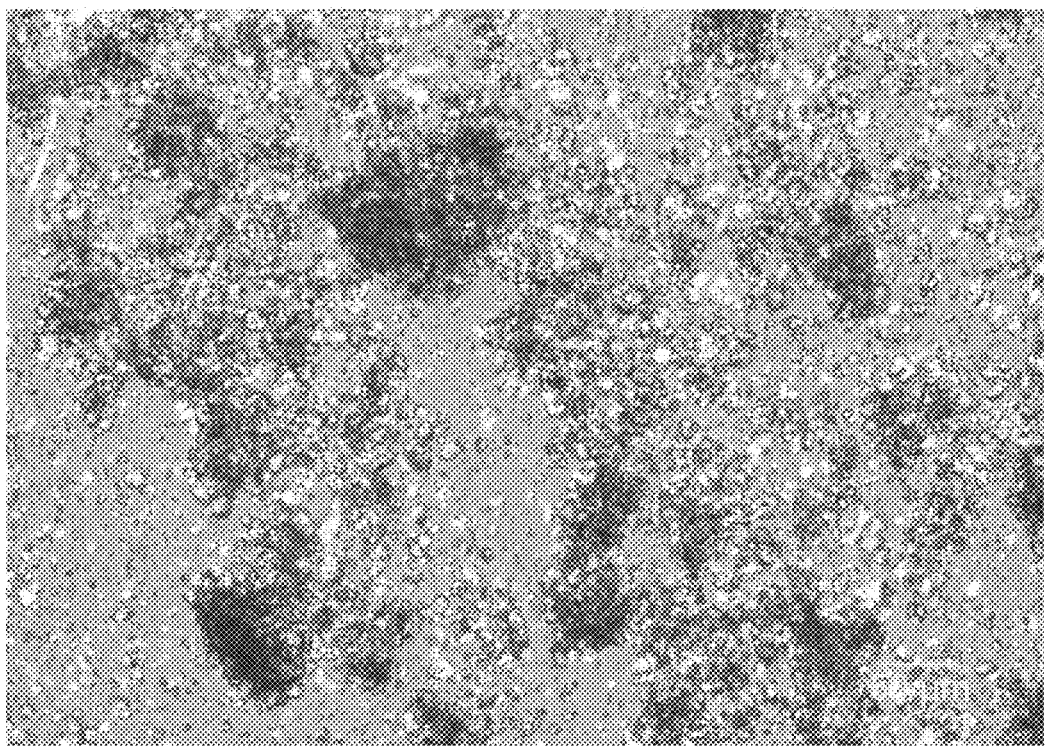
FIG. 26 is a scanning electron microscope image of crystalline form IX of compound A phosphate (molar ratio 1:1).

In a more preferred embodiment, the crystalline form IX has a scanning electron microscope image essentially the same as shown in FIG. 26.

In some embodiments, the present invention provides a method for preparing crystalline form IX, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 55° C. or 60° C.) to dissolve compound A, then adding phosphoric acid, cooling to room temperature and stirring, filtering to obtain the crystalline form, wherein the molar ratio of compound A to phosphoric acid is 1:(1-1.3), preferably about 1:1.

In a preferred embodiment, the present invention provides a salt of compound A, which is compound A maleate;
preferably, the molar ratio of compound A to maleic acid is 1:1;
preferably, the compound A maleate is in crystalline form X;
the crystalline form X has an XRPD pattern comprising characteristic peaks at diffraction angles (2θ) of about 5.4±0.2°, 5.8±0.2°, 13.7±0.2° and 17.1±0.2°;
preferably comprising characteristic peaks at diffraction angles (2θ) of about 5.4±0.2°, 5.8±0.2°, 8.9±0.2°, 10.0±0.2°, 13.7±0.2°, 16.0±0.2°, 17.1±0.2°, 21.7±0.2° and 21.9±0.2°;
most preferably comprising characteristic peaks at diffraction angles (2θ) of about 5.4±0.2°, 5.8±0.2°, 8.9±0.2°, 10.0±0.2°, 13.7±0.2°, 16.0±0.2°, 17.1±0.2°, 21.7±0.2°, 21.9±0.2°, 24.1±0.2°, 25.8±0.2° and 27.6±0.2°.

In a more preferred embodiment, the crystalline form X has an XRPD pattern comprising peaks at the following diffraction angles (2θ):

| Peak No. | 2θ (°) ± 0.2° | I % |
| --- | --- | --- |
| 1 | 5.4° | 100 |
| 2 | 5.8° | 13.5 |
| 3 | 8.5° | 2.6 |
| 4 | 8.9° | 11.3 |
| 5 | 10.0° | 13.0 |
| 6 | 10.8° | 3.4 |
| 7 | 13.7° | 19.3 |
| 8 | 14.3° | 3.3 |
| 9 | 15.0° | 2.7 |
| 10 | 16.0° | 10.2 |
| 11 | 17.1° | 13.5 |
| 12 | 17.9° | 2.4 |
| 13 | 18.6° | 4.5 |
| 14 | 19.2° | 4.2 |
| 15 | 19.8° | 6.5 |
| 16 | 20.7° | 3.5 |
| 17 | 21.7° | 13.5 |
| 18 | 21.9° | 14.0 |
| 19 | 22.2° | 5.9 |
| 20 | 22.7° | 4.2 |
| 21 | 23.4° | 4.3 |
| 22 | 24.1° | 7.3 |
| 23 | 25.1° | 3.7 |
| 24 | 25.8° | 8.8 |
| 25 | 26.7° | 4.2 |
| 26 | 27.6° | 9.3 |
| 27 | 28.9° | 2.0 |
| 28 | 31.7° | 3.3 |
| 29 | 33.9° | 2.4 |
| 30 | 34.8° | 1.5 |
| 31 | 35.8° | 1.6 |
| 32 | 38.8° | 1.6 |

Figure 27:
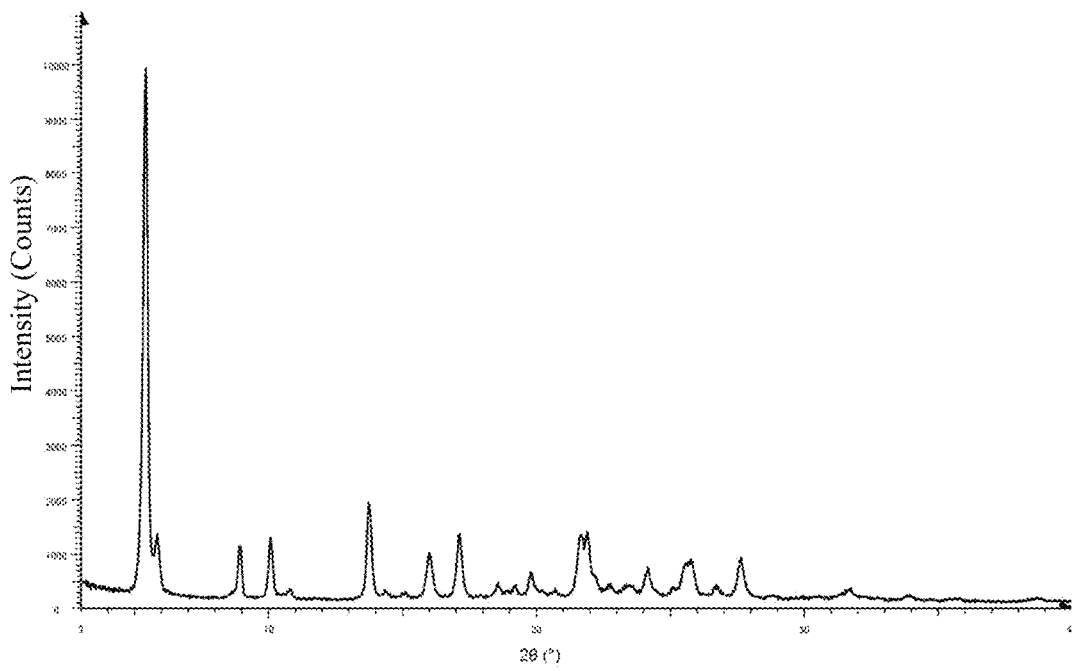
FIG. 27 is an X-ray powder diffraction pattern of crystalline form X of compound A maleate (molar ratio 1:1).

In a more preferred embodiment, the crystalline form X has an XRPD pattern comprising peaks at diffraction angles (2θ) essentially the same as shown in FIG. 27. In the most preferred embodiment, the XRPD peak positions of crystalline form X are essentially the same as shown in FIG. 27.

In a more preferred embodiment, the crystalline form X has a DSC graph comprising an endothermic peak at about 29° C.

In a more preferred embodiment, in a thermogravimetric analysis, the crystalline form X has a weight loss of about 1% when heated to about 100° C.

Figure 28:
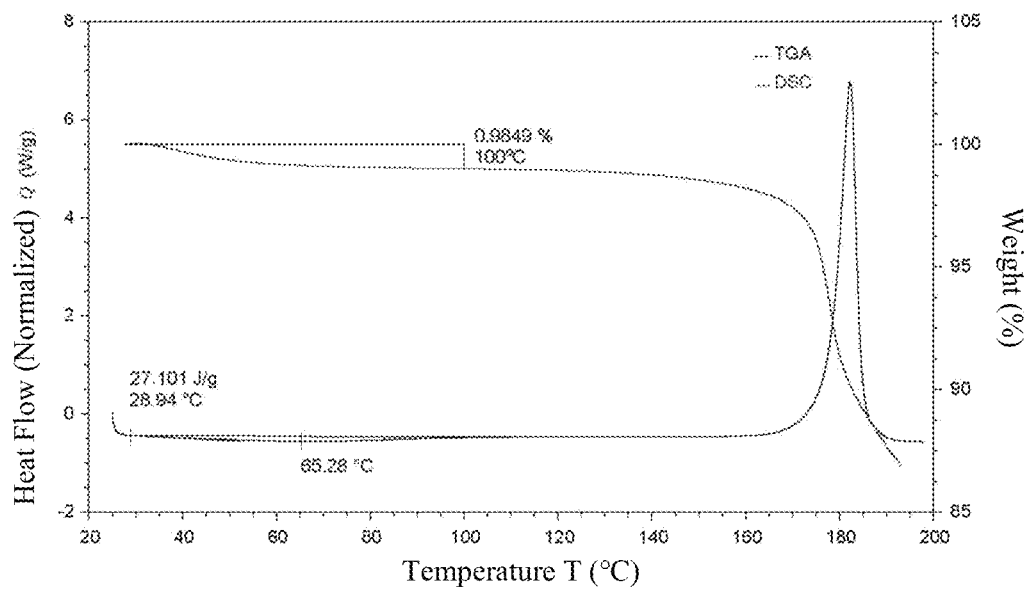
FIG. 28 is a differential scanning calorimetry (DSC) graph and a thermogravimetric analysis (TGA) graph of crystalline form X of compound A maleate (molar ratio 1:1).

In a more preferred embodiment, the crystalline form X has a DSC-TGA graph comprising characteristic peaks essentially the same as shown in FIG. 28. In the most preferred embodiment, the crystalline form X has a DSC-TGA graph essentially the same as shown in FIG. 28.

Figure 29:
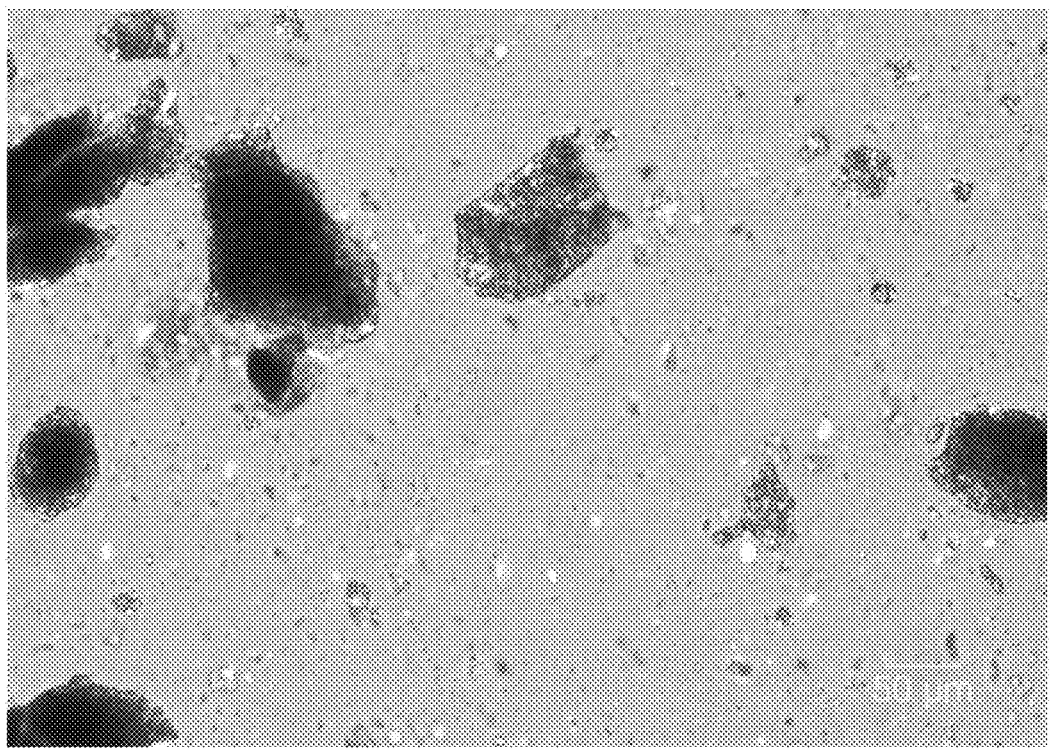
FIG. 29 is a scanning electron microscope image of crystalline form X of compound A maleate (molar ratio 1:1).

In a more preferred embodiment, the crystalline form X has a scanning electron microscope image essentially the same as shown in FIG. 29.

In some embodiments, the present invention provides a method for preparing crystalline form X, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 55° C. or 60° C.) to dissolve compound A, then adding maleic acid ((preferably, a solution of maleic acid in methanol or ethanol), cooling to room temperature and stirring, filtering and optionally drying to obtain the crystalline form, wherein the molar ratio of compound A to maleic acid is 1:(1-1.3), preferably about 1:1.

In a preferred embodiment, the present invention provides a salt of compound A, which is compound A L-tartrate;
preferably, the molar ratio of compound A to L-tartaric acid is 1:1;
preferably, the compound A L-tartrate is in crystalline form XI;
the crystalline form XI has an XRPD pattern comprising characteristic peaks at diffraction angles (2θ) of about 6.5±0.2°, 14.3±0.2°, 20.8±0.2°, 21.5±0.2° and 25.2±0.2°;
preferably comprising characteristic peaks at diffraction angles (2θ) of about 6.5±0.2°, 10.9±0.2°, 12.6±0.2°, 14.3±0.2°, 16.1±0.2°, 17.3±0.2°, 18.0±0.2°, 20.8±0.2°, 21.5±0.2°, 22.5±0.2° and 25.2±0.2°;
most preferably comprising characteristic peaks at diffraction angles (2θ) of about 6.5±0.2°, 10.3±0.2°, 10.9±0.2°, 12.6±0.2°, 14.3±0.2°, 15.2±0.2°, 16.1±0.2°, 17.3±0.2°, 18.0±0.2°, 19.4±0.2°, 20.8±0.2°, 21.5±0.2°, 22.0±0.2°, 22.5±0.2°, 23.4±0.2°, 23.8±0.2°, 24.2±0.2°, 24.8±0.2°, 25.2±0.2°, 25.8±0.2°, 26.7±0.2°, 27.8±0.2°, 28.8±0.2°, 30.1±0.2°, 31.4±0.2°, 33.8±0.2° and 35.2±0.2°.

In a more preferred embodiment, the crystalline form XI has an XRPD pattern comprising peaks at the following diffraction angles (2θ):

| Peak No. | 2θ (°) ± 0.2° | I % |
|---|---|---|
| 1 | 6.5° | 76.8 |
| 2 | 10.3° | 12.3 |
| 3 | 10.9° | 31.4 |
| 4 | 12.6° | 27.4 |
| 5 | 14.3° | 45.0 |
| 6 | 14.9° | 10.1 |
| 7 | 15.2° | 14.9 |
| 8 | 16.1° | 25.3 |
| 9 | 17.3° | 30.1 |
| 10 | 18.0° | 36.9 |
| 11 | 19.4° | 19.7 |
| 12 | 20.8° | 43.1 |
| 13 | 21.5° | 100 |
| 14 | 22.0° | 18.8 |
| 15 | 22.5° | 27.1 |
| 16 | 23.4° | 21.4 |
| 17 | 23.8° | 12.6 |
| 18 | 24.2° | 18.6 |
| 19 | 24.5° | 15.7 |
| 20 | 24.8° | 20.9 |
| 21 | 25.2° | 40.4 |
| 22 | 25.8° | 10.3 |
| 23 | 26.7° | 11.3 |
| 24 | 27.2° | 7.0 |
| 25 | 27.8° | 12.6 |
| 26 | 28.8° | 11.9 |
| 27 | 29.3° | 9.5 |
| 28 | 30.1° | 12.0 |
| 29 | 31.4° | 13.0 |
| 30 | 31.9° | 8.1 |
| 31 | 32.5° | 9.5 |
| 32 | 32.9° | 7.2 |
| 33 | 33.8° | 17.1 |
| 34 | 34.7° | 6.8 |
| 35 | 35.2° | 9.6 |
| 36 | 35.9° | 7.7 |
| 37 | 36.2° | 5.3 |
| 38 | 36.8° | 5.1 |
| 39 | 37.8° | 7.0 |
| 40 | 38.2° | 7.0 |
| 41 | 39.3° | 8.9 |

Figure 30:
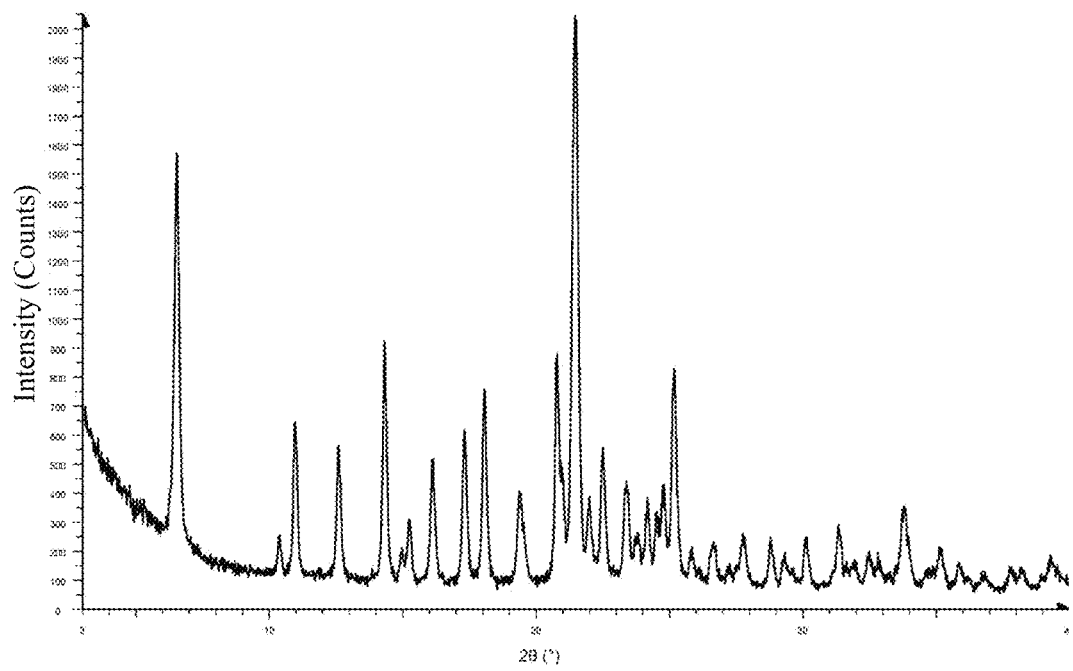
FIG. 30 is an X-ray powder diffraction pattern of crystalline form XI of compound A L-tartrate (molar ratio 1:1).

In a more preferred embodiment, the crystalline form XI has an XRPD pattern comprising peaks at diffraction angles (2θ) essentially the same as shown in FIG. 30. In the most preferred embodiment, the XRPD peak positions of crystalline form XI are essentially the same as shown in FIG. 30.

In a more preferred embodiment, the crystalline form XI has a DSC graph comprising no endothermic peak.

In a more preferred embodiment, in a thermogravimetric analysis, the crystalline form XI has a weight loss of about 0.7% when heated to about 170° C.

Figure 31:
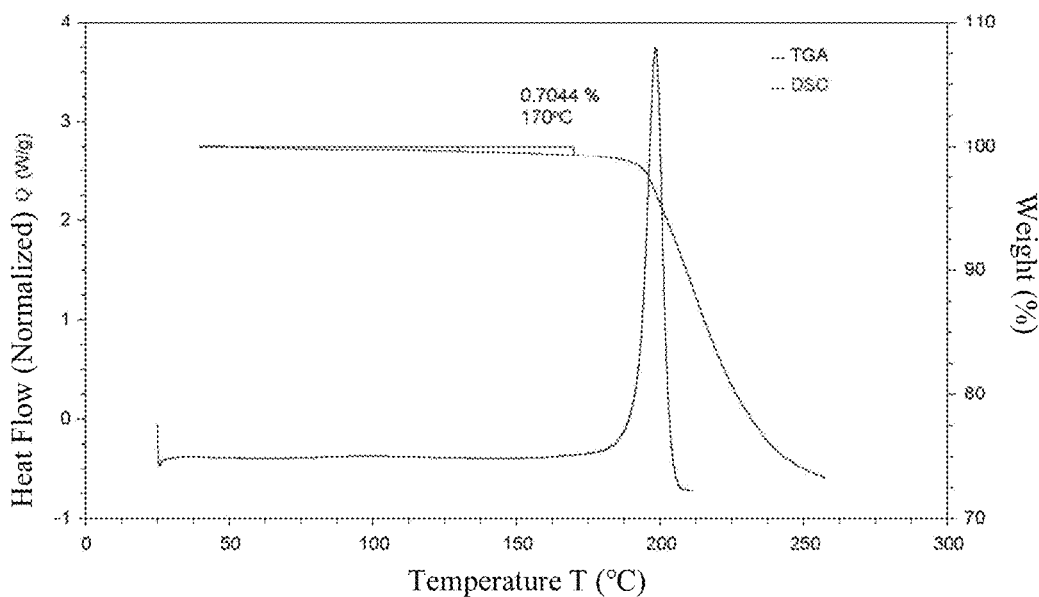
FIG. 31 is a differential scanning calorimetry (DSC) graph and a thermogravimetric analysis (TGA) graph of crystalline form XI of compound A L-tartrate (molar ratio 1:1).

In a more preferred embodiment, the crystalline form XI has a DSC-TGA graph essentially the same as shown in FIG. 31.

Figure 32:
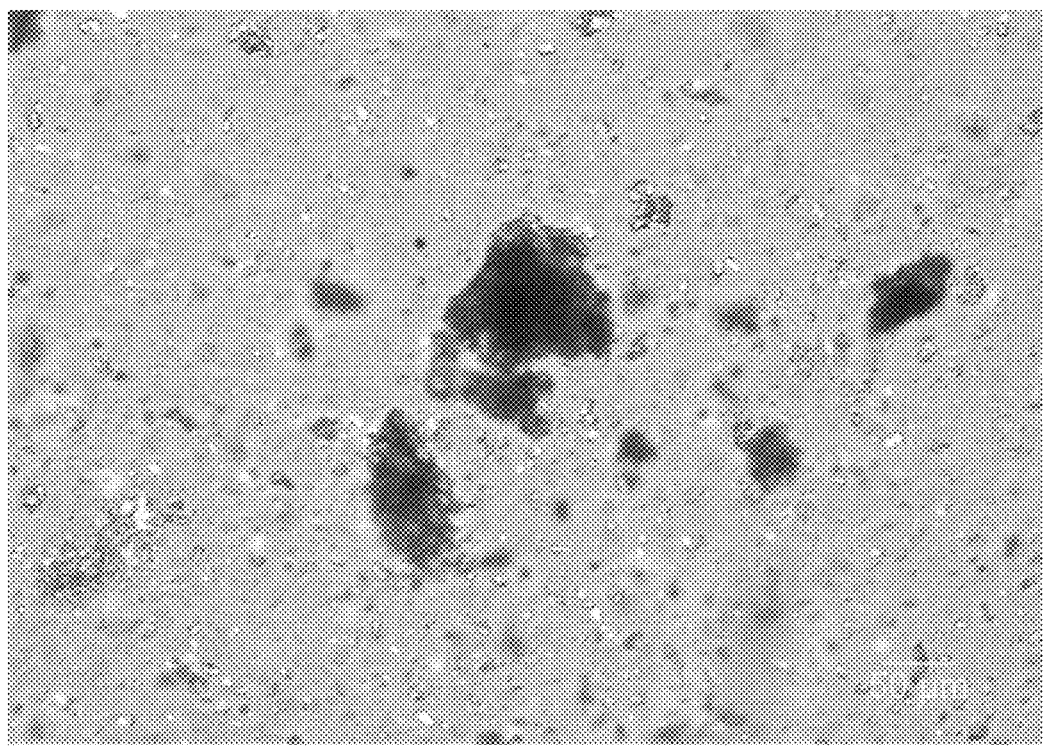
FIG. 32 is a scanning electron microscope image of crystalline form XI of compound A L-tartrate (molar ratio 1:1).

In a more preferred embodiment, the crystalline form XI has a scanning electron microscope image essentially the same as shown in FIG. 32.

In some embodiments, the present invention provides a method for preparing crystalline form XI, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 55° C. or 60° C.) to dissolve compound A, then adding L-tartaric acid ((preferably, a solution of L-tartaric acid in methanol or ethanol), cooling to room temperature and stirring, filtering and optionally drying to obtain the crystalline form, wherein the molar ratio of compound A to L-tartaric acid is 1:(1-1.3), preferably about 1:1.

In a preferred embodiment, the present invention provides a salt of compound A, which is compound A fumarate;
preferably, the molar ratio of compound A to fumaric acid is 1:1;

preferably, the compound A fumarate is in crystalline form XII;

the crystalline form XII has an XRPD pattern comprising characteristic peaks at diffraction angles (2θ) of about 7.2±0.2°, 10.9±0.2°, 20.9±0.2° and 27.5±0.2°;

preferably comprising characteristic peaks at diffraction angles (2θ) of about 7.2±0.2°, 10.3±0.2°, 10.9±0.2°, 15.0±0.2°, 20.9±0.2°, 21.6±0.2°, 24.2±0.2° and 27.5±0.2°;

most preferably comprising characteristic peaks at diffraction angles (2θ) of about 7.2±0.2°, 7.8±0.2°, 10.3±0.2°, 10.9±0.2°, 13.0±0.2°, 14.5±0.2°, 15.0±0.2°, 17.6±0.2°, 20.9±0.2°, 21.6±0.2°, 22.9±0.2°, 24.2±0.2°, 25.9±0.2°, 27.5±0.2° and 31.0±0.2°.

In a more preferred embodiment, the crystalline form XII has an XRPD pattern comprising peaks at the following diffraction angles (2θ):

| Peak No. | 2θ (°) ± 0.2° | I % |
|---|---|---|
| 1 | 7.2° | 100 |
| 2 | 7.8° | 38.2 |
| 3 | 10.3° | 51.0 |
| 4 | 10.9° | 90.2 |
| 5 | 13.0° | 48.2 |
| 6 | 14.5° | 31.9 |
| 7 | 15.0° | 55.4 |
| 8 | 17.6° | 22.8 |
| 9 | 20.3° | 51.6 |
| 10 | 20.9° | 93.6 |
| 11 | 21.6° | 55.8 |
| 12 | 22.7° | 40.6 |
| 13 | 22.9° | 44.3 |
| 14 | 24.2° | 71.4 |
| 15 | 25.9° | 36.1 |
| 16 | 27.5° | 86.3 |
| 17 | 31.0° | 20.5 |

Figure 33:
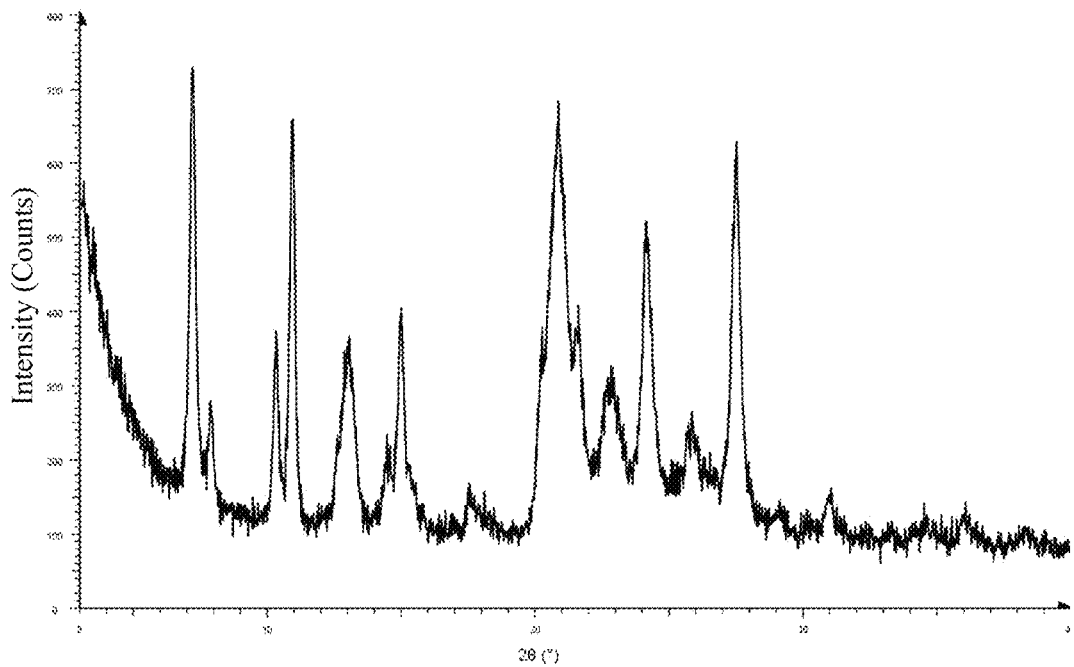
FIG. 33 is an X-ray powder diffraction pattern of crystalline form XII of compound A fumarate (molar ratio 1:1).

In a more preferred embodiment, the crystalline form XII has an XRPD pattern comprising peaks at diffraction angles (2θ) essentially the same as shown in FIG. 33. In the most preferred embodiment, the XRPD peak positions of crystalline form XII are essentially the same as shown in FIG. 33.

In a more preferred embodiment, the crystalline form XII has a DSC graph comprising an endothermic peak at about 102° C.

In a more preferred embodiment, in a thermogravimetric analysis, the crystalline form XII has a weight loss of about 1.1% when heated to about 60° C., and has a weight loss of about 4.1% between about 60-150° C.

Figure 34:
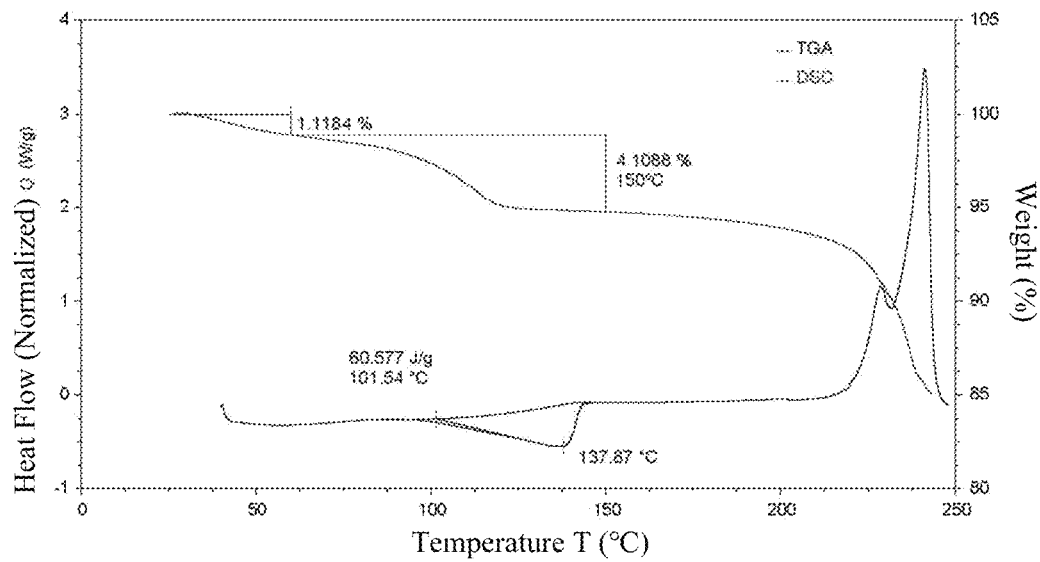
FIG. 34 is a differential scanning calorimetry (DSC) graph and a thermogravimetric analysis (TGA) graph of crystalline form XII of compound A fumarate (molar ratio 1:1).
Figure 35:
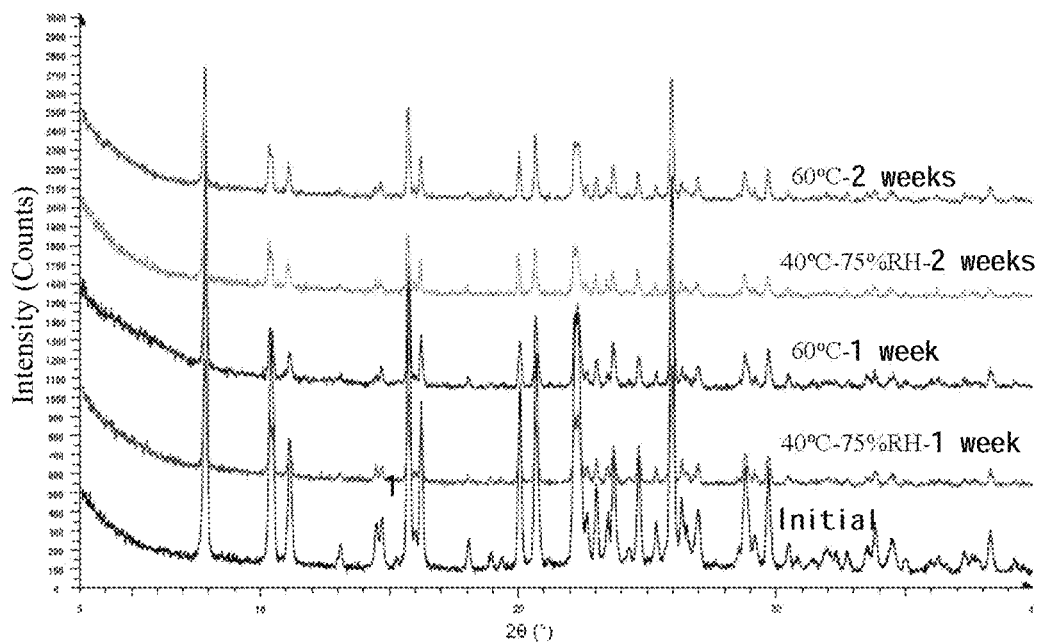
FIG. 35 is an XRPD pattern comparison of crystalline form Ia of compound A hydrochloride (molar ratio 1:1) before and after the high temperature stability test.
Figure 36:
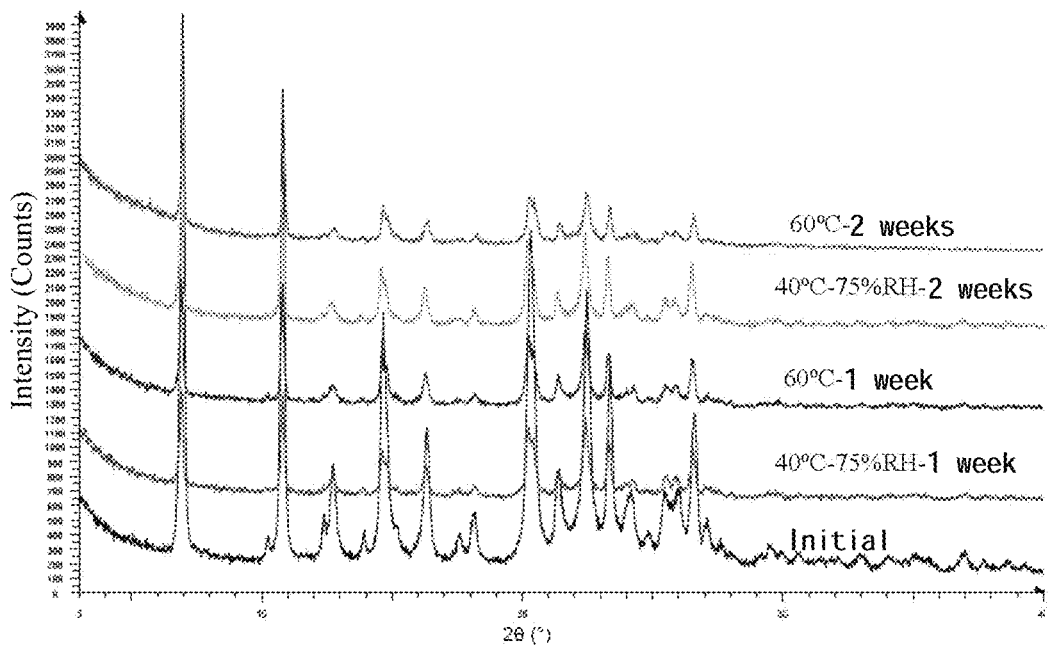
FIG. 36 is an XRPD pattern comparison of crystalline form III of compound A citrate (molar ratio 1:0.5) before and after the high temperature stability test.

In a more preferred embodiment, the crystalline form XII has a DSC-TGA graph comprising characteristic peaks essentially the same as shown in FIG. 34. In the most preferred embodiment, the crystalline form XII has a DSC-TGA graph essentially the same as shown in FIG. 34.

In some embodiments, the present invention provides a method for preparing crystalline form XII, comprising adding compound A to an alcohol solvent (preferably an alcohol having 1 to 6 carbon atoms, including but not limited to methanol, ethanol, 1-propanol (n-propanol), 2-propanol (isopropanol), 1-butanol, 2-butanol and tert-butanol), heating (for example, heating to 40-80° C., preferably 55° C. or 60° C.) to dissolve compound A, then adding fumaric acid ((preferably, a solution of fumaric acid in methanol or ethanol), cooling to room temperature and stirring, filtering and optionally drying to obtain the crystalline form, wherein the molar ratio of compound A to fumaric acid is 1:(1-1.3), preferably about 1:1.

Pharmaceutical Composition, Therapeutic Method and Use Thereof

In another embodiment, the present invention provides a pharmaceutical composition comprising a salt of compound A of the present invention or a crystalline form thereof and one or more pharmaceutically acceptable carriers.

In another embodiment, the present invention provides use of a salt of compound A of the present invention or a crystalline form thereof in the manufacture of a medicament for the prevention or treatment of a disease mediated by a P2X3 and/or P2X2/3 receptor antagonist.

In another embodiment, the present invention provides a salt of compound A of the present invention or a crystalline form thereof for use in the prevention or treatment of a disease mediated by a P2X3 and/or P2X2/3 receptor antagonist.

In another embodiment, the present invention provides a method for the prevention or treatment of a disease mediated by a P2X3 and/or P2X2/3 receptor antagonist, comprising administering to a subject in need thereof, preferably a mammal, a prophylactically or therapeutically effective amount of a salt of compound A of the present invention or a crystalline form thereof.

In a preferred embodiment, the disease mediated by a P2X3 and/or P2X2/3 receptor antagonist is selected from the group consisting of a urinary tract disease selected from reduced bladder capacity, frequent micturition, urge incontinence, stress incontinence, bladder hyperreactivity, benign prostatic hypertrophy, prostatitis, detrusor hyperreflexia, nocturia, urinary urgency, pelvic hypersensitivity, urethritis, pelvic pain syndrome, prostatodynia, cystitis, and idiopathic bladder hypersensitivity; a pain disease selected from inflammatory pain, surgical pain, visceral pain, dental pain, premenstrual pain, central pain, pain due to burns, migraine and cluster headaches, nerve injury, neuritis, neuralgia, poisoning, ischemic injury, interstitial cystitis, cancer pain, viral, parasitic or bacterial infection, post-traumatic injury and pain associated with irritable bowel syndrome; a cardiovascular system disease, preferably hypertension; a respiratory disease selected from chronic obstructive pulmonary disease, asthma and bronchospasm; a gastrointestinal disease selected from irritable bowel syndrome (preferably diarrhea-dominant irritable bowel syndrome), inflammatory bowel disease, biliary colic, renal colic, and pain associated with gastrointestinal distension.

As used herein, the term "pharmaceutically acceptable carrier" in the present invention refers to a diluent, auxiliary material, excipient, or vehicle with which a therapeutic is administered, and it is, within the scope of sound medical judgment, suitable for contact with the tissues of human beings and animals without excessive toxicity, irritation, allergic response, or other problem or complication, commensurate with a reasonable benefit/risk ratio.

The pharmaceutically acceptable carrier which can be employed in the pharmaceutical composition of the present invention includes, but is not limited to sterile liquids, such as water and oils, including those of petroleum, animal, vegetable or synthetic origin, such as peanut oil, soybean oil, mineral oil, sesame oil and the like. Water is an exemplary carrier when the pharmaceutical composition is administered intravenously. Physiological salines as well as aqueous dextrose and glycerol solutions can also be employed as liquid carriers, particularly for injectable solutions. Suitable pharmaceutical excipients include starch, glucose, lactose, sucrose, gelatin, maltose, chalk, silica gel, sodium stearate, glycerol monostearate, talc, sodium chloride, dried skim milk, glycerol, propylene glycol, water, ethanol and the like.

The composition, if desired, can also contain minor amounts of wetting or emulsifying agents, or pH buffering agents. Oral formulations can include standard carriers such as pharmaceutical grades of mannitol, lactose, starch, magnesium stearate, sodium saccharine, cellulose, magnesium carbonate, etc. Examples of suitable pharmaceutical carriers are described in e.g., Remington's Pharmaceutical Sciences (1990).

The composition of the present invention can act systemically and/or topically. To this end, it can be administered through a suitable route, such as through injection, intravenous, intraarterial, subcutaneous, intraperitoneal, intramuscular, or transdermal administration, or administered via oral, buccal, nasal, transmucosal, topical, as an ophthalmic formulation, or via inhalation.

For these routes of administration, the composition of the present invention can be administered in a suitable dosage form.

The dosage form may be solid, semi-solid, liquid, or gas formulations, specifically including, but not limited to, tablets, capsules, powders, granules, lozenges, hard candies, powders, sprays, creams, salves, suppositories, gels, pastes, lotions, ointments, aqueous suspensions, injectable solutions, suspensions, elixirs, and syrups.

The pharmaceutical composition of the present invention may be manufactured by any process well known in the art, e.g., by means of mixing, dissolving, granulating, dragée-making, levigating, emulsifying, lyophilizing processes, or the like.

As used herein, the term "therapeutically effective amount" refers to the amount of a salt of compound A being administered which will relieve to some extent one or more of the symptoms of the disorder being treated.

Dosage regimens may be adjusted to provide the optimum desired response. For example, a single bolus may be administered, several divided doses may be administered overtime, or the dose may be proportionally reduced or increased as indicated by the exigencies of the therapeutic situation. It is to be noted that dosage values may vary with the type and severity of the condition to be alleviated, and may include single or multiple doses. It is to be further understood that for any particular subject, specific dosage regimens should be adjusted over time according to the individual need and the professional judgment of the person administering or supervising the administration of the composition.

The amount of the salt of compound A of the present invention administered will be dependent on the subject being treated, the severity of the disorder or condition, the rate of administration, the disposition of the compound and the discretion of the prescribing physician. Generally, an effective dosage is in the range of about 0.0001 to about 50 mg per kg body weight per day, for example about 0.01 to about 10 mg/kg/day, in single or divided doses. For a 70 kg human, this would amount to about 0.007 mg to about 3500 mg/day, for example about 0.7 mg to about 700 mg/day. In some instances, dosage levels below the lower limit of the aforesaid range may be more than adequate, while in other cases, still larger doses may be employed without causing any harmful side effect, provided that such larger doses are first divided into several small doses for administration throughout the day.

The content or dosage of the salt of compound A of the present invention in the pharmaceutical composition is about 0.01 mg to about 1000 mg, suitably 0.1-500 mg, preferably 0.5-300 mg, more preferably 1-150 mg, particularly preferably 1-50 mg, e.g., 1.5 mg, 2 mg, 4 mg, 10 mg, and 25 mg, etc.

Unless otherwise indicated, the term "treating" or "treatment", as used herein, means reversing, alleviating, inhibiting the progress of, or preventing a disorder, condition, or disease to which such term applies, or one or more symptoms of such disorder, condition, or disease.

As used herein, the term "subject" includes a human or non-human animal. An exemplary human subject includes a human subject having a disease (such as one described herein) (referred to as a patient), or a normal subject. The term "non-human animal" as used herein includes all vertebrates, such as non-mammals (e.g., birds, amphibians, reptiles) and mammals, such as non-human primates, livestock and/or domesticated animals (such as sheep, dog, cat, cow, pig and the like).

EXAMPLE

The present invention is explained in more detail below with reference to the examples, which are only used to illustrate the technical solutions of the present invention, and are not intended to limit the scope thereof. Those skilled in the art may make some non-essential improvements and adjustments, which still fall within the scope of the present invention.

Unless otherwise specified, the starting materials and reagents employed in the following Examples are all commercially available products or can be prepared through known methods.

The detection instruments and conditions used in the following examples are as follows:
(1) X-Ray Powder Diffraction (XRPD)
    (a) Instrument Model: Bruker D8 advance, equipped with a LynxEye detector
    Test conditions: the anode target material was copper, the light pipe was set to (40 KV 40 mA), the 2θ scan angle for the sample was from 3° to 40°, and scan step was 0.02°.
    (b) Instrument Model: Bruker D2 phaser
    Test conditions: the anode target material was copper, the light pipe was set to (40 KV 40 mA), the 2θ scan angle for the sample was from 4° to 50°, and scan step was 0.02°.
(2) Differential Scanning Calorimetry Analysis (DSC)
    Instrument Model: (a) TA Discovery DSC 250 (TA Instruments, US); (b) TA Discovery DSC 25 (TA Instruments, US)
    Test conditions: the heating rate was 10° C./min, and dry nitrogen was used as the purge gas.
(3) Thermogravimetric Analysis (TGA)
    Instrument Model: (a) Discovery TGA 55 (TA Instruments, US); (b) TGA 4000 (PerkinElmer, Germany)
    Test conditions: automatic weighing in the heating furnace, the heating rate was 10° C./min, and dry nitrogen was used as the purge gas.
(4) Polarizing Microscope Analysis (PLM)
    Instrument Model: Polarizing Microscope ECLIPSE LV100POL (Nikon, JPN)
(5) Nuclear Magnetic Resonance ($^1$H NMR)
    Instrument Model: Bruker Advance 300, equipped with B-ACS 120 automatic sampling system
(6) Dynamic Vapour Sorption Analysis (DVS)
    Instrument Model: DVS Intrinsic (SMS, UK)
    Test conditions: a gradient mode was used, the humidity ranged from 0% to 90%, the humidity increment of each gradient was 10%, and the holding time of each gradient was 1 h.

Example 1: Preparation of 5-((2-Ethynyl-5-Isopropylpyridin-4-Yl)Oxy)Pyrimidine-2,4-Diamine (Compound a) (See PCT/CN2018/112829, which is Incorporated Herein by Reference in its Entirety)

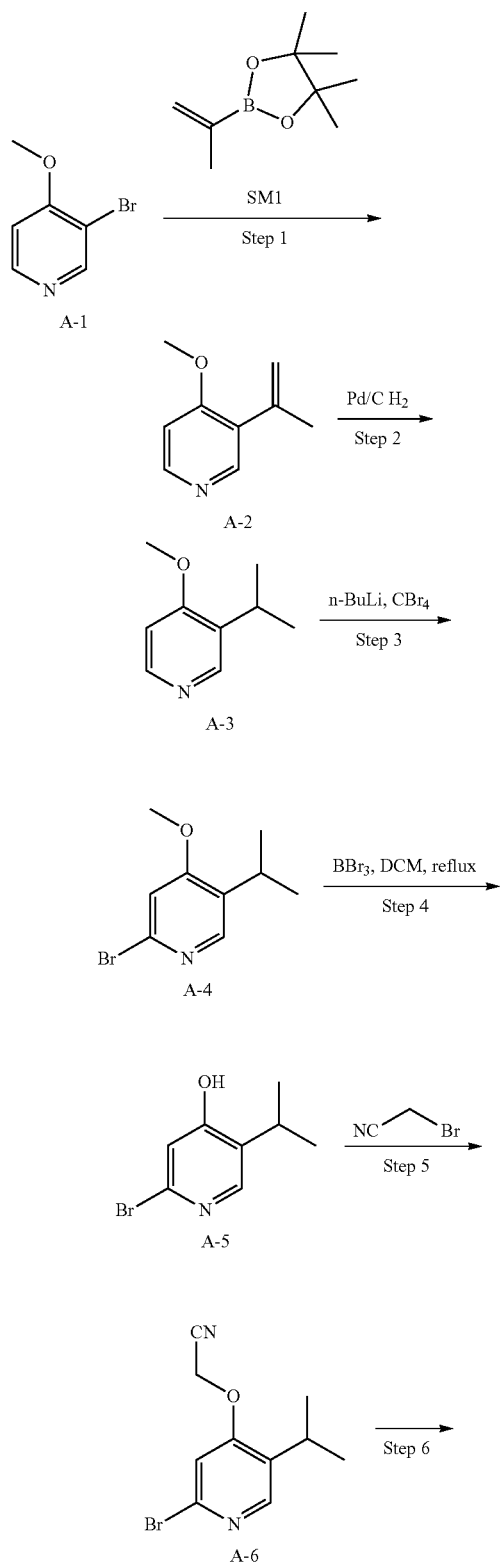

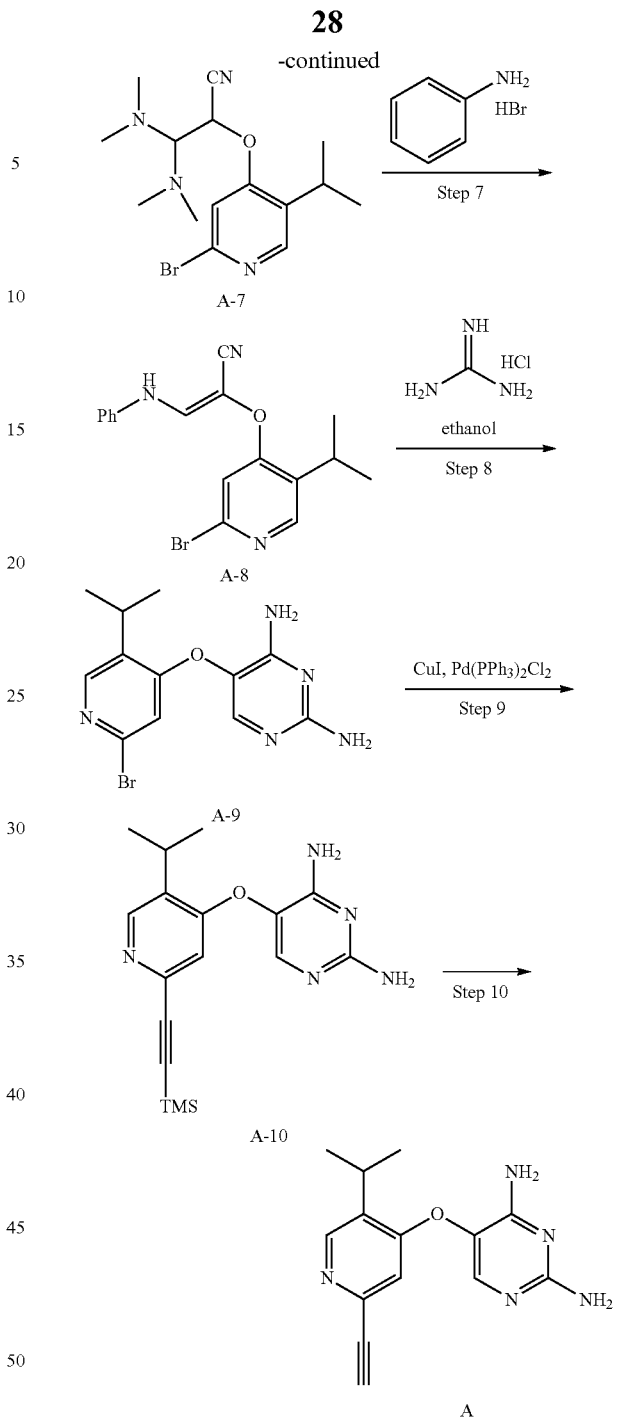

Step 1:

Compound A-1 (100 g, 0.54 mol) was dissolved in 1,4-dioxane (700 mL), the starting material SM1 (136 g, 0.81 mol), K$_2$CO$_3$ (149 g, 1.08 mol) and Pd(PPh$_3$)$_4$ (6.2 g, 5.4 mmol) were sequentially added, followed by addition of purified water (35 mL), and purge with nitrogen was performed for 3 times. Under the protection of nitrogen, the reaction was performed at 100° C. for 18 hours. LC-MS indicated the reaction of the starting materials was substantially complete. The reaction solution was cooled to room temperature, filtered, and the filter cake was washed with 1,4-dioxane (200 mL). The filtrate was concentrated under reduced pressure to remove 1,4-dioxane, followed by addition of purified water (200 mL), and extraction with ethyl acetate (400 mL×3). The organic phases were combined, dried over anhydrous sodium sulfate (100 g) for 30 min, filtered, and concentrated under reduced pressure to afford a crude product. The crude product was purified by column chromatography on silica gel (petroleum ether:ethyl acetate=20:1~10:1), to afford compound A-2 (79 g, yellow oil, yield: 99.75%).

$^1$H NMR (400 MHz, DMSO-$d_6$) δ 8.37 (d, J=5.6 Hz, 1H), 8.22 (s, 1H), 7.04 (d, J=5.6 Hz, 1H), 5.18 (s, 1H), 5.09 (s, 1H), 3.85 (s, 3H), 2.05 (s, 3H); MS m/z (ESI): 150.0 [M+H]$^+$.

Step 2:

Compound A-2 (79 g, 0.53 mol) was dissolved in anhydrous methanol (700 mL), 10% palladium/carbon (16 g) was added, and the reaction was performed under hydrogen (0.4 MPa) at room temperature for 18 hours. LC-MS indicated a small amount of the starting material remained. palladium/carbon (4 g) was supplemented, and the reaction was continued under hydrogen (0.4 MPa) at room temperature for 18 hours. LC-MS indicated the reaction of the starting materials was complete. The reaction solution was filtered, the filter cake was washed with methanol (100 mL), and the filtrate was concentrated under reduced pressure to give a crude product, compound A-3 (80 g, orange oily liquid, yield: 99.96%).

$^1$H NMR (400 MHz, DMSO-$d_6$) δ 8.31 (d, J=5.6 Hz, 1H), 8.28 (s, 1H), 6.98 (d, J=5.6 Hz, 1H), 3.86 (s, 3H), 3.21-3.09 (m, 1H), 1.21 (d, J=7.2 Hz, 6H); MS m/z (ESI): 152.1 [M+H]$^+$.

Step 3:

Compound N,N-dimethylethanolamine (46.3 g, 0.52 mol) was dissolved in n-hexane (400 mL). Under the protection of nitrogen, the reaction was cooled to −15° C.~−20° C., 2.4 M/L n-butyl lithium (434 mL, 1.04 mol) was slowly dropwise added. After the dropwise addition was complete, the reaction was kept at the temperature for 30 minutes, and then a solution of compound A-3 (40 g, 0.26 mol) in toluene (200 mL) was slowly dropwise added at −15° C.~−20° C. After the dropwise addition was complete, the reaction was kept at the temperature for 30 minutes. The reaction solution was cooled to −70° C., a solution of carbon tetrabromide (172.4 g, 0.52 mol) in toluene (500 mL) was slowly dropwise added, and the temperature was controlled at −70° C.~−75° C. After the dropwise addition was complete, the reaction was kept at the temperature for 1 hour. LC-MS indicated the reaction of the starting materials was complete. The reaction was quenched by adding water (500 mL), and extracted with ethyl acetate (500 mL×3). The organic phases were combined, washed once with saturated brine (500 mL), dried over anhydrous sodium sulfate (400 g) for half an hour, filtered and concentrated. The crude product was isolated by column chromatography on silica gel (petroleum ether:ethyl acetate=200:1~50:1) to afford compound A-4 (25 g, light yellow oily liquid, yield: 41.81%).

$^1$H NMR (400 MHz, DMSO-$d_6$) δ 8.06 (s, 1H), 7.20 (s, 1H), 3.89 (s, 3H), 3.13-3.05 (m, 1H), 1.18 (d, J=6.8 Hz, 6H); MS m/z (ESI): 229.9 [M+H]$^+$.

Step 4:

Compound A-4 (25 g, 0.11 mol) was dissolved in dichloromethane (300 mL). Under the protection of nitrogen, the reaction was cooled to 0° C.~5° C., and a solution of boron tribromide (140.3 g, 0.55 mol) was slowly added. After completion of the addition, the reaction solution was warmed to reflux, and the reaction was performed for 18 hours. LC-MS indicated the reaction of the starting materials was complete. The reaction solution was cooled to room temperature, and slowly dropwise added to 500 g ice. After the dropwise addition was complete, a saturated solution of sodium bicarbonate was dropwise added to adjust pH to 7~8. The reaction was filtered, the filter cake was washed thrice with ethyl acetate (400 mL), the filtrate was separated, and the aqueous phase was extracted with ethyl acetate (400 mL×3) again. All the organic phases were combined, dried over anhydrous sodium sulfate (500 g) for half an hour, filtered, and the filtrate was concentrated under reduced pressure to afford compound A-5 (20 g, light yellow solid, yield: 84.17%).

$^1$H NMR (400 MHz, DMSO-$d_6$) δ 11.11 (s, 1H), 7.99 (s, 1H), 6.90 (s, 1H), 3.10-3.02 (m, 1H), 1.18 (d, J=6.8 Hz, 6H); MS m/z (ESI): 215.9 [M+H]$^+$.

Step 5:

Compound A-5 (10 g, 0.047 mol) was dissolved in DMF (50 mL). Under the protection of nitrogen, potassium carbonate (12.8 g, 0.093 mol) and bromoacetonitrile (8.4 g, 0.07 mol) were sequentially added, and the reaction was stirred at room temperature for 2 hours. LC-MS indicated the reaction of the starting materials was complete. The reaction was quenched by adding water (50 mL), and extracted with ethyl acetate (50 mL×4). The combined organic phases were washed with saturated brine (50 mL×3), added with anhydrous sodium sulfate, dried for half an hour, and filtered. The filtrate was concentrated under reduced pressure, and the crude product was isolated by column chromatography on silica gel (petroleum ether:ethyl acetate=20:1~5:1) to afford compound A-6 (4 g, light yellow solid, yield: 33.38%).

$^1$H NMR (400 MHz, DMSO-$d_6$) δ 8.18 (s, 1H), 7.40 (s, 1H), 5.37 (s, 2H), 3.14-3.06 (m, 1H), 1.21 (d, J=6.8 Hz, 6H); MS m/z (ESI): 254.8 [M+H]$^+$.

Step 6:

Compound A-6 (4 g, 0.016 mol) was dissolved in DMF (50 mL). Under the protection of nitrogen, tert-butoxy bis(dimethylamino)methane (8.2 g, 0.048 mol) was added, the reaction was heated to 100° C., and stirred for 2 hours. LC-MS indicated the reaction of the starting materials was complete. The reaction solution was cooled to room temperature, quenched by adding water (50 mL), and then extracted with ethyl acetate (50 mL×3). The organic phase was then washed with saturated brine (50 mL×3), added with anhydrous sodium sulfate, dried for half an hour, and filtered. The filtrate was concentrated under reduced pressure, and the crude product was isolated by column chromatography on silica gel (petroleum ether:ethyl acetate=10:1~5:1) to afford compound A-7 (3.8 g, light yellow solid, yield: 66.90%). MS m/z (ESI): 309.7 [M−45+H]$^+$.

Step 7:

Compound A-7 (3.54 g, 0.01 mol) was dissolved in DMF (25 mL). Under the protection of nitrogen, aniline hydrobromide (2.08 g, 0.012 mol) was added, the reaction was heated to 100° C., and stirred for 2 hours. LC-MS indicated the reaction of the starting materials was complete. The reaction solution was cooled to room temperature, quenched by adding water (25 mL), and extracted with ethyl acetate (20 mL×3). The organic phase was then washed with saturated brine (20 mL×3), added with anhydrous sodium sulfate, dried for half an hour, and filtered. The filtrate was concentrated under reduced pressure, and the crude product was isolated by column chromatography on silica gel (petroleum ether:ethyl acetate=20:1~5:1) to afford compound A-8 (3.1 g, light yellow solid, yield: 86.59%).

$^1$H NMR (400 MHz, DMSO-$d_6$) δ 9.36 (d, J=12.8 Hz, 1H), 8.28 (s, 1H), 7.95 (d, J=12.8 Hz, 1H), 7.32-7.24 (m, 4H), 7.20 (s, 1H), 6.99 (t, J=7.2 Hz, 1H), 3.31-3.26 (m, 1H), 1.28 (d, J=6.8 Hz, 6H); MS m/z (ESI): 357.7 [M+H]$^+$.

Step 8:

Guanidine hydrochloride (2.4 g, 25.2 mmol) was added to anhydrous ethanol (50 mL). Under the protection of nitrogen, sodium methoxide (2.4 g, 25.2 mmol) was added, the reaction was stirred at room temperature for half an hour, followed by addition of compound A-8 (3 g, 8.4 mmol). After completion of the addition, the reaction solution was heated to reflux, and the reaction was performed for 18 hours. LC-MS indicated the reaction of the starting materials was complete. The reaction solution was cooled to room temperature, filtered, the filtrate was concentrated under reduced pressure, and the crude product was isolated by column chromatography on silica gel (DCM:MeOH=50:1~20:1) to afford compound A-9 (900 mg, light yellow solid, yield: 33.17%, compound 2).

$^1$H NMR (400 MHz, DMSO-d$_6$) δ 8.19 (s, 1H), 7.62 (s, 1H), 6.56 (s, 1H), 6.47 (s, 2H), 6.06 (s, 2H), 3.32-3.27 (m, 1H), 1.28 (d, J=6.8 Hz, 6H); MS m/z (ESI): 323.7 [M+H]$^+$.

Step 9:

Compound A-9 (3 g, 9.29 mmol) was dissolved in 1,4-dioxane (40 mL), trimethylsilylacetylene (9 g, 92.9 mmol), DIEA (12 g, 92.9 mmol), CuI (0.6 g) and Pd(PPh$_3$)$_2$Cl$_2$ (0.6 g) were sequentially added, and purge with nitrogen was performed for 3 times. Under the protection of nitrogen, the reaction was performed at 50° C. for 2 hours. LC-MS indicated the reaction of the starting materials was substantially complete. The reaction solution was cooled to room temperature, filtered, the filter cake was washed with 1,4-dioxane (10 mL), the filtrate was concentrated under reduced pressure to remove dioxane, followed by addition of purified water (100 mL), and extraction with ethyl acetate (100 mL×3). The organic phases were combined, added with anhydrous sodium sulfate (20 g), dried for 30 min, filtered, and concentrated under reduced pressure to afford a crude product, which was purified by column chromatography on silica gel (petroleum ether:ethyl acetate=20:1~5:1) to afford compound A-10 (2 g, yield 63.1%). MS m/z (ESI): 341.9 [M+H]$^+$.

Step 10:

Compound A-10 (2 g, 5.87 mmol) was dissolved in THF (20 mL), and TBAF (1.53 g, 5.87 mmol) was added. The reaction was performed at room temperature for 10 minutes. LC-MS indicated the reaction of the starting materials was complete. The reaction solution was rotary evaporated to dryness to give an oily residue. The residue was purified by column chromatography on silica gel (petroleum ether:ethyl acetate=1:3) to afford compound A (0.7 g, yellow solid, yield 44.6%).

$^1$H NMR (300 MHz, DMSO-d$_6$) δ 8.33 (s, 1H), 7.56 (s, 1H), 6.50 (s, 1H), 6.41 (s, 2H), 6.01 (s, 2H), 4.20 (s, 1H), 3.37-3.31 (m, 1H), 1.28 (d, J=6.8 Hz, 6H). MS m/z (ESI): 269.8 [M+H]$^+$.

Example 2: Preparation of Crystalline Form Ia of Compound a Hydrochloride (Molar Ratio 1:1) (Method One)

5.0 g of compound A was added to 100 mL of absolute ethanol, heated to 60° C., and stirred at this temperature until the solid was completely dissolved. 1.6 mL of concentrated hydrochloric acid was slowly added dropwise, the reaction solution was slowly cooled to room temperature, and then stirring was continued for 1 h. The solid was collected by filtration and dried under vacuum at 40° C. overnight to obtain the crystalline form. The XRPD pattern obtained by X-ray powder diffraction detection is shown in FIG. 1; the DSC and TGA graph obtained by a DSC and TGA analysis is shown in FIG. 2; and the sample was observed under a scanning electron microscope, and the crystal morphology is shown in FIG. 3.

$^1$H NMR (300 MHz, DMSO-d$_6$) δ: 1.29 (d, 6H), 3.33 (m, 1H), 4.29 (s, 1H), 7.17 (s, 1H), 7.71 (br d, 2H), 7.96 (s, 1H), 8.10 (br d, 1H), 8.42 (s, 2H), 12.35 (br d, 1H).

Example 3: Preparation of Crystalline Form Ia of Compound a Hydrochloride (Molar Ratio 1:1) (Method Two)

1.0 g of compound A was added to 100 mL of acetone, heated to 50° C., and stirred at this temperature for 30 min. 0.93 mL of 4N hydrochloric acid was slowly added dropwise, the reaction solution was slowly cooled to room temperature, and then stirring was continued overnight. The solid was collected by filtration and dried under vacuum at 50° C. overnight to obtain the crystalline form. The XRPD pattern obtained by X-ray powder diffraction detection is the same as that in FIG. 1.

$^1$H NMR (300 MHz, DMSO-d$_6$) δ: 1.29 (d, 6H), 3.33 (m, 1H), 4.29 (s, 1H), 7.17 (s, 1H), 7.71 (br d, 2H), 7.96 (s, 1H), 8.10 (br d, 1H), 8.42 (s, 2H), 12.35 (br d, 1H).

Example 4: Preparation of Crystalline Form Ib of Compound a Hydrochloride (Molar Ratio 1:1)

1.0 g of compound A was added to 200 mL of ethyl acetate, heated to 50° C., and stirred at this temperature for 30 min. 0.93 mL of 4N hydrochloric acid was slowly added dropwise, the reaction solution was slowly cooled to room temperature, and then stirring was continued overnight. The solid was collected by filtration and dried under vacuum at 50° C. overnight to obtain the crystalline form. The XRPD pattern obtained by X-ray powder diffraction detection is shown in FIG. 4; and the DSC and TGA graphs obtained by DSC and TGA analyses are respectively shown in FIG. 5 and FIG. 6.

After X-ray powder diffraction detection, the XRPD spectrum is shown in FIG. 4; after DSC and TGA analysis, the DSC spectrum and TGA spectrum are shown in FIG. 5 and FIG. 6, respectively.

$^1$H NMR (300 MHz, DMSO-d$_6$) δ: 1.29 (d, 6H), 3.33 (m, 1H), 4.29 (s, 1H), 7.17 (s, 1H), 7.71 (br d, 2H), 7.96 (s, 1H), 8.10 (br d, 1H), 8.42 (s, 2H), 12.35 (br d, 1H).

Example 5: Preparation of Crystalline Form II of Compound a Hydrochloride (Molar Ratio 1:2)

5.0 g of compound A was added to 100 mL of absolute ethanol, heated to 60° C., and stirred at this temperature until the solid was completely dissolved. 3.2 mL of concentrated hydrochloric acid was slowly added dropwise, the reaction solution was slowly cooled to room temperature, and then stirring was continued for 1 h. The solid was collected by filtration and dried under vacuum at 40° C. overnight to obtain the crystalline form. The XRPD pattern obtained by X-ray powder diffraction detection is shown in FIG. 7; and the DSC and TGA graph obtained by a DSC and TGA analysis is shown in FIG. 8.

$^1$H NMR (300 MHz, DMSO-d$_6$) δ: 1.30 (d, 6H), 3.41 (m, 1H), 4.67 (s, 1H), 7.46 (s, 1H), 7.83 (br d, 2H), 8.06 (d, 2H), 8.52 (d, 2H), 12.57 (br d, 1H).

Example 6: Preparation of Crystalline Form III of Compound a Citrate (Molar Ratio 1:0.5)

5.0 g of compound A was added to 280 mL of absolute ethanol, heated to 60° C., and stirred at this temperature until the solid was completely dissolved. 37.2 mL of a 0.5M solution of citric acid in methanol was slowly added dropwise, the reaction solution was slowly cooled to room temperature, and then stirring was continued for 1.5 h. The solid was collected by filtration and dried under vacuum at 50° C. overnight to obtain the crystalline form. The XRPD pattern obtained by X-ray powder diffraction detection is shown in FIG. 9; the DSC and TGA graph obtained by a DSC and TGA analysis is shown in FIG. 10; and the sample was observed under a scanning electron microscope, and the crystal morphology is shown in FIG. 11.

$^1$H NMR (300 MHz, DMSO-d$_6$) δ: 1.30 (d, 6H), 2.64 (dd, 2H), 3.35 (m, 1H), 4.24 (s, 1H), 6.33 (s, 2H), 6.64 (s, 1H), 6.76 (br d, 2H), 7.65 (s, 1H), 8.38 (s, 1H), 10.93 (br d, 2H).

Example 7: Preparation of Crystalline Form IV of Compound a Sulfate (Molar Ratio 1:0.5)

5.0 g of compound A was added to 280 mL of absolute ethanol, heated to 55° C., and stirred at this temperature until the solid was completely dissolved. 5.2 mL of a 1.8M solution of sulfuric acid in ethanol was slowly added dropwise, the reaction solution was slowly cooled to room temperature, and then stirring was continued for 6.5 hours. The solid was collected by filtration and dried under vacuum at 50° C. overnight to obtain the crystalline form. The XRPD pattern obtained by X-ray powder diffraction detection is shown in FIG. 12; and the DSC and TGA graph obtained by a DSC and TGA analysis is shown in FIG. 13.

$^1$H NMR (300 MHz, DMSO-d$_6$) δ: 1.31 (d, 6H), 3.38 (m, 1H), 4.30 (s, 1H), 7.06 (s, 1H), 7.31 (s, 2H), 7.88 (s, 3H), 8.44 (s, 1H), 10.79 (br d, 1H).

Example 8: Preparation of Crystalline Form V of Compound a Sulfate (Molar Ratio 1:1)

5.0 g of compound A was added to 280 mL of absolute ethanol, heated to 55° C., and stirred at this temperature until the solid was completely dissolved. 10.5 mL of a 1.8M solution of sulfuric acid in ethanol was slowly added dropwise, the reaction solution was slowly cooled to room temperature, and then stirring was continued for 6.5 hours. The solid was collected by filtration and dried under vacuum at 50° C. overnight to obtain the crystalline form. The XRPD pattern obtained by X-ray powder diffraction detection is shown in FIG. 14; and the DSC and TGA graph obtained by a DSC and TGA analysis is shown in FIG. 15.

$^1$H NMR (300 MHz, DMSO-d$_6$) δ: 1.31 (d, 6H), 3.34 (m, 1H), 4.32 (s, 1H), 7.20 (s, 1H), 7.64 (s, 2H), 7.95 (s, 1H), 8.10 (s, 1H), 8.44 (s, 1H), 8.49 (s, 1H), 11.99 (br d, 1H).

Example 9: Preparation of Crystalline Form VI of Compound a p-Toluenesulfonate (Molar Ratio 1:1)

5.0 g of compound A was added to 290 mL of acetone, heated to 50° C., and stirred at this temperature for 1 h. 37.2 mL of a 0.5M solution of p-toluenesulfonic acid in methanol was slowly added dropwise, the reaction solution was concentrated under reduced pressure to dryness and then 95 mL of acetone was added. Stirring was continued at room temperature for 48 h. The solid was collected by filtration to obtain the crystalline form. The XRPD pattern obtained by X-ray powder diffraction detection is shown in FIG. 16; and the DSC and TGA graph obtained by a DSC and TGA analysis is shown in FIG. 17.

$^1$H NMR (300 MHz, DMSO-d$_6$) δ: 1.30 (d, 6H), 2.29 (s, 3H), 3.33 (m, 1H), 4.31 (s, 1H), 7.12 (d, 2H), 7.18 (s, 1H), 7.47 (d, 2H), 7.63 (br d, 2H), 7.94 (s, 1H), 8.09 (br d, 1H), 8.43 (s, 1H), 8.49 (br d, 1H), 11.97 (br d, 1H).

Example 10: Preparation of Crystalline Form VII of Compound a Mesylate (Molar Ratio 1:1)

5.0 g of compound A was added to 190 mL of tetrahydrofuran, heated to 50° C., and stirred at this temperature for 1 h. 1.2 mL of methanesulfonic acid was slowly added dropwise, the reaction solution was slowly cooled to room temperature and then the stirring was continued overnight. The solid was collected by filtration to obtain the crystalline form. The XRPD pattern obtained by X-ray powder diffraction detection is shown in FIG. 18; the DSC and TGA graph obtained by a DSC and TGA analysis is shown in FIG. 19; and the sample was observed under a scanning electron microscope, and the crystal morphology is shown in FIG. 20.

$^1$H NMR (300 MHz, DMSO-d$_6$) δ: 1.32 (d, 6H), 2.38 (s, 3H), 3.35 (m, 1H), 4.39 (s, 1H), 7.26 (s, 1H), 7.70 (br d, 2H), 7.98 (s, 1H), 8.10 (s, 1H), 8.49 (d, 2H), 12.10 (br d, 1H).

Example 11: Preparation of Crystalline Form VIII of Compound a Mesylate (Molar Ratio 1:2)

5.0 g of compound A was added to 190 mL of tetrahydrofuran, heated to 50° C., and stirred at this temperature for 1 h. 2.4 mL of methanesulfonic acid was slowly added dropwise, the reaction solution was slowly cooled to room temperature and then the stirring was continued overnight. The solid was collected by filtration to obtain the crystalline form. The XRPD pattern obtained by X-ray powder diffraction detection is shown in FIG. 21; the DSC and TGA graph obtained by a DSC and TGA analysis is shown in FIG. 22; and the sample was observed under a scanning electron microscope, and the crystal morphology is shown in FIG. 23.

$^1$H NMR (300 MHz, DMSO-d$_6$) δ: 1.32 (d, 6H), 2.38 (s, 6H), 3.38 (m, 1H), 4.54 (s, 1H), 7.37 (s, 1H), 7.70 (br d, 2H), 8.00 (s, 1H), 8.11 (s, 1H), 8.51 (d, 2H), 12.08 (br d, 1H).

Example 12: Preparation of Crystalline Form IX of Compound a Phosphate (Molar Ratio 1:1)

5.0 g of compound A was added to 150 mL of absolute ethanol, heated to 55° C., and stirred at this temperature for 1 h. 1.3 mL of 85% phosphoric acid (14.5 mol/L) was slowly added dropwise, the reaction solution was slowly cooled to room temperature, and then stirring was continued for 2 h. The solid was collected by filtration and dried under vacuum at 40° C. overnight to obtain the crystalline form. The XRPD pattern obtained by X-ray powder diffraction detection is shown in FIG. 24; the DSC and TGA graph obtained by a DSC and TGA analysis is shown in FIG. 25; and the sample was observed under a scanning electron microscope, and the crystal morphology is shown in FIG. 26.

$^1$H NMR (300 MHz, DMSO-d$_6$) δ: 1.30 (d, 6H), 3.35 (m, 1H), 4.23 (s, 1H), 6.25 (s, 2H), 6.60 (s, 1H), 6.63 (s, 2H), 7.62 (s, 1H), 8.38 (s, 1H).

Example 13: Preparation of Crystalline Form X of Compound a Maleate (Molar Ratio 1:1)

5.0 g of compound A was added to 185 mL of absolute ethanol, heated to 60° C., and stirred at this temperature for 1 h. 18.6 mL of a 1M solution of maleic acid in ethanol was slowly added dropwise, the reaction solution was slowly cooled to room temperature, and then stirring was continued for 2 h. The solid was collected by filtration and dried under vacuum at 40° C. overnight to obtain the crystalline form. The XRPD pattern obtained by X-ray powder diffraction detection is shown in FIG. 27; the DSC and TGA graph obtained by a DSC and TGA analysis is shown in FIG. 28; and the sample was observed under a scanning electron microscope, and the crystal morphology is shown in FIG. 29.

$^1$H NMR (300 MHz, DMSO-$d_6$) δ: 1.30 (d, 6H), 3.33 (m, 1H), 4.28 (s, 1H), 6.07 (s, 2H), 7.06 (s, 1H), 7.34 (br d, 2H), 7.87 (s, 1H), 7.95 (br d, 2H), 8.42 (s, 1H).

Example 14: Preparation of Compound a L-Tartrate (Molar Ratio 1:1)Crystalline Form XI 5.0 g of compound A was added to 190 mL of absolute ethanol, heated to 60° C., and stirred at this temperature for 1 h. 37.2 mL of a 0.5M solution of L-tartaric acid in methanol was slowly added dropwise, the reaction solution was slowly cooled to room temperature, and then stirring was continued for 2 h. The solid was collected by filtration and dried under vacuum at 40° C. overnight to obtain the crystalline form. The XRPD pattern obtained by X-ray powder diffraction detection is shown in FIG. 30; the DSC and TGA graph obtained by a DSC and TGA analysis is shown in FIG. 31; and the sample was observed under a scanning electron microscope, and the crystal morphology is shown in FIG. 32.

$^1$H NMR (300 MHz, DMSO-$d_6$) δ: 1.32 (d, 6H), 3.36 (m, 1H), 4.25 (s, 1H), 4.28 (d, 2H), 6.21 (s, 2H), 6.61 (s, 3H), 7.64 (s, 1H), 8.40 (s, 1H).

Example 15: Preparation of Crystalline Form XII of Compound a Fumarate (Molar Ratio 1:1)

5.0 g of compound A was added to 190 mL of absolute ethanol, heated to 60° C., and stirred at this temperature for 1 h. 74.4 mL of a 0.25M solution of fumaric acid in methanol was slowly added dropwise, the reaction solution was slowly cooled to room temperature, and then stirring was continued for 2 h. The solid was collected by filtration and dried under vacuum at 40° C. overnight to obtain the crystalline form. The XRPD pattern obtained by X-ray powder diffraction detection is shown in FIG. 33; and the DSC and TGA graph obtained by a DSC and TGA analysis is shown in FIG. 34.

$^1$H NMR (300 MHz, DMSO-$d_6$) δ: 1.32 (d, 6H), 3.38 (m, 1H), 4.24 (s, 1H), 6.15 (d, 2H), 6.53 (s, 2H), 6.58 (s, 1H), 6.64 (s, 2H), 7.63 (s, 1H), 8.39 (s, 1H).

EXPERIMENTAL EXAMPLE

Experimental Example 1: Hygroscopicity Test

A dynamic vapour sorption analysis (DVS) was employed to investigate the hygroscopicity of samples of crystalline form Ia of compound A hydrochloride, crystalline form III of the citrate and crystalline form X of the maleate, and the samples before and after the DVS test were subjected to XRPD detection and pattern comparison. The sample of crystalline form Ia of the hydrochloride had a moisture absorption of 1.21% at 90% RH, and the XRPD patterns of the sample before and after the DVS test had no difference. The sample of crystalline form III of the citrate had a moisture absorption of 1.69% at 80% RH, and the XRPD patterns of the sample before and after the DVS test had no difference. The sample of crystalline form X of the maleate had a moisture absorption of 3.69% at 90% RH, and the XRPD patterns of the sample before and after the DVS test had no difference.

Experimental Example 2: High Temperature Stability Test

The samples of crystalline form Ia of compound A hydrochloride and crystalline form III of the citrate were investigated for stability under two conditions (40° C./75% RH and 60° C.) for 2 weeks. The XRPD pattern was measured by Bruker D8 advance X-ray powder diffractometer after the test was performed for 1 week and 2 weeks. The results showed that the crystalline forms of the two salts had no change in crystalline form during the stability investigation, and the stability is excellent.

Experimental Example 3: Solubility Test

The samples of crystalline form Ia of compound A hydrochloride and crystalline form III of the citrate as well as compound A free base were subjected to a solubility test at 37° C. in FaSSIF (Fasted State Simulated Intestinal Fluid). The solubility data are shown in the table below. The solubility of the two salt crystalline forms in FaSSIF is significantly higher than that of the free base, wherein the crystalline form Ia of the hydrochloride is increased by about 30 times, and the crystalline form III of the citrate is increased by about 4 times.

| | Solubility (mg/mL) | | |
|---|---|---|---|
| Sample | 30 min | 2 h | 24 h |
| Free base | 0.08 | 0.08 | 0.11 |
| Crystalline form Ia of the hydrochloride | 2.18 | 2.54 | 3.38 |
| Crystalline form III of the citrate | 0.37 | 0.33 | 0.42 |

Various modifications to the invention in addition to those described herein will become apparent to those skilled in the art from the foregoing description. Such modifications are intended to fall within the scope of the appended claims. Each reference, including all patents, applications, journal articles, books and any other disclosure, referred to herein is hereby incorporated by reference in its entirety.

What is claimed is:

1. A salt of Compound A,

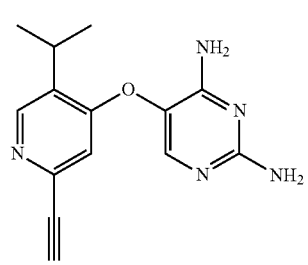

Compound A which is Compound A hydrochloride;
the molar ratio of Compound A to hydrochloric acid is 1:1;
the Compound A hydrochloride is in crystalline form Ia;

the crystalline form Ia has an XRPD pattern comprising characteristic peaks at diffraction angles (2θ) of 7.8±0.2°, 10.4±0.2°, 15.7±0.2°, 20.0±0.2°, 20.7±0.2°, 22.3±0.2° and 26.0±0.2°.

2. A salt of Compound A,

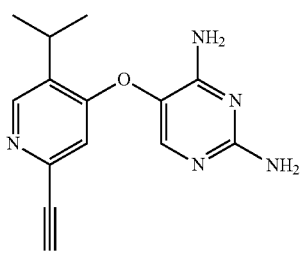
Compound A which is Compound A hydrochloride;
the molar ratio of Compound A to hydrochloric acid is 1:1;
the Compound A hydrochloride is in crystalline form Ob;
the crystalline form Ib has an XRPD pattern comprising characteristic peaks at diffraction angles (2θ) of 5.4±0.2°, 11.2±0.2° 13.6±0.2°, and 20.0±0.2°.

3. A salt of Compound A,

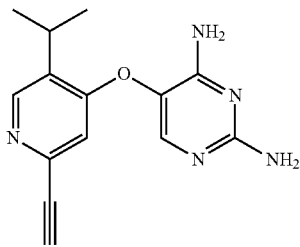
Compound A which is Compound A hydrochloride;
the molar ratio of Compound A to hydrochloric acid is 1:2;
the Compound A hydrochloride is in crystalline form II;
the crystalline form II has an XRPD pattern comprising characteristic peaks at diffraction angles (2θ) of 13.3±0.2°, 14.2±0.2°, 21.9±0.2° and 27.4±0.2°.

4. A salt of Compound A,

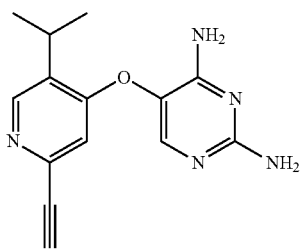
Compound A wherein the salt is Compound A citrate;
the molar ratio of Compound A to citric acid is 1:0.5;
the Compound A citrate is in crystalline form III;
the crystalline form III has an XRPD pattern comprising characteristic peaks at diffraction angles (2θ) of 6.9±0.2°, 10.8±0.2°, 14.6±0.2°, 20.3±0.2° and 22.5±0.2°;
or,
wherein the salt is Compound A sulfate;
the molar ratio of Compound A to sulfuric acid is 1:0.5;
the Compound A sulfate is in crystalline form IV;
the crystalline form IV has an XRPD pattern comprising characteristic peaks at diffraction angles (2θ) of 8.0±0.2°, 11.2±0.2°, 20.9±0.2°, 21.8±0.2° and 26.3±0.2°;
or,
wherein the salt is Compound A sulfate;
the molar ratio of Compound A to sulfuric acid is 1:1;
the Compound A sulfate is in crystalline form V;
the crystalline form V has an XRPD pattern comprising characteristic peaks at diffraction angles (2θ) of 7.9±0.2°, 11.2±0.2°, 20.3±0.2°, 21.7±0.2° and 26.3±0.2°;
or,
wherein the salt is Compound A p-toluenesulfonate;
the molar ratio of Compound A to p-toluenesulfonic acid is 1:1;
the Compound A p-toluenesulfonate is in crystalline form VI;
the crystalline form VI has an XRPD pattern comprising characteristic peaks at diffraction angles (2θ) of 9.2±0.2°, 10.8±0.2°, 18.0±0.2° and 19.5±0.2°;
or,
wherein the salt is Compound A mesylate;
the molar ratio of Compound A to methanesulfonic acid is 1:1;
the Compound A mesylate is in crystalline form VII;
the crystalline form VII has an XRPD pattern comprising characteristic peaks at diffraction angles (2θ) of 7.7±0.2°, 10.5±0.2°, 19.0±0.2°, 20.1±0.2° and 20.5±0.2°;
or,
wherein the salt is Compound A mesylate;
the molar ratio of Compound A to methanesulfonic acid is 1:2;
the Compound A mesylate is in crystalline form VIII;
the crystalline form VIII has an XRPD pattern comprising characteristic peaks at diffraction angles (2θ) of 11.0±0.2°, 12.2±0.2°, 13.4±0.2°, 19.9±0.2°, 20.2±0.2°, 21.4±0.2° and 25.8±0.2°;
or,
wherein the salt is Compound A phosphate;
the molar ratio of Compound A to phosphoric acid is 1:1;
the Compound A phosphate is in crystalline form IX;
the crystalline form IX has an XRPD pattern comprising characteristic peaks at diffraction angles (2θ) of 7.0±0.2°, 10.7±0.2°, 14.6±0.2° and 26.7±0.2°;
or,
wherein the salt is Compound A maleate;
the molar ratio of Compound A to maleic acid is 1:1;
the Compound A maleate is in crystalline form X;
the crystalline form X has an XRPD pattern comprising characteristic peaks at diffraction angles (2θ) of 5.4±0.2°, 5.8±0.2°, 13.7±0.2° and 17.1±0.2°;
or,
wherein the salt is Compound A L-tartrate;
the molar ratio of Compound A to L-tartaric acid is 1:1;
the Compound A L-tartrate is in crystalline form XI;
the crystalline form XI has an XRPD pattern comprising characteristic peaks at diffraction angles (2θ) of 6.5±0.2°, 14.3±0.2°, 20.8±0.2°, 21.5±0.2° and 25.2±0.2°;
or,
wherein the salt is Compound A fumarate;
the molar ratio of Compound A to fumaric acid is 1:1;
the Compound A fumarate is in crystalline form XII;
the crystalline form XII has an XRPD pattern comprising characteristic peaks at diffraction angles (2θ) of 7.2±0.2°, 10.9±0.2°, 20.9±0.2° and 27.5±0.2°.

5. A pharmaceutical composition comprising the salt of claim 1, and one or more pharmaceutically acceptable carriers.

6. The salt of Compound A according to claim 1, wherein the crystalline form Ia has an XRPD pattern comprising characteristic peaks at diffraction angles (2θ) of 7.8±0.2°, 10.4±0.2°, 11.1±0.2°, 15.7±0.2°, 16.2±0.2°, 20.0±0.2°, 20.7±0.2°, 22.3±0.2°, 23.7±0.2°, 24.7±0.2°, 26.0±0.2° and 28.8±0.2°.

7. The salt of Compound A according to claim 6, wherein the crystalline form Ia has an XRPD pattern comprising characteristic peaks at diffraction angles (2θ) of 7.8±0.2°, 10.4±0.2°, 11.1±0.2°, 14.5±0.2°, 14.7±0.2°, 15.7±0.2°, 16.2±0.2°, 18.0±0.2°, 20.0±0.2°, 20.7±0.2°, 22.3±0.2°, 23.0±0.2°, 23.7±0.2°, 24.7±0.2°, 25.3±0.2°, 26.0±0.2°, 26.4±0.2°, 27.0±0.2°, 28.8±0.2°, 29.7±0.2°, 33.9±0.2° and 38.3±0.2°.

8. The salt of Compound A according to claim 2, wherein the crystalline form Ib has an XRPD pattern comprising characteristic peaks at diffraction angles (2θ) of 5.4±0.2°, 9.5±0.2°, 11.2±0.2°, 13.6±0.2°, 20.0±0.2°, 20.8±0.2°, 24.9±0.2° and 25.5±0.2°.

9. The salt of Compound A according to claim 8, wherein the crystalline form Ib has an XRPD pattern comprising characteristic peaks at diffraction angles (2θ) of 5.4±0.2°, 9.5±0.2°, 11.2±0.2°, 13.6±0.2°, 15.7±0.2°, 17.6±0.2°, 20.0±0.2°, 20.8±0.2°, 22.1±0.2°, 23.2±0.2°, 23.6±0.2°, 24.1±0.2°, 24.6±0.2°, 24.9±0.2°, 25.5±0.2° and 30.5±0.2°.

10. The salt of Compound A according to claim 3, wherein the crystalline form II has an XRPD pattern comprising characteristic peaks at diffraction angles (2θ) of 8.2±0.2°, 11.9±0.2°, 13.3±0.2°, 14.2±0.2°, 16.0±0.2°, 18.3±0.2°, 19.4±0.2°, 20.0±0.2°, 21.2±0.2°, 21.9±0.2°, 22.9±0.2°, 24.6±0.2°, 26.6±0.2°, 27.4±0.2° and 28.0±0.2°.

11. The salt of Compound A according to claim 10, wherein the crystalline form II has an XRPD pattern comprising characteristic peaks at diffraction angles (2θ) of 8.2±0.2°, 11.9±0.2°, 13.3±0.2°, 14.2±0.2°, 14.8±0.2°, 16.0±0.2°, 17.8±0.2°, 18.3±0.2°, 19.4±0.2°, 20.0±0.2°, 21.2±0.2°, 21.9±0.2°, 22.6±0.2°, 22.9±0.2°, 23.5±0.2°, 24.6±0.2°, 25.6±0.2°, 26.6±0.2°, 27.4±0.2°, 28.0±0.2°, 29.7±0.2°, 31.8±0.2° and 34.0±0.2°.

12. The salt of Compound A according to claim 4, wherein
the crystalline form III has an XRPD pattern comprising characteristic peaks at diffraction angles (2θ) of 6.9±0.2°, 10.8±0.2°, 14.6±0.2°, 16.3±0.2°, 20.3±0.2°, 22.5±0.2°, 23.4±0.2° and 26.6±0.2°;
the crystalline form IV has an XRPD pattern comprising characteristic peaks at diffraction angles (2θ) of 8.0±0.2°, 10.5±0.2°, 11.2±0.2°, 20.9±0.2°, 21.8±0.2°, 22.5±0.2°, 23.8±0.2° and 26.3±0.2°;
the crystalline form V has an XRPD pattern comprising characteristic peaks at diffraction angles (2θ) of 7.9±0.2°, 11.2±0.2°, 20.3±0.2°, 21.7±0.2°, 22.5±0.2°, 23.7±0.2°, 24.8±0.2° and 26.3±0.2°;
the crystalline form VI has an XRPD pattern comprising characteristic peaks at diffraction angles (2θ) of 9.2±0.2°, 10.8±0.2°, 17.7±0.2°, 18.0±0.2°, 18.5±0.2°, 19.5±0.2°, 20.4±0.2°, 21.7±0.2°, 21.9±0.2°, 23.6±0.2° and 28.6±0.2°;
the crystalline form VII has an XRPD pattern comprising characteristic peaks at diffraction angles (2θ) of 7.7±0.2°, 10.5±0.2°, 16.2±0.2°, 16.8±0.2°, 19.0±0.2°, 19.9±0.2°, 20.1±0.2°, 20.5±0.2°, 21.0±0.2°, 22.6±0.2°, 24.0±0.2°, 25.5±0.2° and 26.5±0.2°;
the crystalline form VIII has an XRPD pattern comprising characteristic peaks at diffraction angles (2θ) of 3.2±0.2°, 6.0±0.2°, 11.0±0.2°, 12.2±0.2°, 13.4±0.2°, 19.9±0.2°, 20.2±0.2°, 21.0±0.2°, 21.4±0.2°, 23.0±0.2°, 23.4±0.2°, 24.9±0.2° and 25.8±0.2°;
the crystalline form IX has an XRPD pattern comprising characteristic peaks at diffraction angles (2θ) of 7.0±0.2°, 10.7±0.2°, 14.6±0.2°, 15.3±0.2°, 18.4±0.2°, 22.3±0.2°, 23.4±0.2° and 26.7±0.2°;
the crystalline form X has an XRPD pattern comprising characteristic peaks at diffraction angles (2θ) of 5.4±0.2°, 5.8±0.2°, 8.9±0.2°, 10.0±0.2°, 13.7±0.2°, 16.0±0.2°, 17.1±0.2°, 21.7±0.2° and 21.9±0.2°;
the crystalline form XI has an XRPD pattern comprising characteristic peaks at diffraction angles (2θ) of 6.5±0.2°, 10.9±0.2°, 12.6±0.2°, 14.3±0.2°, 16.1±0.2°, 17.3±0.2°, 18.0±0.2°, 20.8±0.2°, 21.5±0.2°, 22.5±0.2° and 25.2±0.2°;
the crystalline form XII has an XRPD pattern comprising characteristic peaks at diffraction angles (2θ) of 7.2±0.2°, 10.3±0.2°, 10.9±0.2°, 15.0±0.2°, 20.9±0.2°, 21.6±0.2°, 24.2±0.2° and 27.5±0.2°.

13. The salt of Compound A according to claim 12, wherein
the crystalline form III has an XRPD pattern comprising characteristic peaks at diffraction angles (2θ) of 6.9±0.2°, 10.8±0.2°, 12.7±0.2°, 14.6±0.2°, 16.3±0.2°, 17.6±0.2°, 18.1±0.2°, 20.3±0.2°, 21.4±0.2°, 22.5±0.2°, 23.4±0.2°, 24.2±0.2°, 25.5±0.2°, 26.0±0.2°, 26.6±0.2° and 27.1±0.2°;
the crystalline form IV has an XRPD pattern comprising characteristic peaks at diffraction angles (2θ) of 8.0±0.2°, 10.5±0.2°, 11.2±0.2°, 13.2±0.2°, 15.3±0.2°, 15.9±0.2°, 16.8±0.2°, 19.0±0.2°, 20.9±0.2°, 21.8±0.2°, 22.5±0.2°, 23.8±0.2°, 24.9±0.2°, 26.3±0.2°, 28.3±0.2°, 29.1±0.2°, 30.1±0.2° and 37.9±0.2°
the crystalline form V has an XRPD pattern comprising characteristic peaks at diffraction angles (2θ) of 7.9±0.2°, 10.4±0.2°, 11.2±0.2°, 13.1±0.2°, 15.1±0.2°, 15.7±0.2°, 15.9±0.2°, 16.6±0.2°, 18.9±0.2°, 20.3±0.2°, 21.0±0.2°, 21.7±0.2°, 22.5±0.2°, 23.7±0.2°, 24.3±0.2°, 24.8±0.2°, 26.3±0.2°, 28.2±0.2°, 29.1±0.2°, 30.1±0.2° and 37.9±0.2°;
the crystalline form VI has an XRPD pattern comprising characteristic peaks at diffraction angles (2θ) of 9.2±0.2°, 10.8±0.2°, 14.9±0.2°, 15.4±0.2°, 17.7±0.2°, 18.0±0.2°, 18.5±0.2°, 19.5±0.2°, 20.4±0.2°, 21.2±0.2°, 21.7±0.2°, 21.9±0.2°, 23.6±0.2°, 24.5±0.2°, 26.2±0.2°, 28.6±0.2°, 32.1±0.2° and 32.7±0.2°;
the crystalline form VII has an XRPD pattern comprising characteristic peaks at diffraction angles (2θ) of 6.0±0.2°, 7.7±0.2°, 10.5±0.2°, 11.0±0.2°, 12.3±0.2°, 13.5±0.2°, 14.0±0.2°, 14.3±0.2°, 14.9±0.2°, 15.5±0.2°, 16.2±0.2°, 16.8±0.2°, 19.0±0.2°, 19.9±0.2°, 20.1±0.2°, 20.5±0.2°, 21.0±0.2°, 21.4±0.2°, 22.6±0.2°, 23.2±0.2°, 24.0±0.2°, 24.9±0.2°, 25.5±0.2°, 25.8±0.2°, 26.5±0.2°, 27.6±0.2° and 29.6±0.2°;
the crystalline form VIII has an XRPD pattern comprising characteristic peaks at diffraction angles (2θ) of 3.2±0.2°, 6.0±0.2°, 9.4±0.2°, 11.0±0.2°, 12.2±0.2°, 13.4±0.2°, 14.9±0.2°, 15.5±0.2°, 15.7±0.2°, 17.7±0.2°, 18.1±0.2°, 18.9±0.2°, 19.9±0.2°, 20.2±0.2°, 21.0±0.2°, 21.4±0.2°, 21.9±0.2°, 22.4±0.2°, 23.0±0.2°, 23.4±0.2°, 23.9±0.2°, 24.9±0.2°, 25.2±0.2°, 25.8±0.2°, 26.5±0.2°, 27.4±0.2°, 28.9±0.2°, 30.8±0.2° and 31.5±0.2°;

the crystalline form IX has an XRPD pattern comprising characteristic peaks at diffraction angles (2θ) of 7.0±0.2°, 10.7±0.2°, 14.0±0.2°, 14.6±0.2°, 15.3±0.2°, 16.2±0.2°, 18.4±0.2°, 20.3±0.2°, 21.5±0.2°, 22.3±0.2°, 23.4±0.2°, 24.3±0.2°, 25.7±0.2°, 26.7±0.2° and 29.5±0.2°;

the crystalline form X has an XRPD pattern comprising characteristic peaks at diffraction angles (2θ) of 5.4±0.2°, 5.8±0.2°, 8.9±0.2°, 10.0±0.2°, 13.7±0.2°, 16.0±0.2°, 17.1±0.2°, 21.7±0.2°, 21.9±0.2°, 24.1±0.2°, 25.8±0.2° and 27.6±0.2°;

the crystalline form XI has an XRPD pattern comprising characteristic peaks at diffraction angles (2θ) of 6.5±0.2°, 10.3±0.2°, 10.9±0.2°, 12.6±0.2°, 14.3±0.2°, 15.2±0.2°, 16.1±0.2°, 17.3±0.2°, 18.0±0.2°, 19.4±0.2°, 20.8±0.2°, 21.5±0.2°, 22.0±0.2°, 22.5±0.2°, 23.4±0.2°, 23.8±0.2°, 24.2±0.2°, 24.8±0.2°, 25.2±0.2°, 25.8±0.2°, 26.7±0.2°, 27.8±0.2°, 28.8±0.2°, 30.1±0.2°, 31.4±0.2°, 33.8±0.2° and 35.2±0.2°;

the crystalline form XII has an XRPD pattern comprising characteristic peaks at diffraction angles (2θ) of 7.2±0.2°, 7.8±0.2°, 10.3±0.2°, 10.9±0.2°, 13.0±0.2°, 14.5±0.2°, 15.0±0.2°, 17.6±0.2°, 20.9±0.2°, 21.6±0.2°, 22.9±0.2°, 24.2±0.2°, 25.9±0.2°, 27.5±0.2° and 31.0±0.2°.

14. A pharmaceutical composition comprising the salt of claim 2, and one or more pharmaceutically acceptable carriers.

15. A pharmaceutical composition comprising the salt of claim 3, and one or more pharmaceutically acceptable carriers.

16. A pharmaceutical composition comprising the salt of claim 4, and one or more pharmaceutically acceptable carriers.

* * * * *